US006640108B2

(12) United States Patent
Lu et al.

(10) Patent No.: US 6,640,108 B2
(45) Date of Patent: Oct. 28, 2003

(54) CELLULAR COMMUNICATION SYSTEM

(75) Inventors: Priscilla Marilyn Lu, San Carlos, CA (US); Timothy Richard White, Palo Alto, CA (US)

(73) Assignee: Interwave Communications International, Ltd., Hamilton (BM)

( * ) Notice: Subject to any disclaimer, the term of this patent is extended or adjusted under 35 U.S.C. 154(b) by 283 days.

(21) Appl. No.: 09/753,785

(22) Filed: Jan. 2, 2001

(65) Prior Publication Data

US 2002/0009991 A1 Jan. 24, 2002

Related U.S. Application Data

(63) Continuation of application No. 08/927,353, filed on Sep. 11, 1997, now Pat. No. 6,212,395.

(51) Int. Cl.[7] .................................................. H04Q 7/30
(52) U.S. Cl. ....................... 455/463; 455/465; 455/555; 455/561
(58) Field of Search ................................. 455/462, 463, 455/464, 465, 445, 555, 561, 562, 509

(56) References Cited

U.S. PATENT DOCUMENTS

| | | | |
|---|---|---|---|
| 4,726,014 A | | 2/1988 | Goldman et al. .............. 370/58 |
| 5,241,537 A | * | 8/1993 | Gulliford et al. ........ 455/509 X |
| 5,353,333 A | * | 10/1994 | Fuentes ....................... 455/445 |
| 5,386,466 A | | 1/1995 | Bales et al. .................. 379/220 |
| 5,442,633 A | | 8/1995 | Perkins et al. .............. 370/94.1 |
| 5,479,483 A | | 12/1995 | Furuya et al. ................. 379/60 |
| 5,504,804 A | | 4/1996 | Widmark et al. .............. 379/63 |
| 5,506,837 A | | 4/1996 | Sollner et al. ................. 370/31 |
| 5,506,887 A | | 4/1996 | Emery et al. .................. 379/58 |
| 5,528,668 A | | 6/1996 | Aihara .......................... 379/60 |
| 5,530,945 A | | 6/1996 | Chavez, Jr. et al. .......... 379/62 |
| 5,533,099 A | | 7/1996 | Byrne ........................... 379/58 |

FOREIGN PATENT DOCUMENTS

| | | | | |
|---|---|---|---|---|
| EP | 462727 A2 | 12/1991 | ............ | H04Q/7/04 |
| EP | 462728 A2 | 12/1991 | ............ | H04Q/7/04 |
| EP | 566407 A2 | 10/1993 | ............ | H04Q/7/04 |
| EP | 595392 A1 | 5/1994 | ............ | H04Q/7/04 |
| EP | 600681 B1 | 7/1998 | ............ | H04Q/7/30 |
| EP | 605086 B1 | 12/1998 | ............ | H04Q/7/04 |
| EP | 587211 B1 | 2/2000 | ............ | H04Q/7/30 |
| WO | WO93/11625 | 6/1993 | .......... | H04M/11/00 |
| WO | WO94/05126 | 3/1994 | ............ | H04Q/7/04 |
| WO | WO94/26073 | 11/1994 | ............ | H04Q/7/04 |
| WO | WO95/24789 | 9/1995 | | |

OTHER PUBLICATIONS

Hollis, J.B., "Air Interface Protocols for a National Mobile Data Network," IEE Collq. (1993) No. 3, pp. 1–5.

* cited by examiner

Primary Examiner—Nay Maung
Assistant Examiner—Philip J. Sobutka
(74) Attorney, Agent, or Firm—Dorsey & Whitney LLP

(57) ABSTRACT

A cellular private branch exchange for facilitating cellular communication for a first plurality of mobile station units, which includes a first base station subsystem for communicating with a first and a second mobile station unit of the first plurality of mobile station units on respectively a first and a second cellular bearer data channel. The cellular private branch exchange further includes a cellular private branch exchange unit coupled to the first base station subsystem. In turn, the cellular private branch exchange unit includes a private mobile-services switching center for providing mobility management for the first plurality of mobile station units, the private mobile-services switching center representing a first cross-connect node capable of cross-connecting the first bearer data channel with the second bearer data channel for calls between the first and the second mobile station units. Further the cellular private branch exchange unit includes a private registry coupled to the private mobile-services switching center, the private registry storing subscriber information pertaining to the first plurality of mobile station units.

27 Claims, 28 Drawing Sheets

| BTS | BSC | BTS/BSC | CPBX | BSC/CPBX | BTS/BSC/CPBX |
|---|---|---|---|---|---|
| 3 TRX's | 0 TRX | 2 TRX's | 0 TRX | 0 TRX | 2 TRX's |
| 1 TM | 6 TM's | 2 TM's | 6 TM's | 6 TM's | 2 TM's |
| 1 CCPU | 3 CCPU's | 2 CCPU's | 3 CCPU's | 3 CCPU's | 2 CCPU's |
| 1 Clk | 1 Clk | 1 Clk | 1 Clk | 1 Clk | 1 Clk |
| 1 RF Dist | | 1 RF Dist | | | 1 RF Dist |

Fig. 11

| IMSI | Phone # | Name | SS# | Home Loc | Current Loc |
|---|---|---|---|---|---|
| 0,000,000,001 | 123-6020 | John | 123-45-6789 | CPBX #1 | Not Available |
| 0,000,000,002 | 123-6021 | Janet | 123-45-6788 | CPBX #1 | CPBX #1 |
| 0,000,000,003 | 123-6022 | Jack | 123-45-6787 | CPBX #1 | CPBX #2 |

*Figure 13A*

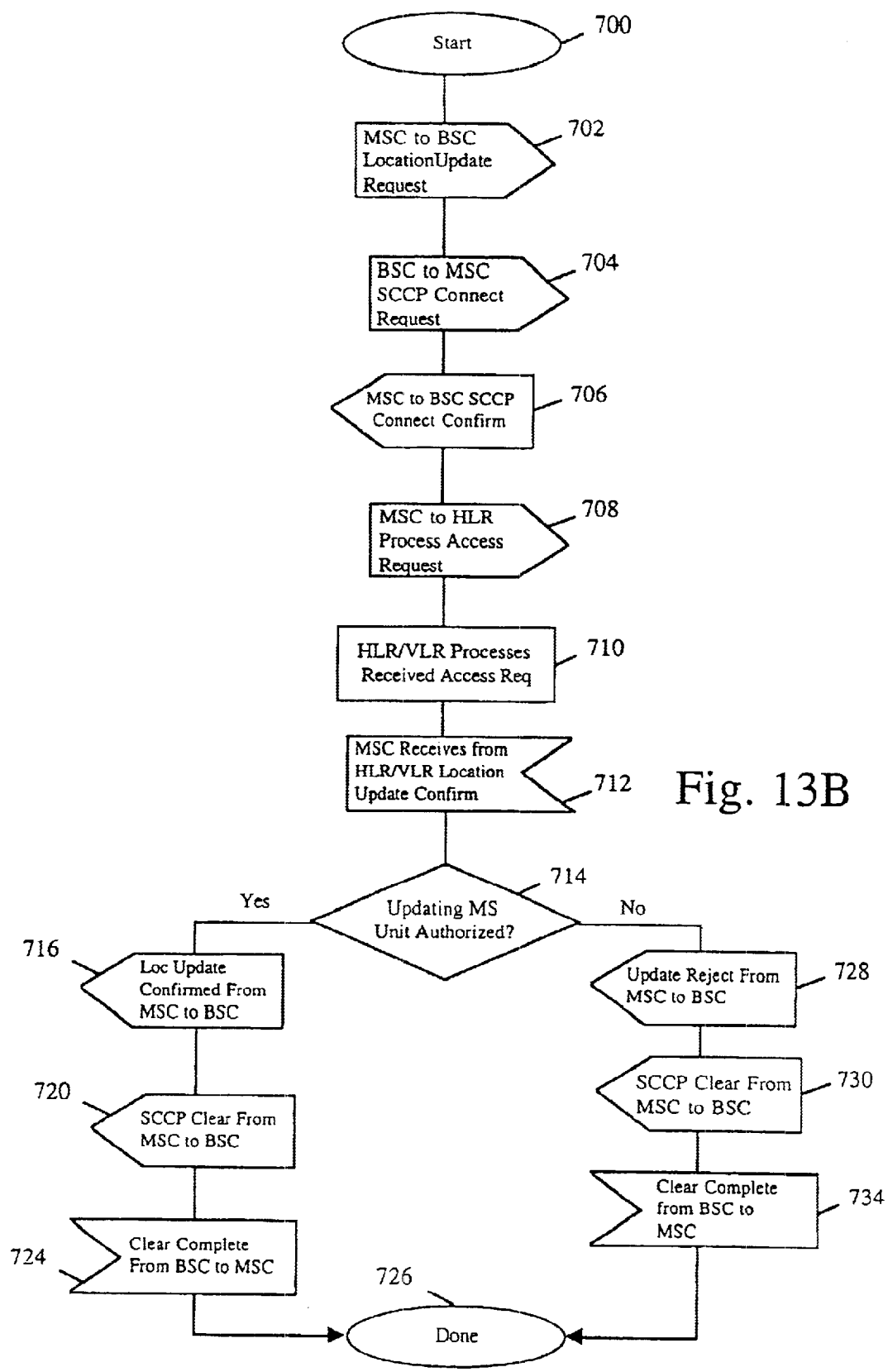

US 6,640,108 B2

CELLULAR COMMUNICATION SYSTEM

This continuation application claims priority to application Ser. No. 08/927,353, filed Sep. 11, 1997, now U.S. Pat No. 6,212,395.

For ease of reference, a glossary of terms and abbreviations is provided herewith as Appendix A.

BACKGROUND OF THE INVENTION

The present invention relates to apparatuses and methods for improving mobile communication. More particularly, the present invention relates to novel cellular private branch exchange apparatuses and methods that advantageously improve communication quality and network bandwidth, while simplifying implementation, maintenance, and upgrade.

Wired and wireless private branch exchanges (PBX's) are known in the art. FIG. 1 shows in a simplified diagram a wireless private branch exchange system (wPBX) of the prior art, including a wPBX 100. WPBX 100 is coupled to a line 102, which typically couples to a public network. WPBX 100 is further coupled to lines 104 and 106 as shown in FIG. 1. Line 104 is coupled to a base unit 108 while line 106 is coupled to another base unit, which is omitted from FIG. 1 for simplicity of illustration. Base unit 108 includes an antenna 110 to facilitate cordless communication with a plurality of cordless handsets 112 and 114. In the typical wireless wPBX system of the prior art, each base unit, such as base unit 108, typically controls two cordless handsets.

Although the wireless wPBX system of the prior art offers advantages associated with cordless handsets, there are several significant disadvantages. For example, a cordless handset in the prior art wireless PBX has no roaming capabilities. Roaming is not possible in the prior art wireless PBX, the cordless handsets do not have the capabilities to make the exchange between PBX's. This is partly because, in normal cordless applications, frequencies are not coordinated between wireless PBX systems.

To illustrate, consider the situation when cordless handset 112 travels outs of the range of base 108. When cordless handset 112 roams outside of the range of base 108, the data stream, whether it be voice or digital information, is cut off. This is because each cordless handset in the wireless wPBX of the prior art is associated with a particular base unit of a particular wPBX and cannot use the resources of any other base unit to make its calls. In wireless PBX systems, the telephone number is associated with a given frequency which is associated with a fixed port on the PBX. From the point of view of the PBX, therefore, the cordless handset is fixed to a PBX port just as in normal wired PBX's.

As mentioned earlier, cordless handsets of the prior art wireless PBX have no roaming capabilities. Further, there are also no roaming or hand-off capabilities in the wireless PBX units, e.g., wPBX 100, since prior art wireless PBX's do not possess the capabilities to coordinate with other PBX's to perform the roaming function. In other words, even when wPBX 100 is interconnected in a wPBX network, cordless handset 112 cannot be taken to another location controlled by another wPBX unit and make and receive calls and be associated with the same phone number without having to undergo administrative moves and changes, e.g. reprogramming the wPBX itself. Consequently, the range of each cordless handset is limited by the range of the base unit of the prior art wPBX with which it is specifically associated.

Another disadvantage of the prior art wireless wPBX systems of the prior art involves the use of low-power and proprietary transceivers, which significantly limit the range from which a cordless handset can be taken from its associated base.

Further, when calls are made among cordless handsets of the same wPBX, the call paths are typically switched, or cross-connected, at the wPBX level. In other words, the actual switching is centralized at the prior art wPBX even if cordless handsets of the same base unit desire to communicate among themselves, e.g., between cordless handsets 112 and 114. When calls are always switched at the highest level of the hierarchy, call paths to and from the cordless handsets are oftentimes unnecessarily back hauled all the way to the highest level, i.e., the wPBX, although it may be more efficient to cross connect closer to the cordless handsets, i.e. at a base unit at a lower level of the hierarchy. This is because wPBX unit 100 of the prior art lacks the intelligence necessary to delegate the switching function from wPBX unit 100 down to subsystems below it in the hierarchy, e.g., to base 108.

From the perspective of wPBX 100 or the public network to which link 102 is coupled, the fact that cordless handsets 112 and 114 communicate with base 108 in a cordless manner is irrelevant. Since there is no roaming and no hand-off capabilities between bases or wPBX's, the manner in which cordless handsets 112 and 114 are coupled to base unit 108 does not provide the user with any additional advantages besides the fact that cordless handsets 112 and 114 may be made cordless inside the range defined by the transceiver within base unit 108. Because of these limitations, the radius of operation of the prior art cordless handsets is typically limited to around 200 meters.

What is desired is an improved method and apparatus for providing mobility via standardized mobile handsets. To facilitate greater range, it is desirable that the improved method and apparatus employs cellular technology for the transmission of voice and data to and from the mobile handsets. To further increase range, the improved method and apparatus preferably permits its mobile handsets to roam among location areas in its domain. Furthermore, the improved method and apparatus preferably performs mobility management, call control, and radio resource management of its mobile handsets in a manner that is transparent to the public network to which it may be connected.

Furthermore, it is preferable that the improved method and apparatus avoids the unnecessary back hauling of data traffic to upper levels of the hierarchy merely for the purpose of accomplishing the cross connection. To improve the system bandwidth, it is preferable to cross connect call paths in an optimum manner at lower levels of the hierarchy. For ease of implementation, maintenance, and upgrade, it is desirable that the improved method and apparatus be implemented in a highly modular and scalable manner.

SUMMARY OF THE INVENTION

The invention relates to a cellular private branch exchange for facilitating cellular communication for a first plurality of MS units, which includes a first BSS for communicating with a first and a second MS unit of the first plurality of MS units on respectively a first and a second cellular bearer data channel. The cellular private branch exchange further includes a cPBX unit coupled to the first BSS. In turn, the cPBX unit includes a private MSC for providing mobility management for the first plurality of MS units, the private MSC representing a first cross-connect node capable of cross-connecting the first bearer data channel with the second bearer data channel for calls between the first and the second MS units. Further the cPBX unit includes a private registry coupled to the private MSC, the private registry storing subscriber information pertaining to the first plurality of MS units.

In one embodiment, a call path between the first and the second MS units, including the first bearer data channel and the second bearer data channel, for the calls between the first and the second MS units does not get TRAUed, or rate adapted, if the first and the second MS's communicate at the same rate.

In another embodiment, the invention relates to a cellular private branch exchange network for facilitating cellular communication among a first plurality of mobile stations implementing a first standard, which includes a private mobile services switching center for providing mobility management for the first plurality of mobile stations. The inventive cellular private branch exchange network further includes a private registry coupled to the private mobile services switching center for storing subscriber information regarding the first plurality of mobile stations.

Further, the inventive cellular private branch exchange network includes a private branch exchange unit coupled to the private mobile services switching center and the private registry for providing PBX functions for the first plurality of mobile stations, wherein the private mobile services switching center provides mobility management only for the first plurality of mobile stations, the private mobile services switching center performs cross connection of call paths only for calls among the first plurality of mobile stations, and the cellular private branch exchange network inhibits a second plurality of mobile stations implementing the first standard and not registered with the private registry from using resources of the cellular private branch exchange network for communication regardless whether the second plurality of mobile stations are authorized to communicate using a public network in the same geographic area.

In yet another embodiment, the inventive cellular private branch exchange network further includes a plurality of base station controllers coupled to the private mobile services switching center, the private mobile services switching center provides roaming and handoff capabilities for the first plurality of mobile stations when a first selected ones of the first plurality of mobile stations roam among location areas controlled by the plurality of base station controllers.

These and other features of the present invention will be presented in more detail in the following specification of the invention, the figures, and the appended claims.

BRIEF DESCRIPTION OF THE DRAWINGS

Additional advantages of the invention will become apparent upon reading the following detailed description and upon reference to the drawings, in which:

FIG. 11 shows in a simplified format different possible configurations that a single modular system chassis may have in accordance with one aspect of the present invention;

FIG. 13A shows in a simplified format a HLR/VLR registry;

FIG. 13B shows in a simplified flowchart format the steps involved when an MS unit wishes to update its location with a private HLR/VLR registry of a private cPBX network;

DESCRIPTION OF THE PREFERRED EMBODIMENT

Figure 2:
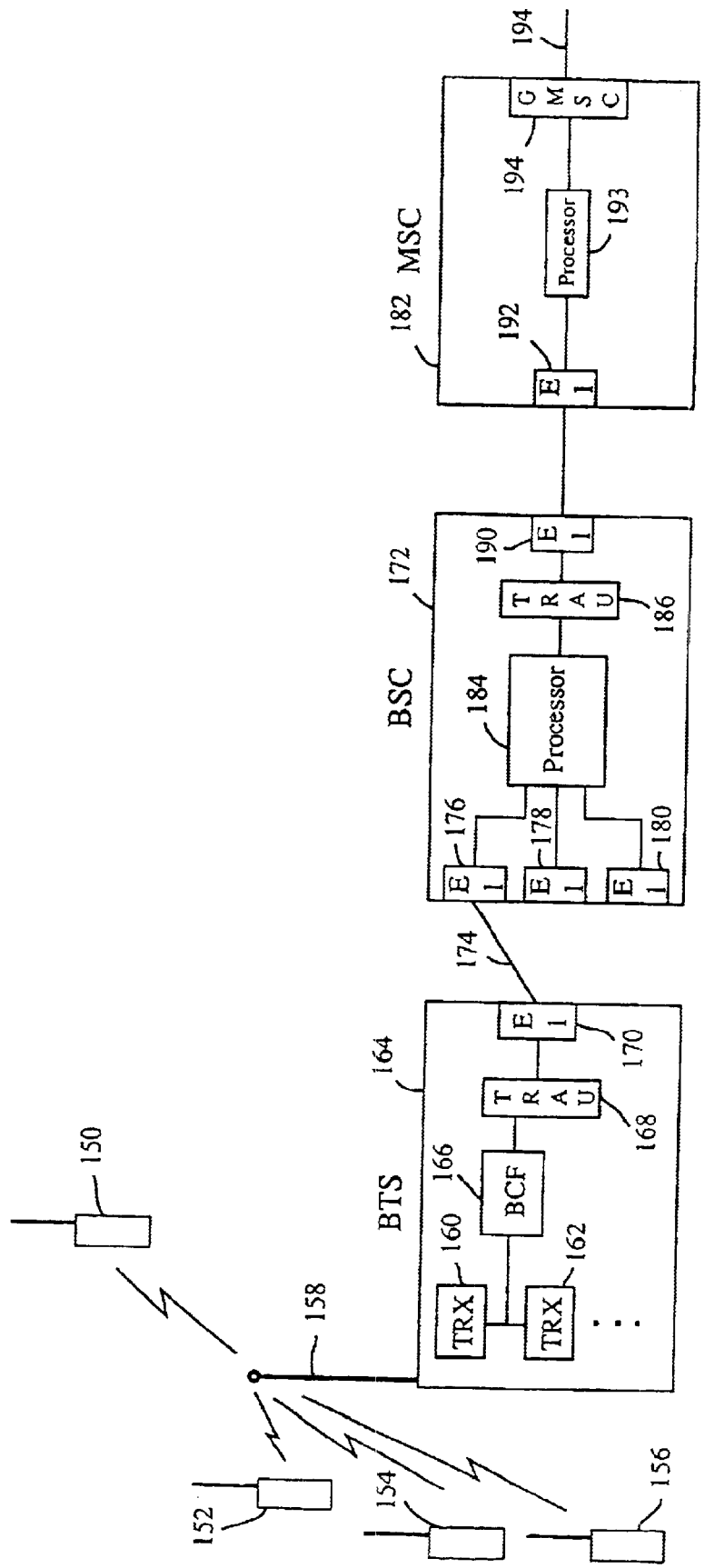
FIG. 2 shows in a simplified format a representative cellular communication system.

FIG. 2 shows in a simplified format a representative cellular communication system. For illustration purposes, a cellular communication system for use with the Global Systems for Mobile Communication (GSM) protocol is shown in FIG. 2. Referring to FIG. 2, there are shown four mobile station units (MS), also known as cellular handsets, 150, 152, 154, and 156, which communicate to an antenna subsystem 158. As is known to those familiar with the GSM protocol, MS's 150–156 typically communicate with antenna subsystem 158 via a radio link (RL) protocol. As is known, the radio link (RL) protocol is a LAPD-M protocol at GSM layer 2 and is defined by standard GSM 08.58.

Antenna subsystem 158 couples to transceiver units (TRX) 160 and 162 of base transceiver station (BTS) unit 164 as shown. Each of TRX's 160–162 outputs bearer data, which may be 8 Kbits per second (Kbps) or 16 Kbps (GSM) time division multiplexed (TDM) data representing, for example, voice conversations, facsimile, digital data, and the like. A TRX also outputs signaling information which is packet information that is forwarded either to antenna subsystem 158 for transmitting to the MS's or to a base station control function (BCF) 166 for communicating with a base station controller (BSC) or a mobile services switching center (MSC). The mobile services switching center (MSC) will be discussed later herein.

From the GSM point of view, each of MS's 150–156 contains hardware and software that can handle from its end functions such as radio resources control (RR), mobility management (MM), call control (CC), short message service (SMS), and supplemental services (SS). Base control function (BCF) 166 is coupled to a transcoder-rate adapter unit (TRAU) 168 for switching between either 8 Kbps or 16 Kbps to 64 Kbps TDM data before being passed on to the BSC. A transcoder-rate adapter unit (TRAU) is used for performing rate conversion, or rate adaptation, between MS units communicating at different rates.

TRAU unit 168 is coupled to an E1 module 170 of BTS unit 164. E1 module 170 represents the means by which BTS unit 164 can communicate with a base station controller (BSC) unit 172. In one embodiment, E1 module 170 represents a 2.048 Mbits signaling wired interface that is channelized into 64K bits channels. BCF 166 represents a CPU module that runs the software to handle provisioning of the TRAU or E1 resources at the request of base station controller (BSC) 172.

In the prior art, BTS unit 164 is essentially a "dumb" subsystem that operates responsive to commands from BSC unit 172. For example, when BSC 172 first powers up, it will configure BTS unit 164 via a link 174 by down loading the configuration data across link 174. Link 174 represents the terrestrial link that carries the TDM data between BTS unit 164 and BSC unit 172, typically using an interface known as Abis.

A BSC unit may have multiple E1 modules for communicating with multiple BTS's. For example, BSC unit 172 is shown having 3 E1 modules 176, 178, or 180 for communicating with 3 or more BTS's. Furthermore, although BTS 164 shows only two transceiver units 160 and 162 for illustration purposes, it should be understood that a typical BTS unit may have any number of transceiver units.

Functionally speaking, the job of BSC unit 172 is radio resource (RR) control. It manages certain requirements regarding the status and location of the mobile stations and details regarding how to communicate with the mobile stations in the appropriate modulation scheme. In this manner, BSC unit 172 helps to hide this level of detail from any components upstream, e.g., mobile services switching center (MSC) 182 or the public network that is upstream from MSC 182. BSC unit 172 also handles power control. BSC unit 172 directs BTS unit 164 and a transceiver unit therein to increase or decrease its transmission power from a handset to improve transmission quality.

Furthermore, BSC unit 172 also monitors handset communication quality to prepare for power hand-overs, e.g., when one of the handsets roams among the different areas controlled by different BTS's. When a hand-over is eminent, BSC unit 172 further initiates the hand-over. The intra BSC hand-over of the prior art ensures that communication for a single circuit between a given mobile station and MSC unit 182 remains uninterrupted during handover.

BSC unit 172 further includes processor 184 for handling the aforementioned radio resource control (RR), optional TRAU unit 186, and an E1 module 190. E1 module 190 provides the means through which BSC unit 172 can communicate with MSC unit 182.

MSC unit 182 may communicate with any number of BSC unit 172 and includes, among other things, an E1 module 192, a processor 193, and a gateway MSC unit 194. GMSC unit 194 facilitates communication between the cellular communication system of FIG. 2 and the outside world, e.g., the public network. GMSC 194 is coupled to a link 194 for communicating with the public network. As is known, the communication between MSC 182 and the public network may be performed via the E interface.

As is also known to those familiar with the GSM specification, MSC unit 182 further include circuits to handle mobility management (MM), call control (CC) short message service (SMS), and other supplemental services (SS). Optionally, MSC unit 182 performs some radio resource (RR) handling, e.g., inter BSC and inter MSC hand-overs. Inter BSC occurs when a mobile station roams among the BSC's. In this case, the radio resource control must be handled by the upstream MSC since a BSC would not know how to hand-over to another BSC when the mobile station roams from a BSC to another BSC.

Figure 3A:
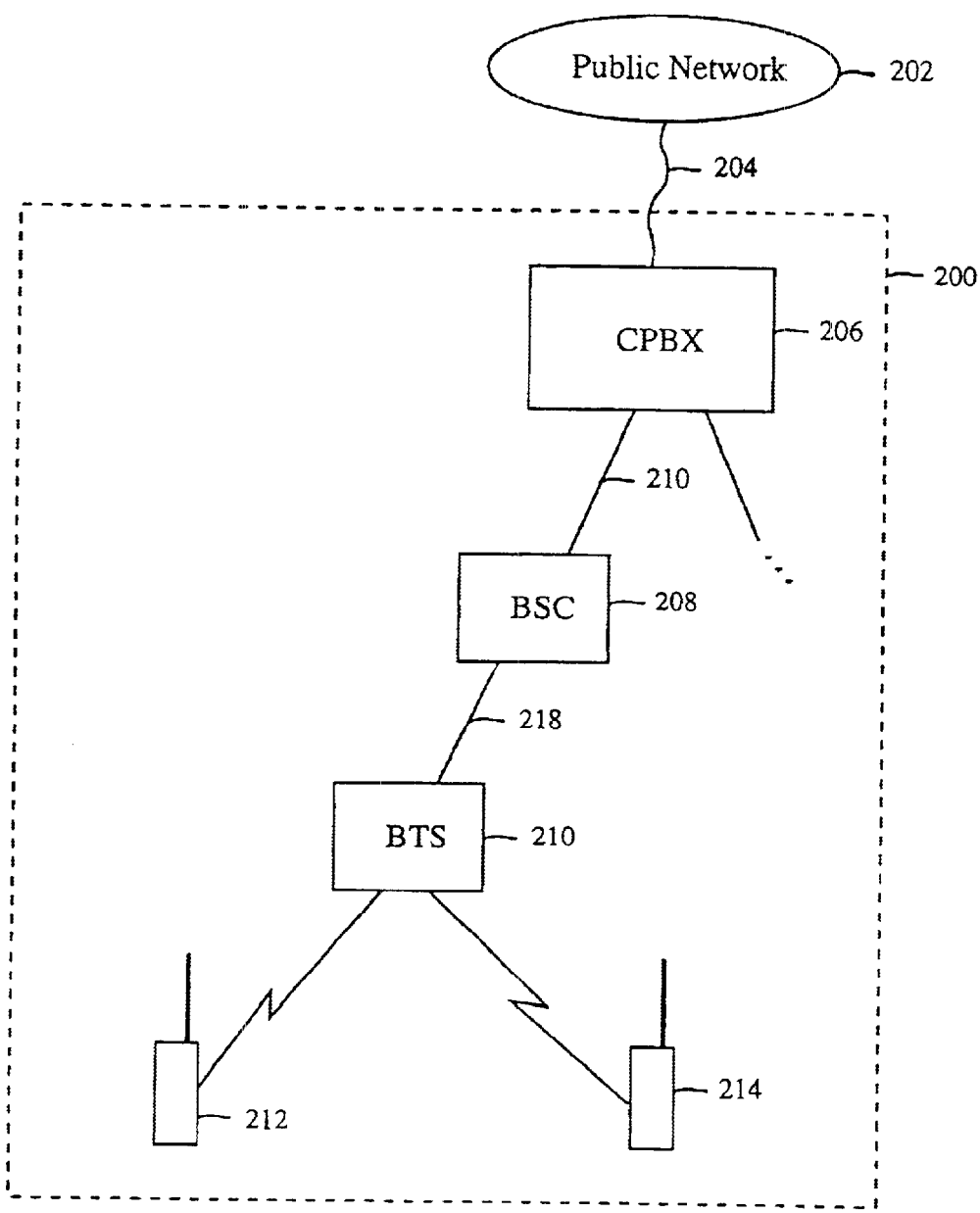
FIG. 3A shows in a simplified format a stand-alone cellular cPBX system in accordance with one aspect of the present invention.

FIG. 3A shows in a simplified format a stand-alone cellular cPBX system in accordance with one aspect of the present invention. Cellular cPBX (cPBX) offers a cellular solution to rural areas or other environments such as factories or office complexes where mobility is important or where there is no readily available access to the public network.

Referring now to FIG. 3A, there is shown a stand-alone cPBX network 200. Stand-alone cPBX network 200 may be coupled to a public network 202 via a connection 204. The coupling between stand-alone cPBX 200 and public network 202 may be accomplished, in one embodiment, via an E1 interface which may represent a wired a microwave link.

The coupling between stand-alone cPBX network 200 and public network 202 is, however, optional and is provided only if access to the public network is desired. In other words, stand-alone cPBX network 200 has sufficient resources to perform switching and communication management among its handsets without assistance from the public network. If linked to a public network, stand-alone cPBX network 200 appears to public network 202 simply as another wired PBX. Advantageously, the mobility, roaming, and hand-off capabilities are handled by the resources within stand-alone cPBX network 200 without the intervention of public network 202. In accordance with one aspect of the present invention, additional resources or features may be added to the private cPBX network without requiring corresponding changes in the public network.

Within stand-alone cPBX network 200, shown are a cPBX subsystem 206, a BSC subsystem 208 and BTS subsystem 210, and MS units 212 and 214. As will be discussed later, cPBX subsystem 206, BSC subsystem 208 and BTS subsystem 210 represent the inventive and enhanced versions of the respective MSC, BSC and BTS of the prior art.

MS units 212 and 214 represent standard cellular handsets which are GSM standard handsets in the preferred embodiment. MS 212 and 214 communicate with BTS subsystem 210 via an appropriate cellular interface such as the aforementioned radio link (RL) interface. The typical radius of operation between each MS unit and a BTS subsystem is in the range of 2 to 3 Kilometers, which is substantially greater than the 200 meter range typically offered by the prior art wireless wPBX. The additional range offered by the cellular cPBX of the present invention represents a significant advantage because it is difficult, as is well known to those skilled in the communication art, to scale up the distance offered by the prior art wireless bases and cordless handsets due to interference problems inherent in the prior art cordless technology.

Each cPBX subsystem 206 is capable of coupling to more than one BSC subsystem 208. BSC subsystem 208 communicates with cPBX subsystem 206 via link 216 using, for example, an A interface. Similarly, each BSC subsystem 208 is capable of coupling to more than one BTS subsystem 210. BTS subsystem 210 is coupled to BSC subsystem 208 via link 218 utilizing, for example, Abis interface. Further, each BTS subsystem 210 is capable of coupling to a number of MS units, of which only two are shown. In this manner, stand-alone cPBX network 200 is organized in a hierarchy, the top of which is occupied by cPBX subsystem 206. Depending on system configuration, the stand-alone cPBX configuration shown in FIG. 3A can handle as few as 7 simultaneous calls up to as many as 1,000 (correlating to up to 10,000 MS's)

It should be understood that the drawing of FIG. 3A is a functional representation and that the different components of the stand-alone cPBX network 200 may either be integrated to co-locate at the same location or on a single chassis or dispersed in a wide geographic area to increase the domain of the private network. The ability to configure a physical chassis to perform individual BTS, BSC, or cPBX function, or any combination of these subsystems, represents a unique advantage of the present invention.

As will be discussed later, the components of stand-alone cPBX network 200 are designed such that they can be added or removed from stand-alone cPBX network 200 in a modular fashion. In this manner, a scalable stand-alone cPBX network may be realized, whose capabilities may be expanded or shrunk as necessary to fill the need of a particular site.

In the stand-alone cPBX configuration, each MS unit, e.g., MS units 212 and 214, is registered with and recognizable by cPBX subsystem 206. More particularly, the information associated with each MS unit is registered in a home location registry (HLR) in cPBX subsystem 206. The registration of an MS unit with the HLR registry in cPBX subsystem 206 permits that MS unit to utilize the resources of stand-alone cPBX network 200. For example, a registered MS unit may make calls via BTS subsystem 210, BSC subsystem 208, and cPBX subsystem 206 to a telephone set in public network 202. Alternatively, MS unit 212, being an MS unit that is registered with the HLR registry within cPBX subsystem 206 may make a local call to another MS unit also registered with the HLR registry within cPBX subsystem 206, e.g., MS unit 214 via BTS subsystem 210. When an MS unit is registered with the HLR registry in cPBX 206, it may also receive a call, whether from public network 202 or from another MS unit that is registered with the same HLR registry.

In the stand-alone cPBX configuration of FIG. 3A, a standard GSM handset that is not registered with the HLR registry within cPBX subsystem 206 is deemed a non-native handset and cannot use the resources of stand-alone cPBX network 200 to make or receive calls. Advantageously, control over the resources of the private stand-alone cPBX network is enhanced, permitting the operator to more precisely tailor the private network resources to the number of MS units that are registered without worrying that an influx of non-native handsets may overwhelm the existing private network resources. Further, the stand-alone cPBX may also advantageously challenge the handset for authorization, thereby improving security.

In accordance with one aspect of the present invention, each of BTS subsystem 210, BSC subsystem 208, and cPBX subsystem 206 is furnished with intelligent cross-connect capability. Consequently, the actual cross-connect that builds the connection between the calling MS unit and the receiving MS unit may be distributed down from cPBX subsystem 206, e.g. to BSC subsystem 208 or BTS subsystem 210. For example, MS units 212 and 214 may be cross-connected at a lower level in the hierarchy, e.g., BTS subsystem 210, instead of at a higher level, e.g., at cPBX subsystem 206. If the call is made between MS units controlled by the same BSC subsystem, e.g., BSC subsystem 208 but different BTS subsystems, the cross-connect switching may be performed at BSC subsystem 208 instead of at cPBX subsystem 206. In this manner, the channels containing the bearer data between MS units do not always have to be back-hauled all the way to cPBX subsystem 206.

The intelligence switch capability in the subsystems of stand-alone cPBX network 200 permits the entire network to handle more traffic by freeing up the bandwidth leading to cPBX subsystem 206 if the required cross-connect between channels carrying bearer data could be performed by a component further down the hierarchy.

In the prior art cellular systems, cross-connection among call paths is centralized at a central public mobile services switching center. In the prior art, all circuits between the BTS and MSC are TRAUed before the MSC and all MSC cross connect functions are performed at 64 Kbps. This necessitates two TRAUing functions to be performed for calls between two 16 Kbps handsets controlled by the same MSC. In the present invention, the TRAU is advantageously associated with the gateway to the public network, and need not be employed for calls internal to the network. In accordance with one aspect of the invention, however, there is provided TRAU resource within the network to accomplish rate conversion when necessary, e.g. for calls between a 8 Kbps handset and a 16 Kbps handset.

In accordance with another aspect of the invention, it is observed that GSM standard MS units in stand-alone cPBX network 200 transmit and receive data at a predefined rate, say 8 Kbps or 16 Kbps. Since the channels carrying bearer data may be cross-connected by a subsystem within the inventive stand-alone cPBX network 200 instead of at the public MSC, it is often not necessary to TRAU the bearer data channels for calls between MS units within the stand-alone cPBX network 200. Consequently, the ability to cross-connect certain calls within the private network without TRAUing advantageously improves communication quality and reduces the computational overhead associated with TRAUing.

Figure 3B:
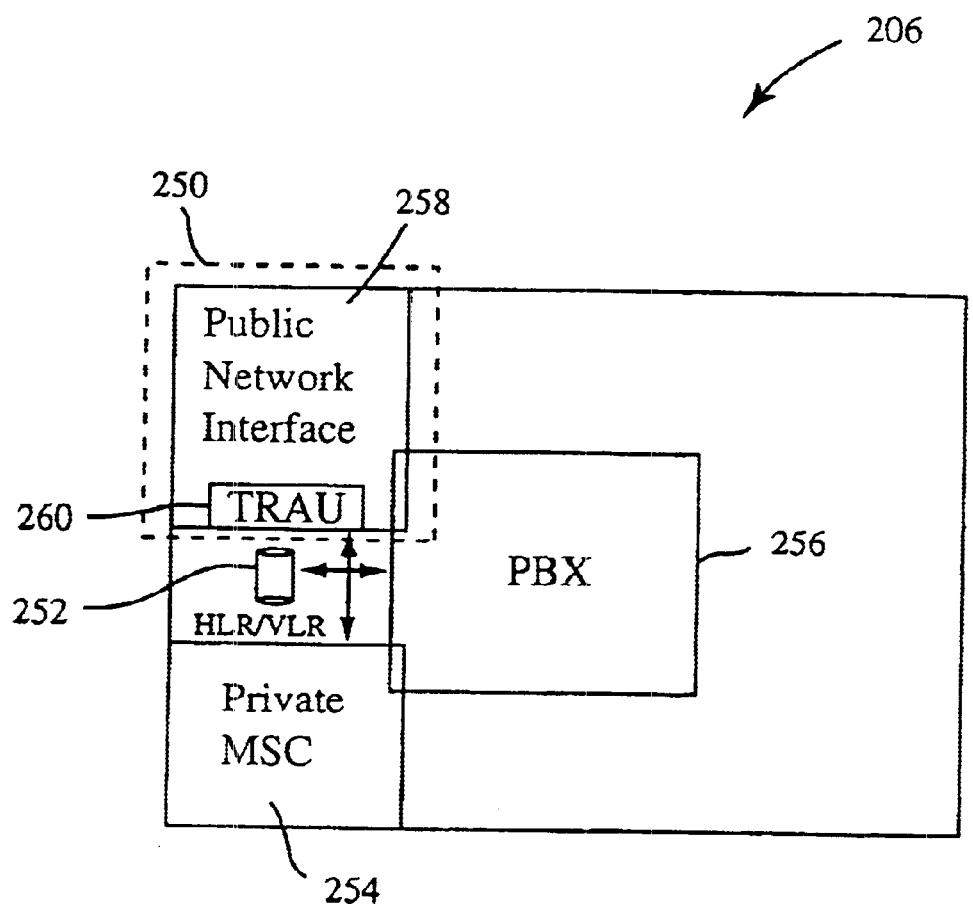
FIG. 3B shows in a symbolic format cPBX subsystem 206 of FIG. 3A.

FIG. 3B shows in a symbolic format cPBX subsystem 206 of FIG. 3A. Within cPBX subsystem 206, shown are a gateway MSC (GMSC) block 250, a registry 252 which contains both the home location registry (HLR) and the visitor location registry (VLR registry), a private MSC block 254 and a cPBX block 256. GMSC block 250 represents the interface for communicating with the public network, e.g., public network 202 of FIG. 3A. Within GMSC block 250, there is shown a public network interface 258 and a transcoder/rate adapter unit (TRAU) block 260. In one embodiment, public network interface 258 represents a trunk module which has been loaded with the appropriate software for communicating with the public network via standard interfaces such as ISDN, R2, and analog interfaces using inband or common analog signaling.

TRAU block 260 resides in GMSC block 250 to facilitate rate conversion to build a call between an MS unit of the stand-alone cPBX network and a telephone set in public network 202 of FIG. 3A. Rate conversion is necessary because a GSM MS unit and a public network typically transmits and receives data at different rates. It is important to note that the present invention eliminates the TRAUing function whenever possible for calls that are switched within the stand-alone cPBX network e.g., between MS units controlled by cPBX subsystem 206. In contrast, prior art cellular systems automatically provide TRAUing between the prior art BTS and the prior art MSC, either at the BTS, BSC, or between the BSC and the MSC.

In the prior art wireless wPBX, a registry is not necessary since cordless phones are associated with a particular base and do not roam from base to base. In contrast, a registry is preferably provided in the cellular network of the present invention to provide mobility management of the mobile handsets. Furthermore, the home location registry (HLR) and visitor location registry (VLR registry) are preferably integrated in registry 252 of the present invention.

Registry 252 of cPBX network 200 of FIG. 3B serves, among others, to keep track of MS units that are authorized to use the resources of the stand-alone cPBX network, the subscriber data such as names, unique identification information such as is kept in subscriber information module (SIM) for GSM handsets, telephone numbers associated with the MS units, and the like. Subscriber information is kept track of because stand-alone cPBX network 200 must keep track of the MS units controlled by it as well as the subscribers on its network find the handsets.

PBX block 256 handles supplemental services (SS) that may be offered by stand-alone cPBX network 200. Furthermore, PBX block 256 handles the call control (CC) function, which includes the ability to intelligently understand the destination intended for the telephone number dialed. In one embodiment, the destination intended for the number dialed is determined in accordance to a numbering system. By way of example, extensions 2000 to 6000 may indicate a destination MS unit inside stand-alone cPBX network 200, while other numbers dialed may indicate calls that must be routed to telephone sets in the public network. PBX block 256 may also contain circuits for performing functions typically expected of a PBX system such as call forwarding, call transfer, and the like.

Private MSC block 254 handles mobility management (MM) and with the help of the PBX (256) radio resource (RR) management. The PBX 256 handles call processing (CC) and Supplemental Services (SS) via the MM session and assists with RR by forwarding calls between cPBX's for handsets that have roamed into the coverage area of other cPBX's or need to be handed over to another cPBX.

Switching decisions are made by the PBX 256. However, in hybrid applications (discussed later in connection with FIG. 7), the private MSC 254 may listen to messages sent across the MM session to decide whether or not it should act as a BSC. When acting as a BSC, the PBX function is bypassed, the circuit cross connect function to public MSC is made by the private MSC function.

The intelligence within the private PBX block 256 may decide that switching may be more efficiently performed at a BSC or BTS further down the hierarchy. In this case, there is a signaling connection between the MS units and the cPBX for CC and SS control via the private MSC MM session. However, the switched voice/data path for the call will not traverse the cPBX, but will be cross connected by the BSC's and/or BTS's further down the hierarchy.

Figure 4A:
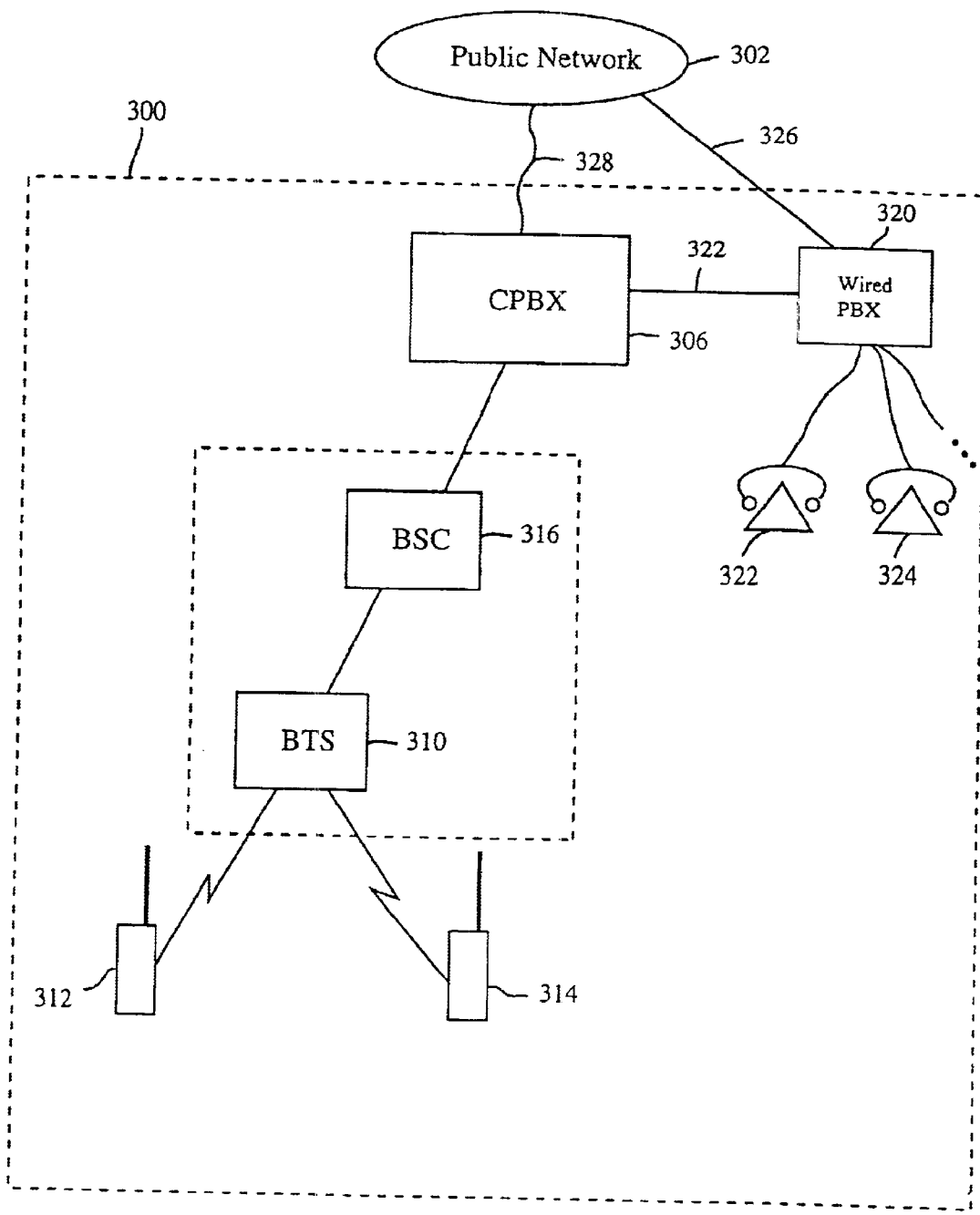
FIG. 4A shows in a simplified format a stand-alone cellular cPBX system having a wired PBX adjunct in accordance with one aspect of the present invention.

FIG. 4A shows in a simplified format a stand-alone cellular cPBX system having a wired PBX adjunct in accordance with one aspect of the present invention. The stand-alone cPBX having a wired PBX adjunct configuration of FIG. 4A advantageously takes advantage of the networking capabilities of existing wired PBX's management of wired phones, while providing mobility for some handsets and makes those handsets part of a single private network (including wired and cellular PBX's). In one embodiment, a cPBX network, such as that shown in FIG. 3A, may be coupled with an existing wired PBX through standard interfaces to form a stand-alone cPBX with a wired PBX adjunct such as that shown in FIG. 4A.

In one configuration, the cellular cPBX portion appears to the existing wired PBX simply as another wired PBX within the private network. Referring now to FIG. 4A, there is shown a private network 300 comprising cPBX subsystem 306, BSC subsystem 316, BTS subsystem 310 and MS units 312 and 314. BSC subsystem 316, BTS subsystem 310 function in substantially the same way as the corresponding subsystems in the configuration of FIG. 3A.

CPBX subsystem 306 is coupled to a wired PBX unit 320 via a link 322. CPBX subsystem 306 is also optionally coupled to public network 302 via optional link 328 which again may be a hard-wired or a microwave link. The communication between cPBX subsystem 306 and wired PBX unit 320 is typically accomplished using known, ISDN-like protocol s, the specifics of which depend on the requirements of cPBX subsystem 306 and wired PBX unit 320. Wired PBX unit 320 is physically coupled to one or more telephone sets 322 and 324 as is well known in the wired PBX art. Further, wired PBX unit 320 is also coupled to public network 302 using a link 326. It should be noted that link 322 and 326 may be implemented as hard-wired or microwave links depending on need.

It should be noted that although FIG. 4A shows only one wired PBX unit 320 coupled to cPBX subsystem 306, there may be any number of wired PBX units or cPBX subsystems in a network of wired and cellular cPBX's.

In the configuration of FIG. 4A, calls between MS's 312 and 314 to public network 302 may be made either through links 322 and 326 or optionally directly via link 328. In one implementation of FIG. 4A, optional link 328 may be omitted altogether. When so configured, wireless capabilities via a CPBX subsystem 306 may be added to an existing wired PBX system without having to create a new connection to public network 302.

Advantageously, calls made between telephones and handsets that are completely within private network 300 may be made via cPBX subsystem 306 and wired PBX unit 320 without the need to be routed through public network 302, thereby increasing the bandwidth of private network 300 by reducing the traffic on link 326 or optional link 328. Furthermore, when resources of public network 302 are not utilized in making calls between handsets and telephones within private network 300, cost savings could be realized as the public network will not bill for the call. As an example, when MS 312 wants to build a call to telephone set 322, the bearer data path may be made through BTS subsystem 310, BSC subsystem 316, cPBX subsystem 306, link 322, wired PBX unit 320, and telephone set 322.

In a private network (whether stand-alone cPBX or stand-alone cPBX/wired PBX adjunct) there is typically a numbering system that allows a PBX to read a dialed telephone number and ascertain the destination based on the number dialed. For example, extension numbers 2000–4000 may represent MS's on cPBX subsystem 306 while extension 4001–6000 may represent telephone sets on wired PBX unit 320. In one embodiment, cPBX 306 and wired PBX 320 may both share a numbering system but not necessarily share the subscribing information regarding the MS's or telephone sets controlled by each.

Figure 4B:
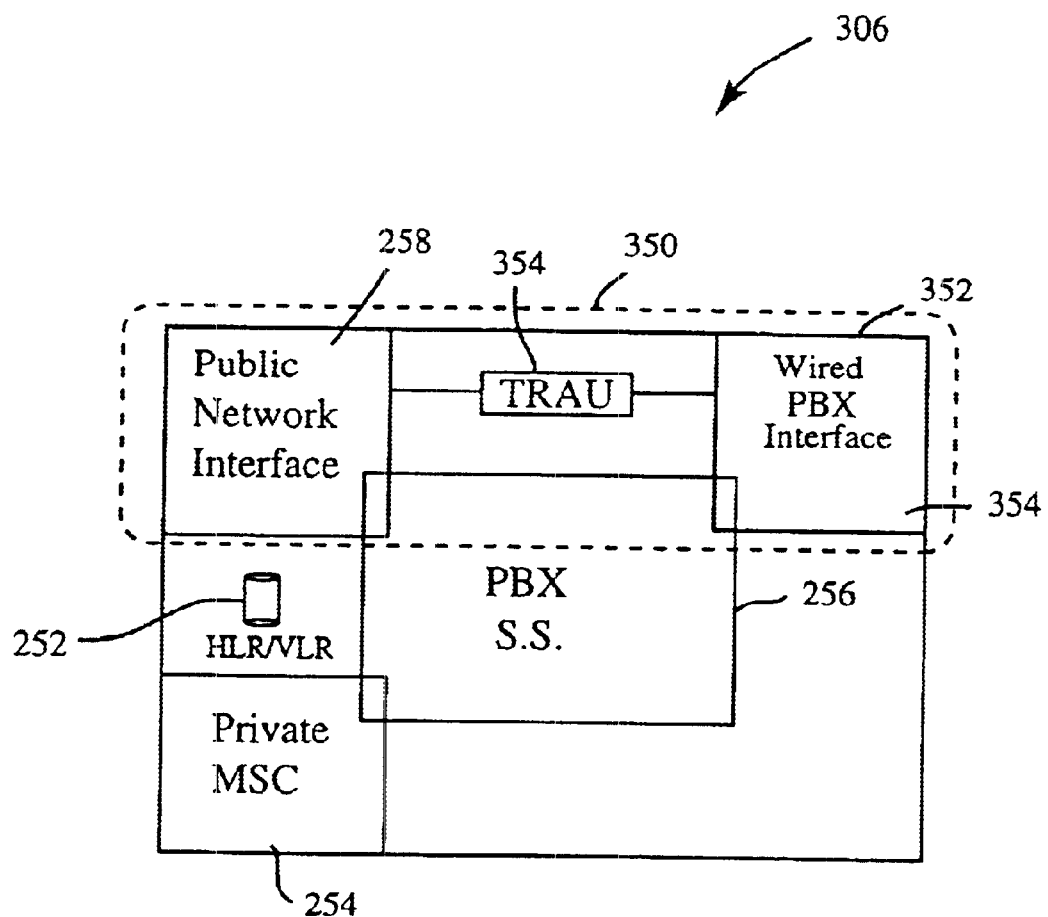
FIG. 4B shows in a simplified format a cPBX subsystem in accordance with one aspect of the present invention.

FIG. 4B shows in a simplified format cPBX subsystem 306 of FIG. 4A. Within cPBX subsystem 306, shown are a gateway MSC (GMSC) block 350, a registry 252, a private MSC block 254, and a PBX block 256. GMSC block 350 represents the interface for communicating with networks which are external to the cPBX, e.g., the public network or the wired PBX. Within GMSC block 350, there is shown a public network interface 258 and a wired PBX interface 352. It should be noted that cPBX subsystem 306 may include one or more wired PBX interface 352 for communicating with one or more wired PBX's.

GMSC interface 352 typically includes a transcoder-rate adapter unit (TRAU) block 354 to facilitate rate conversion when it is necessary to build a call between an MS unit, e.g., MS unit 312 of FIG. 4A with a telephone set within the wired PBX domain, e.g., telephone set 322 of wired PBX 320, or with a telephone set in the public network, e.g., public network 302 of FIG. 4A. Rate conversion may be necessary because a GSM MS unit and a telephone set in the wired PBX domain typically transmit and receive data at different rates.

Wired PBX interface 352, like public network interface 258, is typically implemented via a trunk interface module. By appropriately loading the software to enable a trunk interface module to implement a specific protocol a trunk interface module may be programmed to perform the functions of a public network interface or a wired PBX interface as needed.

Figure 5A:
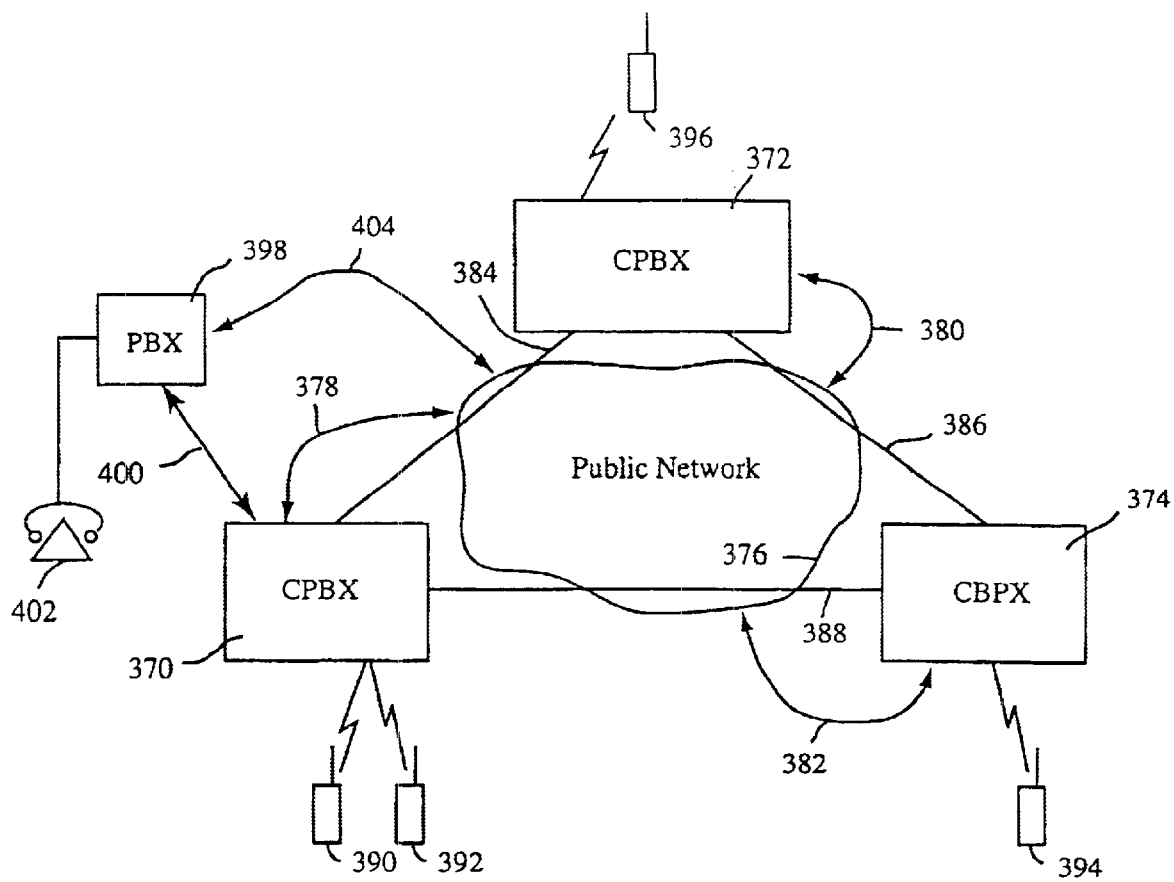
FIG. 5A shows one implementation of a multi-site cPBX overlay network in accordance with one aspect of the present invention.

In the multi-site configuration, multiple cPBX's are coupled together to form an overlay network on top of the public network. FIG. 5A shows one implementation of a multi-site cPBX overlay network including cPBX subnetworks 370, 372, and 374. Although not explicitly shown, it should be understood that each cPBX subnetwork has within it a cPBX subsystem, one or more BSC subsystems, one or more BTS subsystems, and a plurality of handsets.

There is also shown a public network represented symbolically by outline 376. As shown in FIG. 5A, cPBX subnetworks 370, 372 and 374 are coupled with one another via links 384, 386 and 388, forming a private overlay network. Links 384, 386, and 388 may represent leased link lines which may be part of public net 376 or, as is sometimes the case, an alternate private party net, permitting the cPBX subnetworks of the private multi-site network to communicate with one another. Communication among the cPBX subnetworks of the multi-site cPBX overlay network via links 378, 380, and 382 is typically accomplished using a cPBX protocol or versions of known protocols suitable and/or readily adaptable by those of ordinary skills in the art for use by the disclosed inventive cPBX. CPBX subnetworks 370, 372, and 374 further couple with respective bidirectional links 378, 380, and 382 respectively for communicating directly with the public network 376.

FIG. 5A also shows two MS units 390 and 392 within the domain of cPBX subnetwork 370. For illustration purposes, MS units 390 and 392 are considered home with respect to cPBX subnetwork 370. There is also shown in FIG. 5A an MS unit 394 within the domain of cPBX subnetwork 374 which considers cPBX subnetwork 374 its home. In the multi-site configuration, calls between MS units 390 and 392, whether cross-connected at the BTS, the BSC, or the cPBX subsystem level within cPBX subnetwork 370 are preferably connected in the manner discussed earlier in connection with the stand-alone configuration of FIG. 3A.

Further, there is preferably a numbering system for efficiently identifying which cPBX subnetwork in a multi-site network a destination MS unit considers its "home". Although such numbering system is not absolutely necessary, it facilitates the efficient routing of calls among cPBX subnetworks in a multi-site cPBX overlay network. By way of example, MS's on cPBX 370 may be associated with extensions 1000–2000, on cPBX 374 with extension 2001–3000, and on cPBX subnetwork 372 with extension 3001–4000.

The use of a numbering system permits calls between MS unit 390 and MS unit 394 to be made in the manner similar to the manner in which calls between MS unit 312 and telephone set 322 of FIG. 4A are made. Further, the sharing of a common numbering system permits each of cPBX subnetworks 370, 372, and 374 to recognize calls as within the private multi-site cPBX overlay network and to route such calls appropriately. As will be discussed later, cPBX subnetworks 370, 372, and 374 also share subscriber information to permit roaming that permit MS's to roam among the domain of the cPBX subnetworks of the network.

FIG. 5A also shows an MS unit 396 in the domain of cPBX subnetwork 372. MS unit 396 represents an MS that has roamed away from its home cPBX subnetwork 370 and currently uses the radio resources associated with cPBX subnetwork 372 for its communication needs. When a telephone set from an adjunct wired PBX or a telephone within public network 376, wishes to call MS unit 396, the call path from public network 376 is typically connected to the cPBX subnetwork that the destination MS, i.e., MS unit 396, considers home. In this case, the call path will be connected to cPBX subnetwork 370 via link 378 or 400 and then forwarded to cPBX subnetwork 372 via link 384 to terminate the call at MS unit 396, which has roamed away from its home location area (of cPBX 370) into the location area controlled by cPBX subnetwork 372.

From the perspective of public network 376, the fact that MS unit 396 has roamed away from its home cPBX subnetwork is immaterial. Calls from public network 376 still come in on the cPBX subnetwork that MS unit 396 normally considers home. Internal forwarding, e.g., forwarding of calls from public network 376 by cPBX subnetwork 370 to cPBX subnetwork 372, is done internally within the multi-site cPBX overlay network without the knowledge of public network 376.

To provide for roaming capabilities among cPBX subnetworks within the multi-site cPBX overlay network, the HLR/VLR registry of the cPBX subnetworks are duplicated among each another. Further, each HLR/VLR registry of each cPBX subnetwork also knows the MS units that are considered home to it. In this manner, when MS unit 394 wants to build a call to MS unit 396, it may not need to first build a call to the home cPBX subnetwork of the destination MS, i.e., cPBX subnetwork 370. Instead, because the HLR/VLR registry of each cPBX subnetwork is duplicated among other cPBX subnetworks in the multi-site cPBX overlay network, the current location of MS unit 396 is known to cPBX subnetwork 374 and a call may be built directly between cPBX subnetwork 374 and cPBX subnetwork 372 via link 386 to establish communication between MS units 394 and 396.

FIG. 5A also shown a wired PBX 398 which is coupled to cPBX subnetwork 370 of the multi-site cPBX overlay network via a link 400 and to public network 376 via a link 404. Wired PBX 398 and cPBX subnetwork 370 are in a similar relationship as their respective counterparts in the stand-alone cPBX with wired PBX adjunct configuration shown in FIG. 4A. When a phone on wired PBX subnetwork 398, e.g., phone 402 wishes to call an MS unit in the multi-site cPBX overlay network, e.g., MS unit 394, it is preferable, but not necessary, to utilize links 400 and 388 instead of links 404 and 382 through public network 376. The ability of the present invention to use the resources of the private network to build calls between an MS unit in the multi-site cPBX network and phone 402 (or another MS unit) advantageously offloads switching from public network 376, reduces backhauling and charges that are typically associated with public network usage as well as improves the bandwidth of the public network.

As is apparent from FIG. 5A, each cPBX subnetwork in a multi-site cPBX overlay network may communicate with another cPBX subnetwork in the same network via a plurality of links. The ability to utilize more than one link to communicate among cPBX subnetworks advantageously improves network reliability and access via redundancy as well as flexibility of implementation. For example, if link 388 is removed from the configuration of FIG. 5A, e.g., due to equipment failure or if link 388 cannot be built, it is still possible for MS unit 394 to build a call to MS unit 390 via links 386 and 384 or links 382 and 378. This aspect of the invention is especially valuable in environments where it is difficult, due to geographical or legal considerations, to directly build physical links between certain cPBX subnetworks of the multi-site network.

Figure 5B:
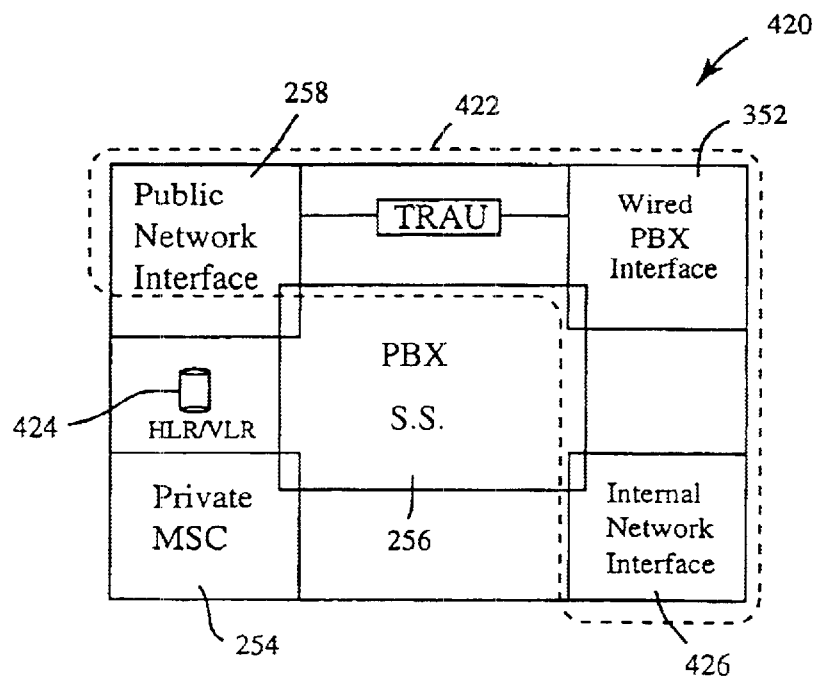
FIG. 5B shows in a simplified format a cPBX subsystem.

FIG. 5B shows in a simplified format a cPBX subsystem 420, representing a cPBX subsystem within, for example, cPBX subnetwork 370, cPBX subnetwork 372, or cPBX subnetwork 374. Within cPBX subsystem 420, there is shown a gateway MSC (GMSC) block 422, a registry 424, a private MSC block 254, and a PBX block 256. GMSC block 422 represents the interface for communicating with phones, whether MS's or a wired phone, that are outside of the domain of the cPBX associated with cPBX subsystem 420.

Furthermore, since the multi-site configuration permits its MS units to roam, it is important to keep track, in registry 424, of the home location of a given MS unit, i.e., the cPBX in the multi-site network that a particular MS unit considers its "home". In a multi-site cPBX overlay network, each registry contains not only information about the home handsets but also about handsets controlled by all other cPBX's in the network. When an MS unit roams from an area controlled by its home cPBX to an area controlled by another cPBX in the multi-site network, it is also necessary to keep track in registry 424 of the current location, e.g., the cPBX controlling the location area to which that MS unit has roamed to. Registry 424 contains the HLR/VLR registry within each cPBX subnetwork of the multi-site network. As discussed earlier, data within the HLR/VLR registry of each cPBX in the multi-site cPBX overlay network are duplicated among all cPBX's on the network to facilitate roaming.

Within GMSC block 422, there is shown a public network interface block 258 and a PBX block 256 which were discussed in connections with FIGS. 3B and 4B respectfully. There is also shown in GMSC block 422 an internal network interface 426. In one embodiment, internal network interface 426 represents a trunk module which has been loaded with the appropriate software to implement the cPBX protocol for communicating with cPBX's in the network.

In the prior art typical GSM configuration, there is typically a TRAU unit in the BSS and the MSC switches only at 64 Kbps. In the present invention, TRAU is moved from the BSS subsystem and is associated with the external interfaces. As is apparent, the TRAU is now moved from within the BSS to between the cPBX and the external network. In this manner, calls that do not need to be TRAUed do not get automatically TRAUed, thereby improving both the quality of the transmitted call and reducing the computational overhead associated with the TRAUing process.

Within cPBX subsystem 422 there may be one or more wired PBX interface 352 and internal network interface 426 to facilitate communication with one or more wired PBX's or cPBX's. On the other hand, there may be no public network interface 258 if the cPBX does not need to communicate with the public network directly (but may communicate via another cPBX in the network or via a wired PBX). Similarly, there may be no wired PBX interface 352 if the cPBX is not coupled to a wired PBX. Internal network interface 426 may, but typically does not, utilize a TRAU unit. By way of example, when calls are made among cPBX's of the multi-site cPBX overlay network, TRAUing is often not necessary. This is because the MS units making those calls typically transmit and receive at the same rate, rendering TRAUing unnecessary. As mentioned earlier, the ability of the present invention to TRAU only when necessary advantageously improves the quality of the sound or data transmitted and reduces the computational overhead associated with performing rate conversion.

Figure 6A:
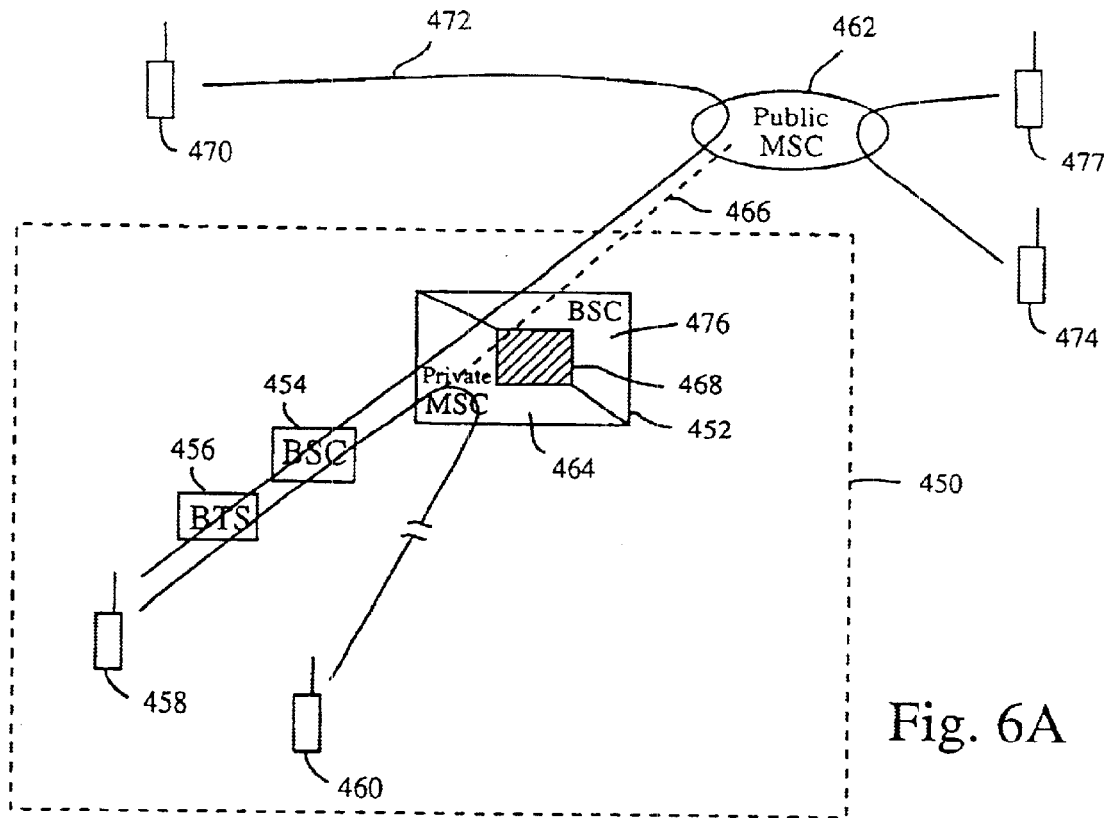
FIG. 6A shows in a simplified format a private GSM network.

The private GSM network of FIG. 6A overlays on top of the prior art GSM network to offload public GSM MSC functions and create a private network with local switches. Essentially, a stand-alone GSM cPBX network is created but the MS units therein also have addresses in the public network HLR. In the stand-alone cPBX configuration of FIG. 3A, stand-alone with cPBX configuration of FIG. 4A, and the multi-site configuration of FIG. 5A, the identity of the MS units is private and typically, but not necessarily, known by the public network. As such, the MS units of the above-mentioned three configurations cannot be moved outside of the domain of the private network and still be independently recognizable by the public network. In the private GSM configuration, the identity, e.g., the phone number and IMSI of the private MS units, is also known to the public network and the private MS units can be taken outside of the domain of the private network, e.g., from a user's office to his or her residence, without having to change the associated phone number.

FIG. 6A shows in a simplified format a private GSM network 450 including a cPBX subsystem 452, a BSC subsystem 454, a BTS subsystem 456, and MS units 458 and 460. BSC subsystem 454, BTS subsystem 456, and MS units 458 and 460 are substantially similar to the BSC, BTS, and MS units discussed in connection with FIGS. 3A, 4A, and 5A. Further, GSM network 450 may also be coupled with a wired PBX or to other cPBX's in a private network in the manner discussed in connection with FIGS. 4A and 5A. For simplicity of illustration, the wired PBX and the other cPBX's are omitted from FIG. 6A. FIG. 6A further shows a public MSC block 462 representing the public network switch, e.g. a public land-based mobile network (PLMN).

In the private GSM configuration of FIG. 6A, MS units, such as MS 470, 458, and 460, home to MSC 462. They work just like standard GSM handsets when outside of the coverage area of private GSM network 45 which includes all of GSM PBX's 476 in the private network). MS unit 470 is considered a known MS unit that happens to be outside of the coverage area of GSM network 450 in FIG. 6A. When inside the private GSM network 450, however, the GSM PBX intercepts calls which can be built between two known handsets within its coverage area such as the call between MS unit 458 and MS unit 460 and switches them through its private PBX network.

On the other hand, standard, non-native GSM handsets that are ordinarily not associated with a cPBX subsystem, e.g. cPBX subsystem 452, cannot utilize the resources of the private network to make calls. In this manner, the private GSM configuration advantageous controls the number of handsets utilizing its resources and reduces the possibility of the private network being overwhelmed by an sudden influx of nonnative GSM handsets seeking to utilize the private network resources for making calls.

When a handset such as MS 458 initiates a call, it initially sets up a signaling link to the public MSC 462 (represented by path 466 in FIG. 6A). This connection passes through the GSM PBX 464 as if it were a BSS connected to the public MSC. However, the GSM PBX, using the translation/listening circuit 468, listens in on messages which pass through this link. When MS unit 458 sends a setup message during the signaling session to designate the destination telephone number, this message is monitored by the translation/listening circuit. Using the destination telephone number along with the identity of the originating MS, the GSM PBX ascertains whether or not both the origination and termination units are within the private GSM network. If they are, the signaling connection between MS 458 and public MSC 462 (path 466) is broken at the GSM PBX 464, the private MSC circuit 464 takes over the connection in a way that is transparent to MS 458, and the GSM PBX completes the connection setup within the private GSM PBX network. In this manner, no bearer bandwidth of the public network is ever used. Consequently, usage of the public network bandwidth is advantageously reduced, with a consequent reduction in the charges incurred in connection with usage of the public network bearer channels.

By way of example, when MS unit 458 wants to build a call to MS unit 460, cPBX 452 cross-connects the incoming and outgoing call paths locally in the manner discussed earlier in connection with FIGS. 3A, 4A, or 5A. In one embodiment, the cross-connect between purely local call paths are preferably made at the private MSC level. Note that when intelligent cross-connect is involved, as is in one embodiment, the cross-connect may be made either at private MSC block 464, BSC block 454, or BTS block 456.

Further, when MS unit 458 wants to build a call to a telephone set 470, which is not in the domain controlled by private GSM network 450, the signaling session from MS unit 458 is again built to public MSC 462 as discussed earlier. Translation/listening circuit 468 then listens in on the set up message sent from MS unit 458 to the public VLR registry. If it is determined that destination intended for the call is not a local MS unit, cPBX subsystem 452 acts as a BSC (represented symbolically by BSC block 476 and allows the call to be routed through public MSC block 462 (via path 472) instead of disconnecting the signaling session as in the case of calls between two local MS units. For calls between phones 474 and 477 which are purely outside private GSM network 450, those calls are built through public MSC block 462 without involving the resources of private GSM network 450.

The implementation of private GSM network of FIG. 6A requires cooperation with the public network operator to coordinate subscriber information, mobility management (MM) and call control (CC) for, e.g., supplemental services (SS) or short message services (SMS). Further, if someone from the public network wants to contact an MS unit, which may be located either in the location area controlled by private GSM network 450 or may have roamed away from the private network domain, public MSC 462 should have its VLR registry properly updated in order to ascertain the location of the destination MS unit. Of course, the private HLR/VLR registry of cPBX subsystem 452 should also be properly updated for internal switching. Further, if cPBX subsystem 452 is interconnected in a network of cPBX's, all HLR/VLR registries of the interconnected cPBX's should also be updated. This is because calls coming in on a telephone set outside of GSM network 450 via public MSC 462 may need to be forwarded from the home cPBX subsystem to another cPBX subsystem where the MS unit has roamed. The updating of all HLR/VLR registries in an interconnected cPBX network facilitates this roaming. Note that the private GSM configuration of FIG. 6A may be set up without requiring, in one embodiment, any modification in the public HLR or public MSC block 462. This is because the coordination of subscriber information, mobility management, and call control for use with SS/SMS between the private and public network may be performed via the listening of translation/listening circuits 468.

In one embodiment, if a call between say MS unit 458 and MS unit 460 involves a supplemental service (SS) or short message service (SMS) that cannot be efficiently handled by resources within private GSM network 450, that call may be built through public MS 462 which may have resources to handle the SS or SMS requirements of MS units 458 and 460. Further, calls from MS units of the private GSM network that are authorized to use those supplemental services are always routed, in one embodiment, through public MSC block 462 so that the look and feel from the perspective of those MS units remain the same whether those MS units are inside or outside the domain of the private GSM network.

As is apparent from the foregoing, cPBX 452 preferably acts as a BSC for calls coming in from outside private GSM network 450 (and the network of cPBX's if cPBX subsystem 452 is so connected). On the other hand, for outgoing calls from an MS unit that currently resides in a location area controlled a cPBX subsystem, e.g., cPBX 452, cPBX 452 may act as a private MSC to switch calls locally or as a BSC to pass those calls onto public MSC 462 where switching is performed.

Figure 6B:
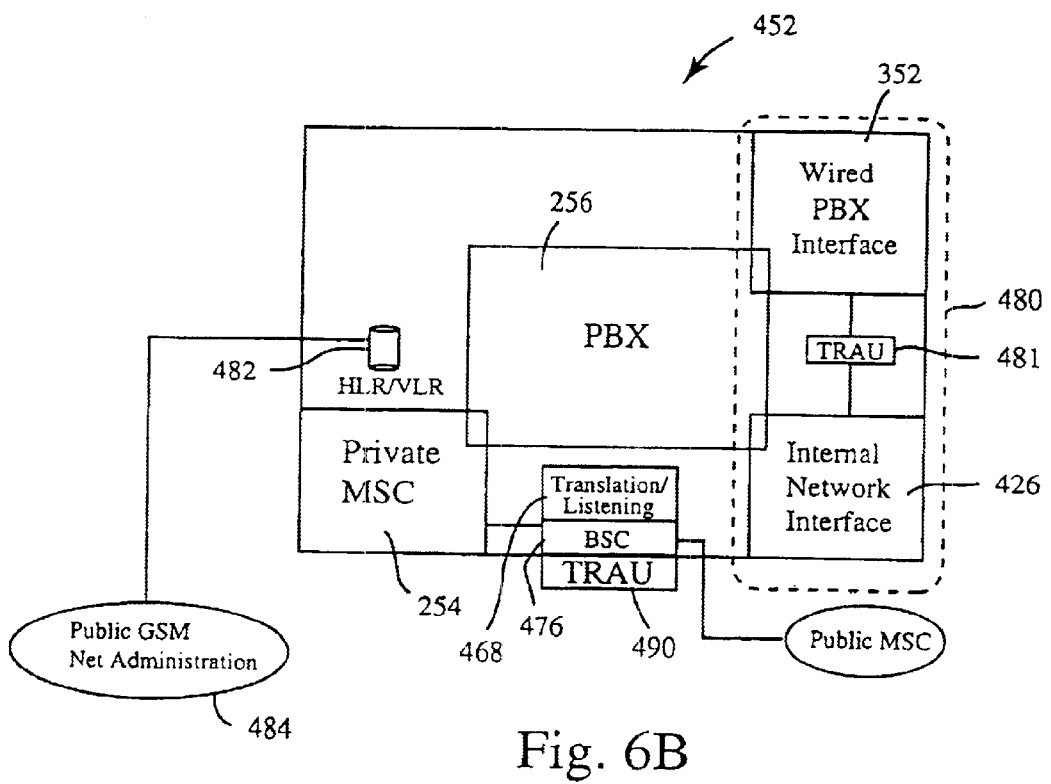
FIG. 6B shows in a simplified format cPBX subsystem 452 of FIG. 6A.

FIG. 6B shows in a simplified format cPBX subsystem 452 of FIG. 6A. Within cPBX subsystem 452, shown are a gateway MSC (GMSC) block 480, a registry 482 which contains both the HLR registry and the VLR registry, a private MSC block 254 and PBX block 256. Private MSC block 254 and PBX block 256 function substantially as discussed earlier in connection with FIGS. 3B, 4B, and 5B. A registry 482 of cPBX subsystem 452 is administered by the public GSM net administration 484 since the private GSM network 450 now needs to know the subscriber information in the public HLR, e.g., home base information, valid supplemental service for the MS unit, and the like.

In one embodiment, cPBX subsystem 452 no longer communicates with the public network via a public network interface. Instead, the communication with the public network by the cPBX is accomplished via blocks 476 and 490 and a public MSC respectively. In this manner, blocks 476 and 490 represents functionally the BSC function of cPBX subsystem 452 and the TRAU function for permitting the cPBX to communicate with the public MSC (and to the public network through the public MSC). GMSC block 480 may also include a wired PBX interface 352 and internal network interface 456 for communicating respectively with a wired PBX and another cPBX. Within GMSC block 480, there is often provided a TRAU 481 for performing rate conversion if necessary.

There is also shown in FIG. 6B translation/listening unit 468 and BSC block 476 which is coupled to public MSC block 462, representing the translation/listening unit discussed earlier in connection with FIG. 6A. Typically, there is also included a TRAU unit 490 for performing rate conversation on data between the private network and the external public network.

In all configurations discussed heretofore, e.g., stand-alone cPBX, stand-alone cPBX with wired PBX adjunct, multi-site cPBX's, and private GSM, non-native handsets cannot make use of the BTS, BSC, and MSC resources of the private system in the private network since non-native handsets are not registered with and therefore not recognized by the private HLR/VLR registry of the cPBX's of the private network. In the hybrid configuration, handsets which are non-native can use the resources of the private network as a BSS in order to access public MSC. Hybrid covers the situation where a non-native handset, because it is outside the public coverage (e.g., due to interference or range limitation) for example, can only access the public network via the BTS/BSC/MSC/cPBX resources of the private network. Examples include non-native MS units taken into an enclosed building or a remote location that is serviced by a private hybrid network.

Figure 7:
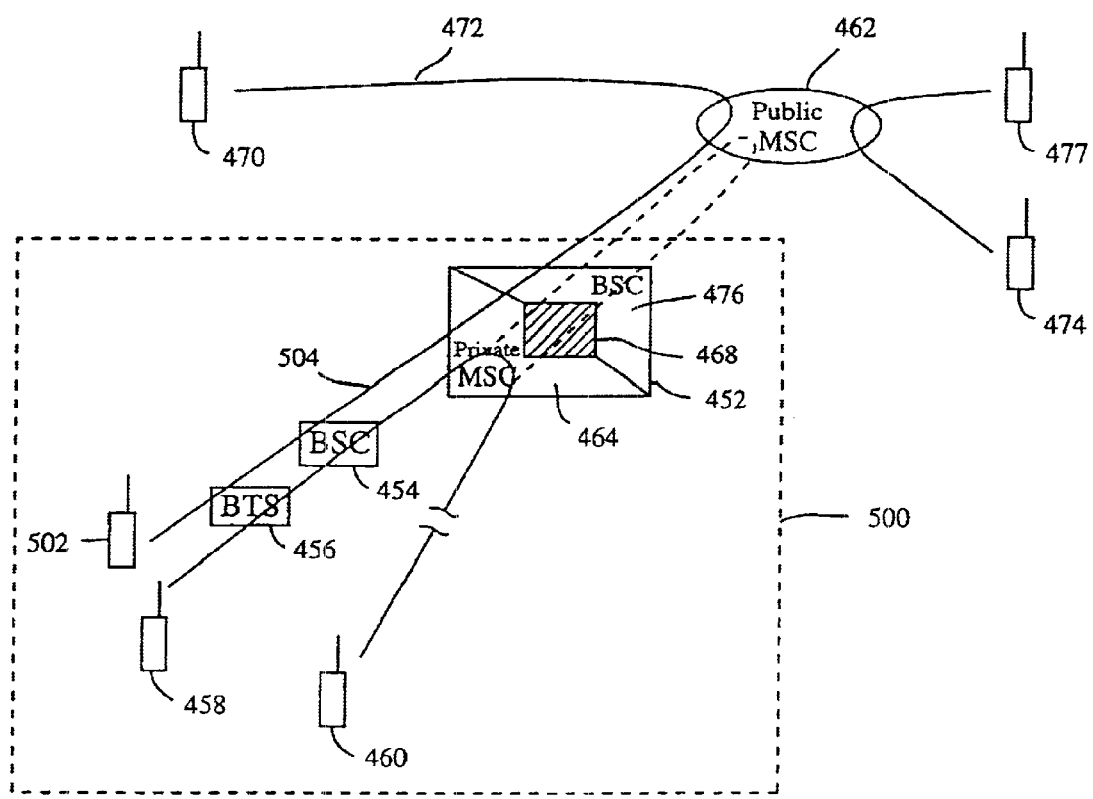
FIG. 7 shows in a simplified format a hybrid network.

FIG. 7 shows in a simplified format hybrid network 500 including cPBX subsystem 452, BSC subsystem 454, BTS subsystem 456, and MS units 458 and 460. In one embodiment, cPBX subsystem 452 of the hybrid system is structurally similarly to the cPBX subsystem of the private GSM system, albeit loaded with different software. MS units 458 and 460 are considered MS units that are native to hybrid network 500. In other words, they are registered with the private HLR/VLR registry within cPBX subsystem 452. In one embodiment of hybrid network 500, MS units 458 and 460 preferably remain within the domain control by the private cPBX network in order to build calls among the MS units or out of the private network to a phone set in the public network. In another embodiment, however, it is possible for a native MS unit in a hybrid configuration to directly communicate with the public network for the purpose of making calls. FIG. 7 also shows an MS unit 502 which is, for illustration purpose, a standard GSM handset that is non-native with respect to hybrid network 500. In other words, MS unit 502 represents a handset that typically can build calls through the public network, but is not registered with the private HLR/VLR registry of hybrid network 500. However, hybrid network 500 has the ability to permit non-native handsets, e.g., MS unit 502, to make use of its resources to build calls.

In the hybrid embodiment, if a handset that is not registered with the private HLR/VLR registry of the private hybrid network attempts to use the resources of the private network to make or receive calls, the cPBX subsystem of the private hybrid network, e.g., cPBX subsystem 452, enters the hybrid mode and acts as a BSS (if bandwidth is available) to allow that non-native handset to communicate with the public network. In other words, cPBX subsystem 452 acts as a part-private cPBX, part-public BSS. To a non-native MS unit, cPBX subsystem 452 appears as a BSS. For native handsets, cPBX subsystem 452 may function as a private MSC for calls routed among MS units of the private network or as a BSS for calls between a native MS unit and an external phone.

Suitable application for hybrid systems include private shopping centers or manufacturing sites or remote locations where it is desirable for MS units belonging to a network to communicate with one another, but also has the ability to permit non-native MS units to use the resources of the private network to access the public network.

In another embodiment of the hybrid network, hybrid network 500 both allows non-native handsets to use the resources of the private network to make calls to and from the public network as well as allow native handsets to be taken outside of the domain of the private network. In this embodiment, when a native MS unit is taken outside of the domain of the private network, it preferably communicates directly with the public network for the purpose of building calls.

In one embodiment, hybrid network 500 is further furnished with control circuits to control the sharing of resources, e.g., radio bandwidth resources, TRAU resources, trunk resources (for example, E1), or the like, between native MS units and non-native handsets. In one embodiment, non-native handsets can only use the private hybrid cPBX resources as a BSS when the allocation of resources for non-native MS units are not exceeded. By way of example, a hybrid network 500 may decide that up to 20% of the radio bandwidth of the private network may be allocated to non-native handsets while at least 80% of the radio bandwidth resources should be allocated to native MS units. The ability to govern the sharing of resources between native handsets and non-native handsets advantageously ensures that MS units that are native to the hybrid network are not overwhelmed by an excessive influx of non-native handsets into the location area.

Figure 8:
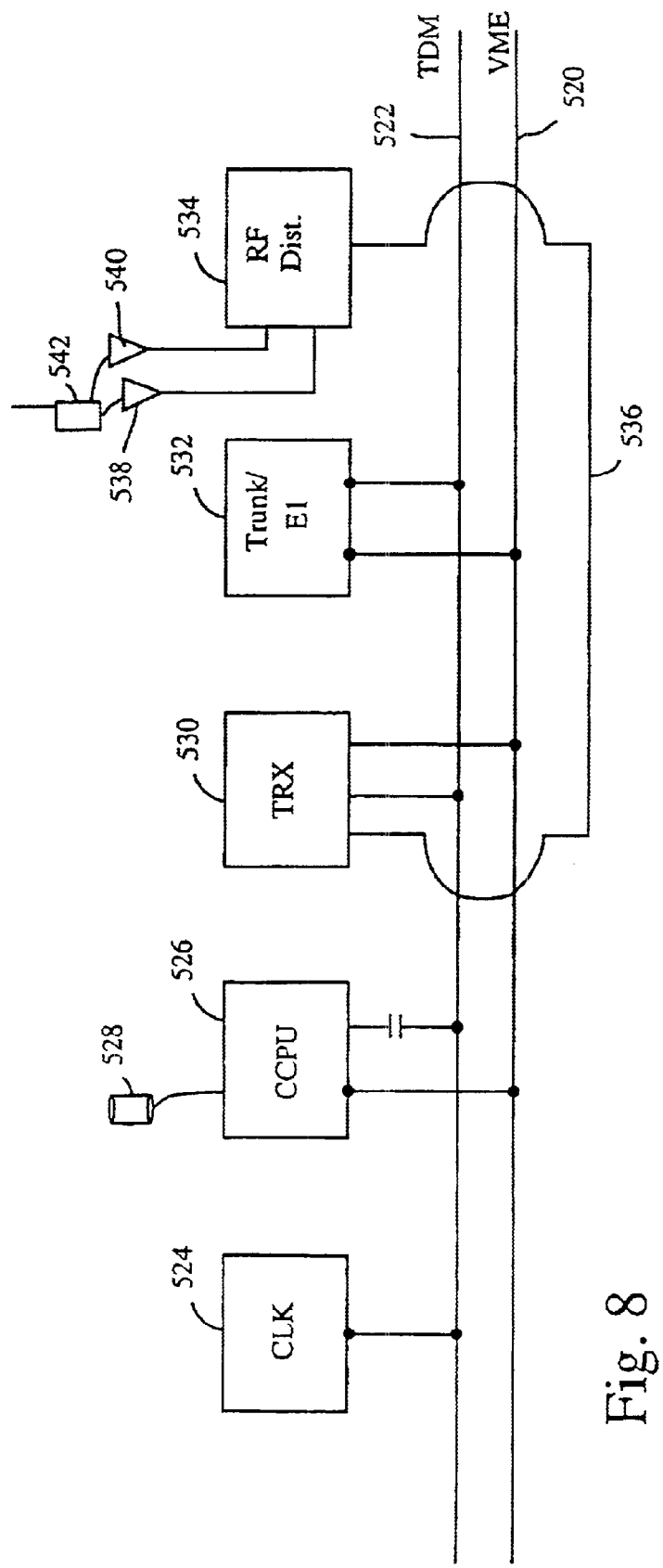
FIG. 8 shows in a simplified format a symbolic representation of an inventive chassis in accordance with one aspect of the present invention.

FIG. 8 shows in a simplified format a symbolic representation of the inventive chassis. In accordance with one aspect of the present invention, modules within the chassis are endowed with distributed processing and intelligence. By distributing the processing and intelligence among the modules, the present invention advantageously creates a network in which resources can be scaled. Consequently, chassis configuration may done in a modular manner. Further, when intelligence is distributed down the hierarchy, call processing and cross-connection for the purpose of building calls can be made at more local levels by making use of the distributed time-space-time switching fabric, thereby improving the network bandwidth.

In accordance with one aspect of the present invention, there is supplied a chassis with a common backplane having a plurality of "slots" into which a plurality of modules may be plugged to configure the chassis to operate either as a BTS subsystem, a BSC subsystem, a BSS subsystem (which includes a BSC subsystem and all the BTS's it controls), an MSC/cPBX subsystem, or any combination of the above. Modular configuration permits components of the private network to either co-locate or be placed in geographically separate locations depending on need. In one embodiment, chassis of various sizes are provided. By way of example, chassis having 3 slots, 9 slots, and 18 slots have been found to be suitable for commercial application.

For example, to service the needs of a small site, it is possible to combine the functionality of a cPBX, an MSC, a BSC, and a BTS within one chassis, effectively providing a cellular PBX solution in one box. For a medium site, it is possible to configure one chassis as a cPBX/BSC, and to locate other chassis, with are configured as BTS subsystems, in different geographical locations to enlarge the domain of the private network. For an even larger site, it is possible to configure one chassis as a cPBX subsystem, a plurality of chassis as BSC subsystems controlled by the above-mentioned cPBX subsystem, and an even greater number of BTS subsystems throughout the site further enlarge the domain of the private network and to handle a larger number of users. As it is apparent from the foregoing, the fact that each component of the private network, e.g., BTS, BSC, cPBX and their sub-components are endowed with distributed intelligence and processing capabilities facilitate modular configuration and a highly scalable system.

Referring now to FIG. 8, there is shown a VME bus 520 and a TDM bus 522. TDM bus 522 represents a time division multiplexing bus for transferring synchronous data between modules at high speed. In one embodiment, TDM bus 702 has a capacity of 16 subbusses×8 megabits per second which represent a substantially greater bandwidth than is required by the current system. In comparison, a trunk module (discussed shortly hereafter) requires only 2 megabits per second. The extra bandwidth on TDM bus 522 advantageously facilitates efficient switching of voice and digital data on TDM bus 522 as well as room for growth.

Coupled to TDM bus 522 is a clock module 524 for generating timing/clock signals for the TDM bus. Typically, there is preferably one clock module per chassis. There is also a cellular CPU module 526 (CCPU) which is coupled to VME bus 520 and optionally to TDM bus 522 for diagnostic purposes. CCPU module 526 is coupled to an optional memory 528, e.g., a hard disk drive, flash memory, and the like, that contains the HLR/VLR registry. There may be more than one CCPU module 526 in a chassis to increase the processing power although two is typically optimum in a 9-slot chassis.

FIG. 8 also shows a TRX module 530 which is coupled to both TDM bus 522 and VME bus 520. One example of a TRX module 530 that works well is discussed in detail in a commonly assigned, co-pending patent application entitled "CELLULAR BASE STATION WITH INTELLIGENT CALL ROUTING", filed on even date and incorporated herein by reference for all purposes. TRX module 530 represents a transceiver for processing outgoing data to MS units and incoming data from MS units. TRX module 530 is explored in greater detail in FIG. 9. There is also shown a trunk module 532 which is also coupled to both VME bus 520 and TDM bus 522. Trunk module 532 may represent, for example, an E1 module although this is not a requirement. In one embodiment, processing is distributed in CCPU module 526, TRX module 530, and trunk module 532. In a typical chassis, there may be multiple TRX modules 530 and trunk modules 532. TRX module 530 has the capability to send and receive voice or data traffic among MS units, performs the switching function between local MS units, or permits the data stream from one MS unit to be sent via TDM bus 522 to an appropriate interface for communicating with a terminating phone set that is external to the private cPBX network.

There is also shown in FIG. 8 an RF distribution module 534. RF distribution module 534 is typically coupled to two or more antennas, shown representatively in FIG. 8 as antennas 538 and 540. Antennas 538 and 540 are the means by which the BTS subsystem is coupled to the "air interface" to send and receive data with the MS units. In a typical chassis, RF distribution module 534 contains diplexing circuitry that allows antennas 538 and 540 to both transmit and receive to reduce the number of antennas required for full duplex data transmissions.

The RF distribution of FIG. 8 preferably includes more than one antenna for diversity reception, i.e., allowing the system to receive signals from either of the two physically separated antennas to choose the best signal from a given handset. For example, a signal from an MS unit 542 may be antennuated when received by antenna 538, but may have a better signal-to-noise ratio when received by antenna 540. Diversity reception permits the signal received on antenna 540 to be selected for use. When transmitting, the transmission antenna is not critical since the MS units are themselves mobile.

Figure 1:
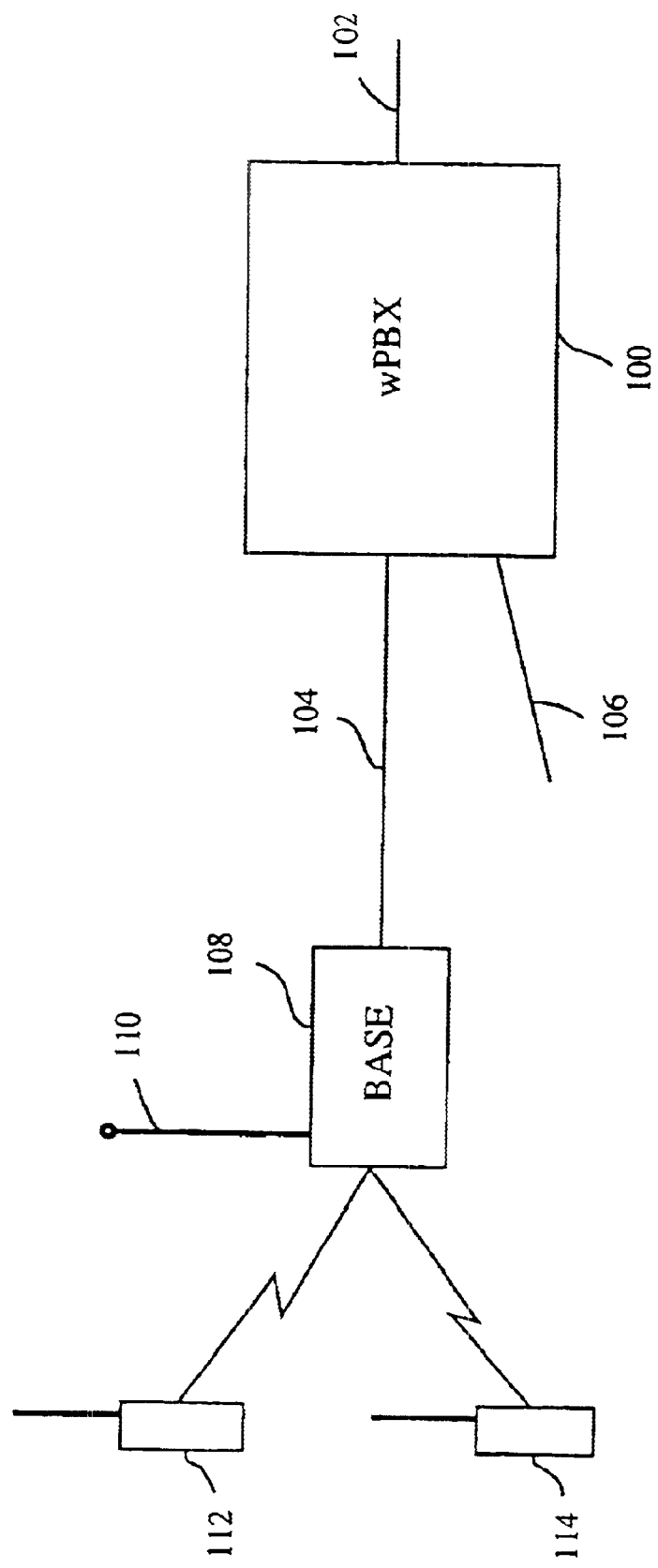
FIG. 1 shows in a simplified diagram a wireless private branch exchange system (wPBX) of the prior art.

If a chassis is populated with a TRX module 530, that chassis is capable of functioning as a BTS. Further, if the functionality of a BSC that does the radio resource (RR) management as discussed in connection with FIG. 1, is loaded, the same chassis can combine the function of a BTS and a BSC in one box. When BTS and BSC functions are combined on the same common backplane, trunk modules which are ordinarily required for communication between two geographically separated opponents of the private network may be eliminated, thereby reducing and complexities.

Figure 9:
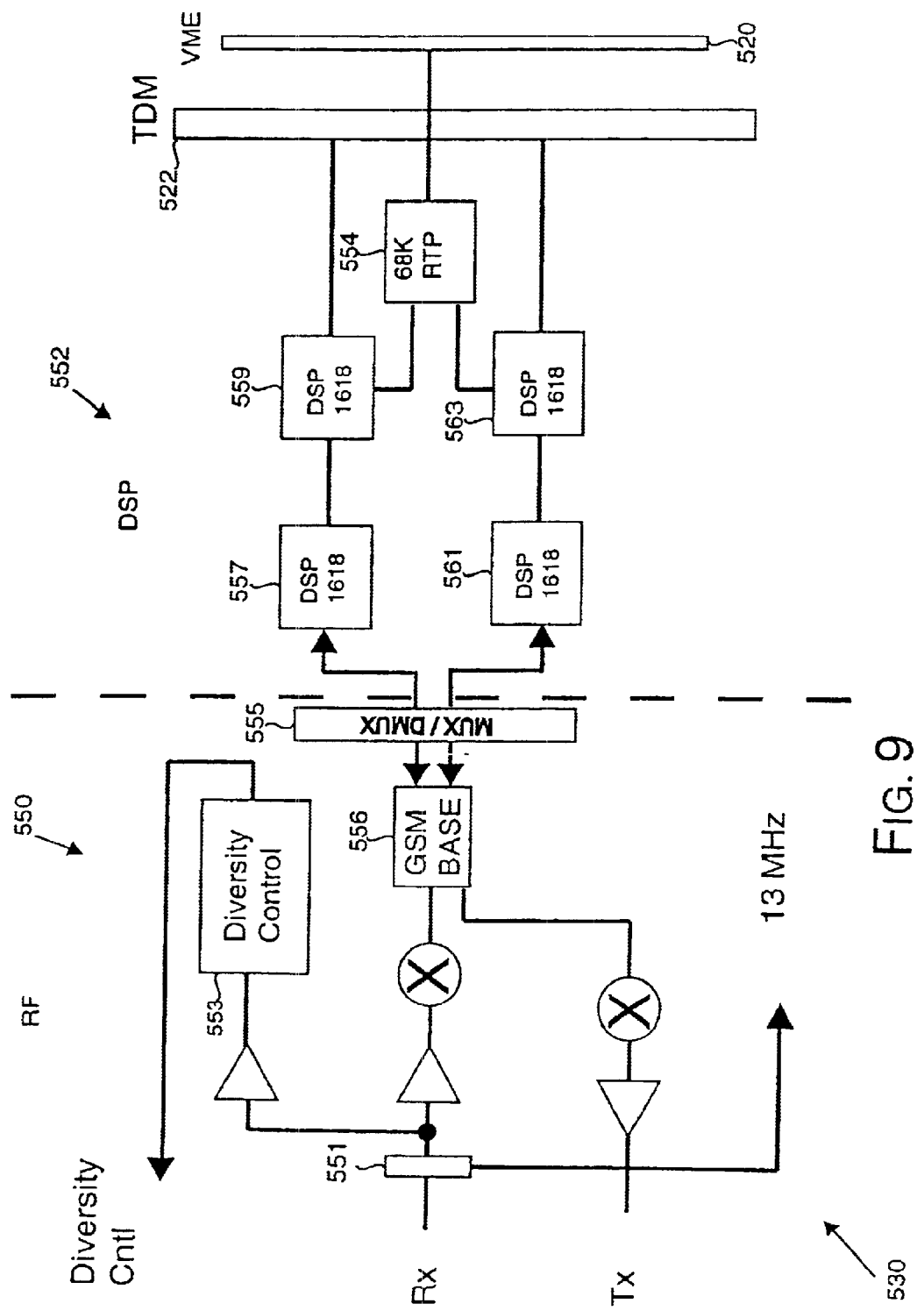
FIG. 9 shows in a simplified format a TRX module.

FIG. 9 shows in a simplified format TRX module 530 of FIG. 8. In one aspect of the present invention, TRX module 530 advantageously includes distributed intelligence and processing. In one embodiment, TRX module 530 comprises two main sections: an RF section 550 and a DSP section 552. In this implementation, RF section 550 represents a module which is coupled physically to DSP module 552. A such, TRX module 530 occupies two slots in the common backplane of the inventive modular system chassis.

DSP section 552 includes, for example, four digital signal processor (DSP) 557, 559, 561, and 563 to process 8 TDM time slots per radio channel of traffic. DSP section 552 further includes a processor (real time) 554 which is coupled to TDM bus 522 and VME bus 520 to perform processing of the signaling protocol, e.g., LAPD-M in GSM, thereby moving a functionality typically associated with prior art BCF into the TRX of the present invention. In one embodiment, DSP modules send and receive data over TDM bus 522. DSP modules 557, 559, 561, and 563 communicate with processor 554 to facilitate LAPD-M processing. Processor 554 in turn uses VME bus 520 to send higher level protocols to CCPU 526 for processing therein.

Filter 551 extracts the clock for TRX 530 synchronization. A diversity control 553 is coupled to the RF distribution module 534. Diversity control 553 monitors the incoming received signal to detect signal degradation. If, for example, diversity control 553 detects sufficient signal degradation in antenna 538, it sends a signal to a switch in RF distribution module 534 to select antenna 540. The RF communication and reception aspect is discussed in detail in a commonly assigned, co-pending patent application entitled "SPREAD SPECTRUM COMMUNICATION NETWORK WITH ADAPTIVE FREQUENCY AGILITY", U.S. Ser. No. 08/434,597, filed on even date and incorporated herein by reference for all purposes.

Once the inbound information is received at TRX 530 and converted to a baseband frequency, a GSM baseband module 556 performs a GMSK procedure to obtain TDMA frame data. GSM baseband module 556 can perform both inbound demodulation resulting in in-phase and quadrature-phase information as well as outbound modulation resulting in a baseband frequency. A processor that works well for this purpose is the Analog Devices AD7002 manufactured by Analog Devices Inc. of Santa Clara, Calif. Then MUX/DMUX 555 directs the inbound information to a plurality of processing paths to distribute the processing load. The signal processing aspect is discussed in detail in a commonly assigned, co-pending patent application entitled "SPREAD SPECTRUM COMMUNICATION NETWORK SIGNAL PROCESSOR," U.S. Ser. No. 08/434/554, filed on even date and incorporated herein by reference for all purposes. One example of demultiplexing that works well is to send all even TDMA time slots to a first DSP string 557, 559, and to send all odd TDMA time slots to a second DSP string 561, 563. However, MUX/DMUX 555 can distribute the information to any number of DSP strings. Once DSPs 559, 563 complete the inbound information processing, they send the information to the TDM bus.

For outbound information processing, DSPs 559, 563 receive outbound information from the TDM bus. The information is divided among a plurality of processing strings. One example that works well is to send all even TDMA time slots to a first DSP string 559, 557, and to send all odd TDMA time slots to a second DSP string 563, 561. The processing is performed in parallel and the resulting outbound information is presented to MUX/DMUX 555, which multiplexes the time slots to form TDMA frames, sends them to GSM baseband module 556 and then to RF distribution module 534 for transmission.

A Real Time Processor (RTP) 554 provisions and controls DSPs 557, 559, 561, 563 in order to schedule information processing. RTP 554 also performs power control and measurement preprocessing and link access protocols (LAPD-M) for information error detection and correction. Moreover, RTP 554 keeps track of inbound information and outbound information to further enhance TRX 530 efficiency and permit the communication of inbound information and outbound information over the TDM bus.

RTP 554 communicates control information over the VME bus with CCPU 526. Included in this control information is base station radio and MS power and timing information collected by TRX 530 as well as other packetized information from the MS. RTP 554 receives instructions from CCPU 526 regarding operating parameters and processing requirements.

In the prior art, each RF module is assigned a frequency. In order to perform channel hopping, it is necessary for a signal from an MS unit to be received on different RF modules overt time. To perform signal processing on the received signals from different RF modules, there is necessarily a central processing resource for processing the bursts from various RF modules and outputting a signal stream representing the signal from that MS unit. In other words, the processing of the received data is more centralized in the prior art, with different RF modules receiving signal bits from a given handset during diversity reception and feeding those bits into a single, centralized processor and DSP resources.

In accordance with one aspect of the present invention, frequency hopping is performed within a single RF module. Therefore, a stream of data from an MS unit can be received by a single RF unit, e.g., RF section 550, and still be able to facilitate diversity reception via the inventive frequency agile synthesizer. Consequently, it is possible to count on data from an MS unit to be received via a single RF module. Details regarding the frequency agile hopping aspect is covered more fully in the above-mentioned co-pending patent applications entitled "Spread Spectrum Communication Network with Adaptive Frequency Agility" (Ser. No. 08/434,597), and "Spread Spectrum Communication Network Signal Processor" (Ser. No. 08/434,554).

Further, the invention contemplates locally coupling a processor, e.g., processor 554, as well as digital signal processing resources, e.g., the DSP modules in DSP section 552, to a single RF module. This is possible because the DSP resources and the processor provided locally at each TRX module of the present invention can always count on receiving the bits from a given handset via a single RF section. In this manner, the processor (LAPD-M processor in one specific implementation) can now be closely coupled to the RF section and the processing resource becomes scalable based on the number of TRX module provided.

Each TRX module can now have coupled with it a processor, e.g., process of 554, to do LAPD-M processing at a local level. In this manner, the addition of another TRX module to handle additional MS units does not burden an existing centralized processing or DSP resource. The result is a highly scalable cPBX system wherein additional TRX module, each equipped with its own LAPD-M and DSP distributed processing capability can be provided on an as needed basis. The distribution of processing and DSP resources to TRX module to facilitate a modular and scalable cPBX system represent one significant advantage of the present invention.

Figure 10A:
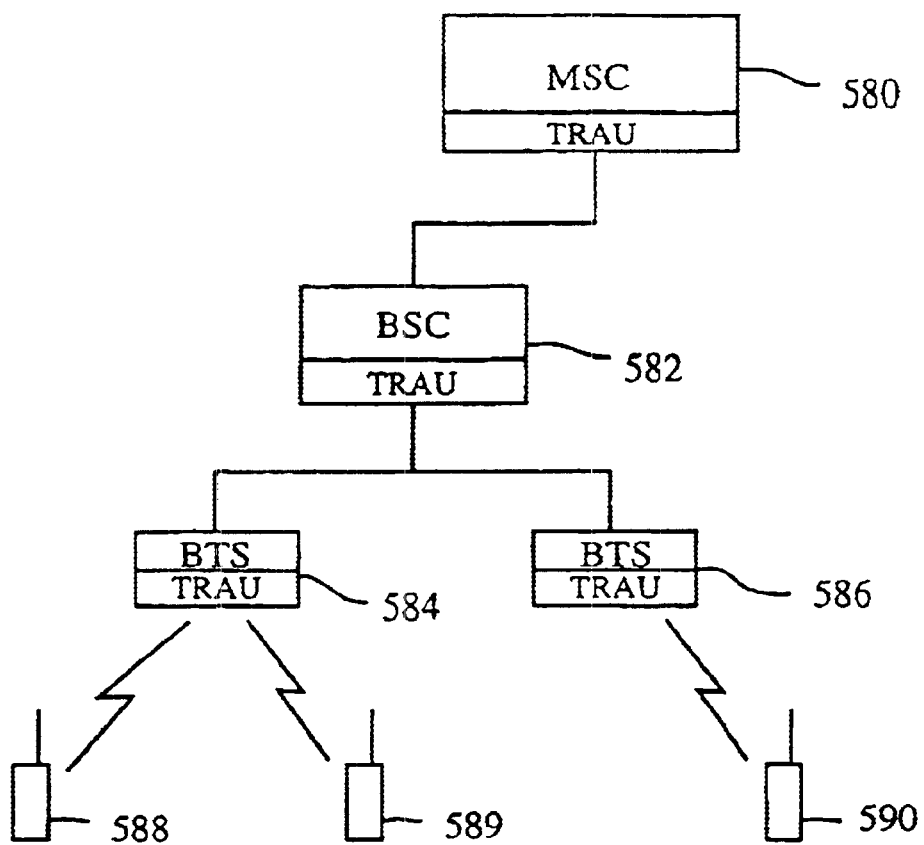
FIG. 10A illustrates in a symbolic format an intelligent TRAUing technique in accordance with one aspect of the present invention.

FIG. 10A illustrates in a symbolic format the intelligent TRAUing aspect of the present invention. For illustration purpose, FIG. 10a shows a simple cPBX system including an MSC subsystem 580, a BSC subsystem 582, BTS subsystems 584 and 586, and MS units 588, 589, and 590. In one embodiment, TRAU resource is provided at each of BTS subsystems 584 and 586, BSC subsystems 582, and MSC subsystem 580 as shown. However, when calls are built strictly internal in the private cPBX network between two MS units that communicate using the same rate, the present invention advantageously bypasses the TRAU resource along the call path.

For example, if MS units 558 and 589 communicate at 8 Kbps, calls between these two MS units may be cross-connected via BTS subsystem 584 and the actual call path may be built without switching in the TRAU resource in BTS subsystem 584.

On the other hand, if MS unit 588 communicates at a different rate than MS unit 589, say 8 Kbps versus 16 Kbps, the call path may also be built through BTS subsystem 584. However, the call path now includes a TRAU resource, which exists in BTS subsystem 584, to perform the necessary rate conversion. As is apparent, calls between MS units within the same cPBX network may also be cross-connected via either via BSC subsystem 582 or MSC subsystem 580 with or without utilizing the TRAU resources provided therein. It should be noted that for calls from an MS unit within the private cPBX network and a telephone set in the public network, TRAUing is usually necessary in order to conform with the 64 kibitz requirement of the public network.

The distribution of TRAU resources down to components lower in the hierarchy of the private network advantageously saves the network bandwidth since calls between MS units that need TRAUing may be cross-connected at a lower level in the hierarchy. On the other hand, the ability of the present invention to employ TRAU resources along a call path only if TRAUing is necessary advantageously improves call quality and reduces the computational overhead associated with TRAUing.

At the heart of trunk module (TM) 532 is a time/space switch 602, which is coupled to both the TDM bus for data and the VME bus for control. Time/space switch 602 is capable of routing information between the TDM bus, processor 604, interface framers 606 and 607, and DSPs 608a–f. Time/space switch 602 is described herein according to its communication data rates and switch capabilities. Any device of performing these functions can be used in the present invention, such as the 3C Ltd. C3280 processor, manufactured by 3C Ltd. of Kowloon, Hong Kong or a Siemens PEB 2045 Memory Time Switch, manufactured by Siemens Corp. of New York, N.Y. (USA).

Figure 10B:
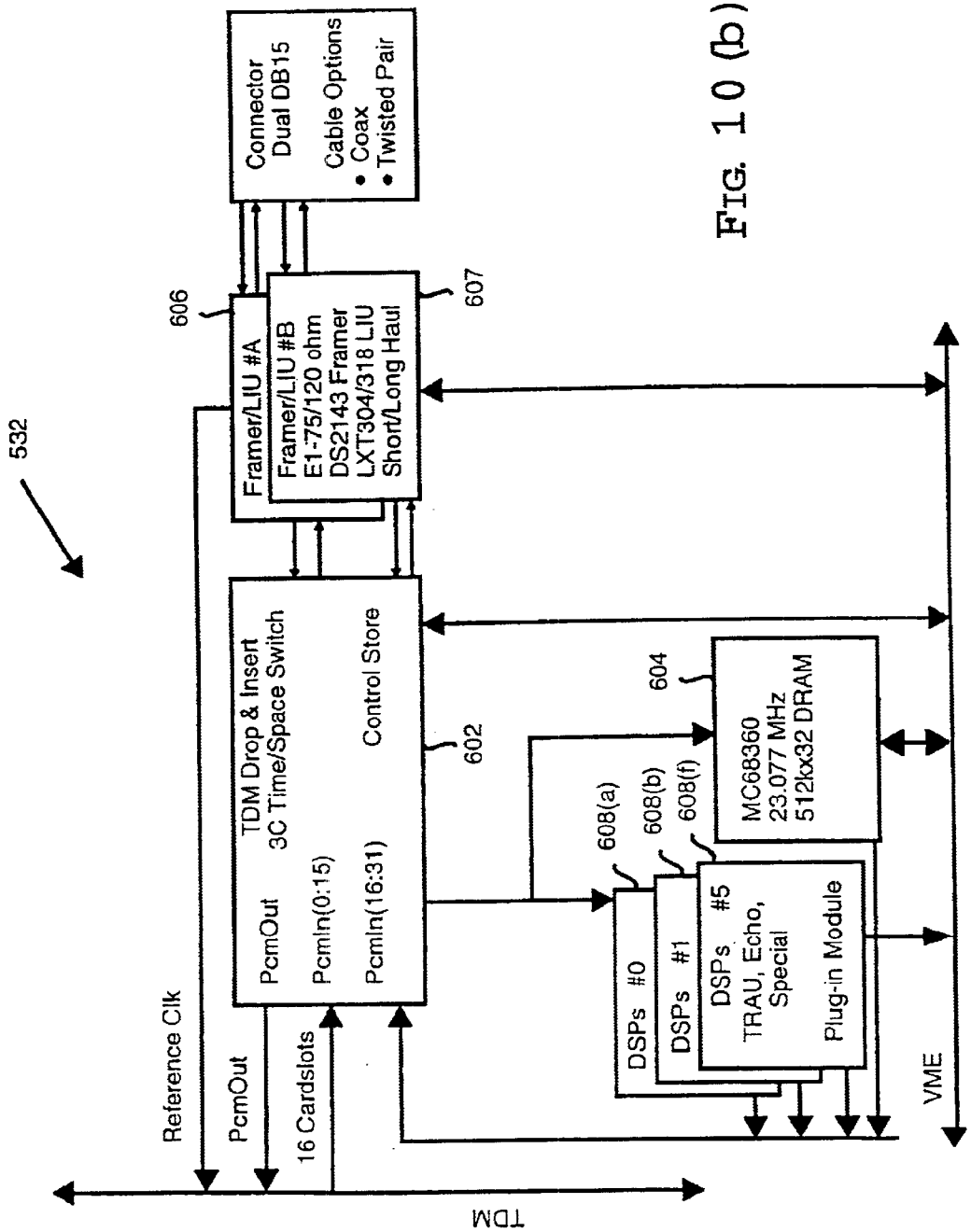
FIGS. 10B and 10C show in a simplified format a trunk module in accordance with one aspect of the present invention.
Figure 10C:
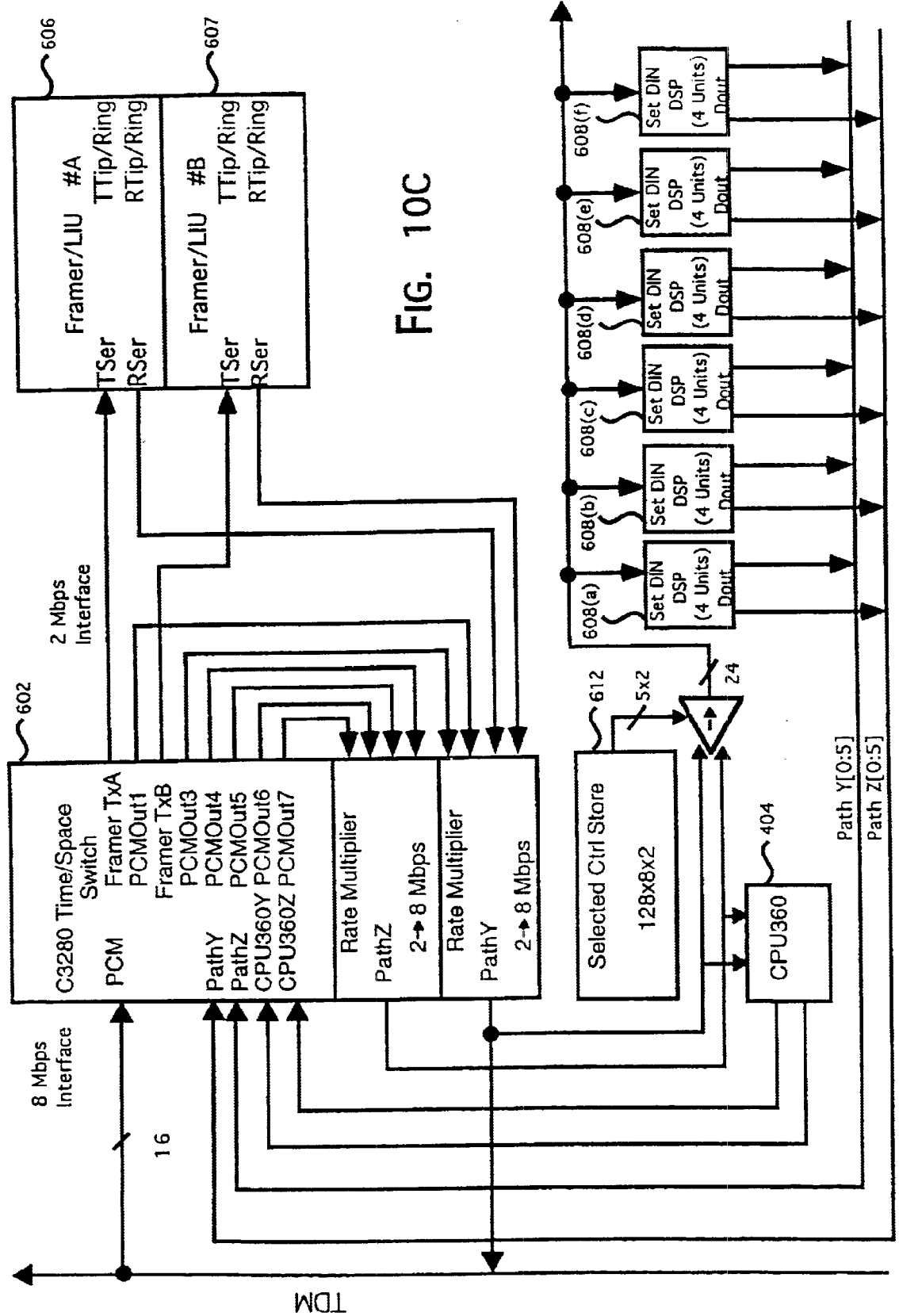

Time/space switch 602 has many ports as shown in FIG. 10B. A PCM input port is coupled to all 16 TDM subbusses, which can each transfer 8 Mbps. In essence, time/space switch 602 can communicate with up to 16 modules such as TRXs, other TMs, or any other type modules attached to the TDM bus. A larger number is possible if time/space switch 602 is configured to have even more ports and the TDM bus is configured to have even more subbusses.

Time/space switch 602 supports many of the switching functions described in this disclosure as well as in the commonly assigned, copending patent application entitled "METHODS AND APPARATUSSES FOR AN INTELLIGENT SWITCH", U.S. Ser. No. 08/435,838, filed on even date and incorporated herein by reference for all purposes. Moreover, when the base station is configured to perform switching functions, the base station can perform functions of a cellular PBX, a local loop, or other similar functions.

Processor 604 is coupled to time/space switch 602 via 8 Mbps CPU360Y and CPU360Z input ports, and further coupled to 8 Mbps pathY and pathZ output ports, as shown. Processor 604 is also coupled to VME bus, as shown in FIG. 10B. Processor 604 is provided to perform protocol processing. Possible protocols include Abis, A, SS#7, and ISDN. This processing enables cooperative interworking between other elements of the GSM network and the PSTN. If protocol processing is not required, then processor 604 may be omitted since CCPU 526 includes a processor for performing general functions.

Framers (sometimes known as Line Interface Units) 606, 607 are coupled to time/space switch 602 via 2 Mbps framer ports TxA and TxB. The 2 Mbps is typically an E1 interface rate, but can be modified for any interface rate. Framers 606, 607 are configured to communicate with other network elements such as a BTS, BSC, MSC, PBX, PSTN, or others. Since the base station can be configured to perform the functions of a BTS, BSC, or MSC, the type of interface may be changed to accommodate the particular required interface function. For example, framers 606, 607 shown in FIG. 10B can interface with an E1 at 2 Mbps, a T1 at 1.544 Mbps, DS0 at 64 Kbps, or other digital interface.

DSPs 608a–f are coupled to time/space switch via 8 Mbps PathY and pathZ output ports. DSPs 608a–f can perform a variety of functions including transcode rate adaptation, echo canceling, or other special functions such as those described below. Once DSPs 608a–f complete their respective functions, the information is then delivered back to time/space switch 602 via pathY and pathZ input ports.

As explained earlier, the required information processing may sometimes include echo canceling, transcode rate adaptation TRAU, or other inter-working functions (IWF). Time/space switch 602 receives control signals from CCPU 526 over the VME bus, instructing time/space switch 602 what to switch or connect.

When echo canceling, rate adaptation, or some other function is required, time/space switch 602 routes the information to a DSP 608 to perform the processing. As shown, there are 6 DSPs 608a–f, however, there may be from zero to any number as required for the processing. Further, the DSPs 608a–f may each have 2 or 4 processor engines such as AT&T DSP1611 or TI TMS320C52 to perform the required processing function.

With regard to the TRAU function, the GSM MS units may, for example, communicate compressed voice at 16 Kbps, while the PSTN DS0 interface is at 64 Kbps. A DSP 608 modifies the compression to accommodate this rate change. The DSP 608 can also accommodate a rate change between any rates such as 8 Kbps, 16 Kbps and 64 Kbps.

FIG. 11 shows in a simplified format the different possible configurations that a single modular system chassis, say one having nine slots, may have. As mentioned earlier, the present invention preferably endows individual modules with their own processing and intelligent resources, e.g., endowing TRX modules of FIG. 9 with its own processor and DSP resources or TM module of FIG. 10B with its own switching, TRAU, echo cancellation and other resources, advantageously improves modularity, thereby facilitating efficient and modular configuration within a single chassis. Further, the present invention uses a common backplane, including buses having sufficient bandwidth capacity to perform switching, e.g., the TDM bus discussed in connection with FIG. 8, that flexibly permits different modules to be added or removed in a chassis depending on need. The use of a single common chassis to configure these different subsystems advantageously reduces manufacturing costs as well as upgrade costs. Further, the use of a single chassis for configuration as a BTS, a BSC, a cPBX, or any combination of the above flexibly permits the private cPBX network to be configured according to geographic and customer requirements. Properly populated, the chassis and its modules flexibly form a private micro cellular network solution that is complete and self contained.

Referring now to FIG. 11, a common chassis having, for example, nine slots, may be configured purely as a BTS subsystem by populating the chassis with, for example, up to three TRX modules, one TM (Trunk) module, one CCPU module, one clock module, and one RF distribution module. In one embodiment, a clock module requires no slot and a TRX module requires two slots. To configure a chassis as a BSC subsystem, the chassis may be populated with, for example, one clock module, up to three CCPU modules, up to six trunk modules. In a typical BSC subsystem, no TRX module is required. To populate the same chassis as of BSC/BTS subsystem, e.g., a base station subsystem (BSS), a suitable configuration may include one clock module, one RF distribution module, up to two CCPU modules, up to two trunk modules, and up to two TRX modules.

A suitable cPBX subsystem may be populated using the same chassis as follows: one clock module, up to three CCPU modules, and up to six trunk modules. In one embodiment, it is also possible to integrate the cPBX and BSC subsystems in one chassis. A suitable configuration for integrating the cPBX and BSC subsystems may include one clock module, up to three CCPU modules, and up to six trunk modules. Further, it is possible to integrate BTS, BSC and cPBX subsystems in a single chassis. By way of example, a suitable configuration may include one clock module, one RF distribution module, up to two CCPU modules, up to two trunk modules, and up to two TRX modules. It should be noted that some of the above-mentioned modules may be physically similar from a hardware perspective if programmable logic is used and configuration essentially involves the loading of the appropriate software into memory for running on the CCPU and for configuring the TRX modules.

Although the specific embodiment of FIG. 11A discusses a common backplane having nine slots, it should be apparent to those of skill in the art that a greater or fewer number of slots may be provided in a common chassis. In fact, one embodiment contemplates providing eighteen slots for a chassis. Furthermore, a greater or fewer number of CCPU modules may be provided with each subsystem to appropriately provide for the desired level of processing resource. For example, increasing the processing resource in a BTS subsystem may improve hand-over management and radio resource management. In one embodiment, each CCPU may be specifically associated with a set of trunk modules to facilitate efficient processing. The ability to add or remove processing resources to facilitate specific system requirements relates to the inventive modular aspect of the present invention.

In one embodiment of the present invention, switching decisions are made at the cPBX subsystem (by the private MSC) for all calls, including calls between two MS units within the private cPBX network. Although the switching decision is made at the cPBX level, the present invention, in one embodiment, preferably cross-connects bearer data channels at as low a level in the private cPBX network hierarchy as possible. To illustrate, FIG. 12 shows a simplified multi-site configuration including cPBX subsystems 650, 652, and 680 coupled together via a link 654.

Figure 12:
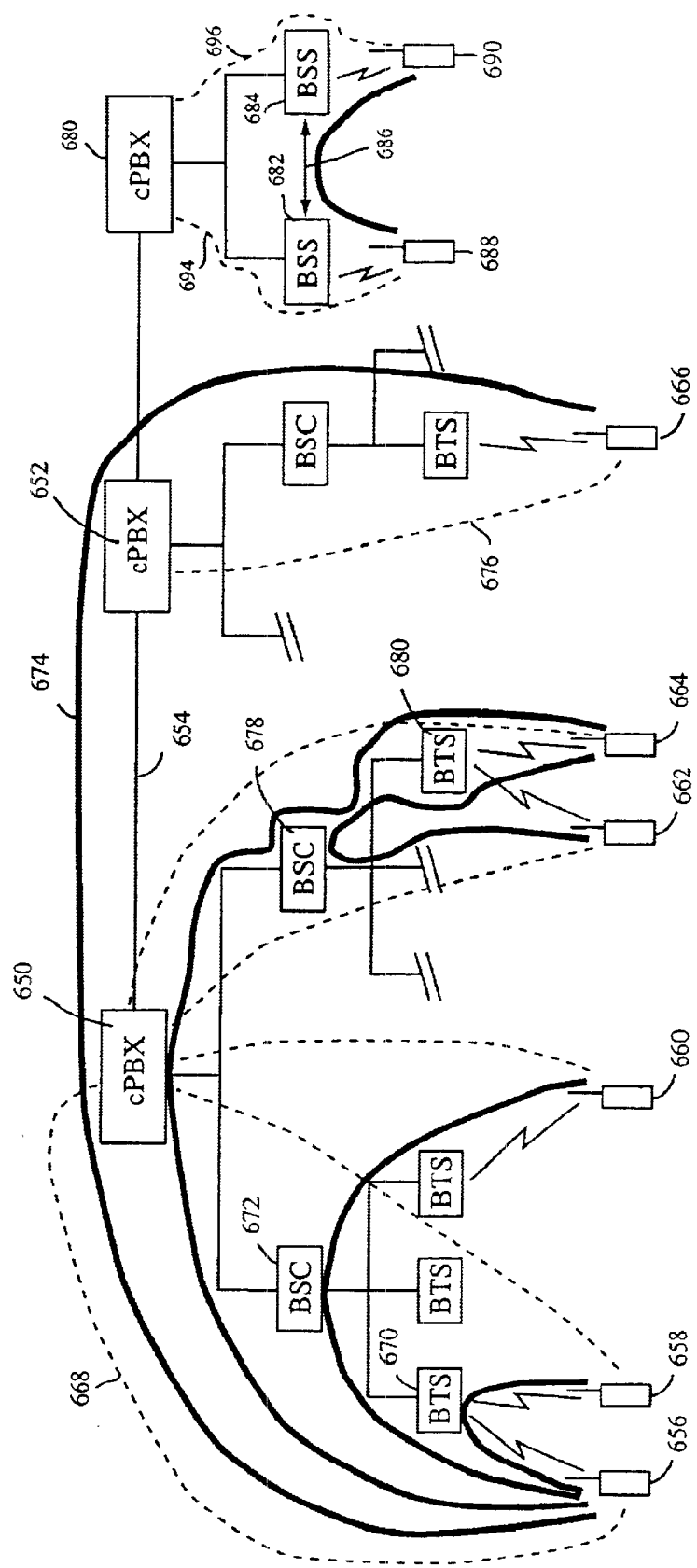
FIG. 12 shows a simplified multi-site configuration, including their possible signaling and bearer data paths.

In FIG. 12, there is shown a plurality of MS units 656, 658, 660, 662, 664, and 666. In the embodiment of FIG. 12, an MS unit, e.g., MS unit 656, preferably builds its signaling session all the way to the cPBX that controls the location area in which MS unit 656 is currently located, e.g., cPBX subsystem 650. The signaling session between MS unit 656 and cPBX subsystem 650 is shown representatively in FIG. 12 by dash line 668.

As noted before, although the signaling session may extend all the way from an MS unit to a cPBX subsystem, the actual cross-connection between bearer data channels may be accomplished at a lower level in the private cPBX network hierarchy. For example, the cross-connect between bearer data channels of MS units 656 and 658 may actually occur at BTS subsystem 670. For calls between MS unit 656 and MS unit 660, the actual cross-connect of the bearer data channels may be made at BSC subsystem 672 although the signaling session represented by dash lines from each MS unit may reach all the way to cPBX subsystem 650. Of course cPBX subsystem 650 may perform the cross-connect of bearer data channels itself, e.g., for calls between MS unit 656 and MS unit 664.

When calls are made to an MS unit in a location area controlled by another cPBX subsystem, the cross-connect may be made by more than one cPBX subsystem. This is the situation represented by bearer data path 674 between MS units 656 and MS unit 666 via cPBX subsystem 650, link 654, and cPBX subsystem 652. Note that the signaling session of MS unit 656 again is made to cPBX subsystem 650 via path 668, and the signaling session from MS unit 666 is made to cPBX subsystem 652 via path 676 as shown. In certain cases, the bearer data channel that carries data between MS unit 662 and MS unit 664 may be cross-connected at a BSC subsystem 678 instead of a BTS subsystem 680 if BSC subsystem 678 is better equipped to perform the cross-connect. This situation arises when, for example, MS unit 662 and MS unit 664 communicate at different rates and BTS 680 is unequipped to perform the rate conversion, e.g., not having adequate TRAU resource. In this case, the intelligence within cPBX 650 advantageously directs BSC subsystem 678, which for the purpose of illustration includes the necessary TRAU resource for performing rate conversion, to perform the actual cross-connect between the bearer data channel from MS unit 662 and bearer data channel from MS unit 664. In this case, BTS subsystem 680 will simply permit bearer data to and from MS unit 664 to traverse it to a higher level in the private cPBX network. For further information regarding the intelligent cross-connecting aspect of the present invention, reference should be made to co-pending patent applications entitled "Methods and Apparatuses for an Intelligent Switch" Ser. No. 08/435,838, and "Cellular Base Station with Intelligent Call Routing" Ser. No. 08/434,598, filed on the same date and incorporated herein by reference in their entirety for all purposes.

FIG. 12 further shows a cPBX subsystem 680 coupled with cPBX subsystems 650 and 652 as well as with BSS's 682 and 684. Within the domain of cPBX subsystem 680, shown are two MS units 688 and 690. For purpose of illustration, BSS's 682 and 684 are directly coupled via link 686. Although signaling sessions from MS units 688 and 690 reaches cPBX subsystem 680 (via dashed lines 694 and 696 respectively), the actual cross connect of their bearer data channels may be made via BSS's 682 and 684 via link 686 without going through cPBX subsystem 680. It should be noted that each of BSS's 682 and 684 preferably has within it switching circuitries for switching calls among MS units that are in its domain. When a BSS unit, for example BSS 682, lacks sufficient resources, e.g. TRAU for performing rate conversion, to properly complete a call path between MS units in its domain, it may pass the bearer data channels from those MS units up to an upstream cross connect node, which happens to be cPBX subsystem 680 in FIG. 12, permitting cPBX subsystem 680 to furnish additional resources to properly cross connect and complete the call path.

FIGS. 13A–22 shows in a flowchart format the steps taken by the private cPBX network in performing MS unit location update, MS unit call origination, and MS unit call termination from both the perspective of the MS unit and of the cPBX subsystem.

FIG. 13A shows in a simplified format a HLR/VLR registry, e.g., registry 424 of FIG. 5B. The HLR contains information pertaining to all home MS units. The information contained in a HLR may include subscriber information, supplemental service (SS) information, or the like. In a network of multi-site cPBX's, the HLR/VLR registry information is duplicated in all interconnected cPBX's.

The VLR registry contains information pertaining only to the MS units (whether or not that MS unit is home to the cPBX associated with that VLR registry) that are currently in the location area controlled by the cPBX associated with that VLR registry. In this manner, a VLR registry may contain information about MS units that are currently home if these MS units happen to be home to the cPBX associated with that VLR registry. The VLR registry further includes information pertaining to the MS units that have roamed into the location area controlled by the cPBX associated with that VLR registry.

Referring now to FIG. 13A, each record preferably includes a field for storing the IMSI of the MS unit. The IMSI or optionally some abbreviated version of the IMSI may be used to uniquely identify a record in the registry. In one embodiment, the IMSI is used for recognizing MS units that are authorized to use the resources of the private cPBX unit network in the stand-alone, stand-alone with wired PBX adjunct, or multi-site configuration.

A typical HLR/VLR registry record further includes the telephone number assigned to the MS unit, subscriber information such as name, social security number, billing address, billing information, supplemental services subscribed by a particular MS unit, and the like. Typically, there is also included information regarding the home location, i.e., the cPBX subsystem considered to be home to a particular MS unit associated with a record, and current location, i.e., the location area at which the MS unit associated with the record is currently located. In one embodiment, both the HLR and the VLR registries are advantageously combined in one database. The home location and current location fields of the record then furnish information regarding whether a given MS unit is home to a cPBX and where in the network that MS unit currently locates. By way of example, if the data in the current location field differs from the data in the home location field, the MS unit has roamed away from its home location area. Depending on need and configurations, the HLR/VLR registry may include a greater or fewer number of fields as appropriate.

As mentioned previously, HLR/VLR registry information in a network/multi-site configuration is, in one embodiment, duplicated among the cPBX's. The coordination of HLR/VLR registry information among the cPBX subsystems of a multi-site configuration facilitates roaming by providing information for building calls to MS units that have roamed away from its home location area. This is different from the prior art wireless PBX system, e.g., wireless PBX system of FIG. 1 in which the cordless phone sets have no ability to roam either from base to base or from wired PBX unit to wired PBX unit.

In one embodiment, the HLR/VLR registry records are advantageously defined using a GSM format. In some configurations, e.g., hybrid or private GSM, the use of a standard GSM format in the private HLR/VLR registry facilitates coordination with the public HLR/VLR registry for the purpose of handling MS units that can operate either under control of the private cPBX network or directly under control of the public network. Configuration of the private HLR/VLR registry may be performed by the system operator during periodic update/maintenance periods. During these periodic update periods, the system operator may create a new record, delete a record, obtain a record for review, or set a record to edit information in a record.

During run time, updates to the private HLR/VLR registry are preferably performed via the MSC subsystem (unless otherwise indicated, the MSC or HLR/VLR registries mentioned in FIGS. 13B–22 refers to the MSC subsystem or the HLR/VLR registry of the private cPBX network). The current location of an MS unit is preferably determined as MS units periodically checks in. If an MS unit is not turned on, the signaling session ends after a predetermined period and is assumed off by the HLR/VLR registry. In this case, the current location entry of the record associated with the inactive MS unit preferably reads NOT AVAILABLE, or some version of that message. The MSC subsystem associated with a cPBX subsystem receives the IMSI from an MS unit and accesses the private HLR/VLR registry for authentication for location updates or building calls. For an MS unit that have roamed from its home location area, the MSC subsystem where that MS unit is currently located receives the IMSI belonging to that MS unit and updates its own HLR/VLR registry (which is then used to update all HLR/VLR registry in a multi-site configuration).

FIG. 13B shows in a simplified flowchart format the steps involved when an MS unit wishes to update its location with the private HLR/VLR registry of the private cPBX network. FIG. 13B starts at block 700. At block 702, an updating MS unit sends to a BSC subsystem via a BTS subsystem a location update request. Typically a location update request include the IMSI of the updating MS unit. In one embodiment, the location update request may contain a version of the IMSI, known as a TMSI (temporary MSI that is used in place of the IMSI for, among others, security reasons). The identity of the MS unit, via either the IMSI or TMSI, uniquely identifies the MS unit that desires a location update.

At block 704, the BSC subsystem forwards to the MSC subsystem a SCCP connect request for the MS unit that sent the location update request in block 704. SCCP (Signaling Connection Control Part) connect request preferably represents, in one embodiment, a message conforming to signaling system 7 (SS7) or the A interface between the BSC and the private MSC function on the cPBX. Typically, the SCCP connect request encapsulates the location update request sent by the updating MS unit in block 702. Block 702 and 704 builds the mobility management (MM) session.

In block 706, the MSC subsystem sends to the BSC subsystem a SCCP connect confirm to validate that an MM connection is established. In block 708, the MSC subsystem sends to the private HLR/VLR registry a process access request, which request includes the information contained in the location update request received at block 702, to ascertain via the private HLR/VLR registry whether the MS unit that is requesting the location update is "authorized", i.e., allowed to use the private network resources, and whether the updating MS unit has roamed away from its last location, necessitating an update in the private HLR/VLR registry.

In block 710, the private HLR/VLR registry processes the received access request which was sent in block 708. Block 710 is more fully explained in a subsequent FIG. 14. In block 712, the private HLR/VLR registry sends the MSC a location update confirm, indicating whether the updating MS unit is authorized to use the resources of the private cPBX network. If the updating MS unit is authorized to use the resources of the private cPBX network, the location update confirm preferably further includes information indicating whether a location update has been performed in the HLR/VLR registry. In decision box 714, it is ascertained whether the updating MS unit is authorized (from the location update confirm received in block 712). If it is determined in block 714 that the updating MS unit is authorized to use the resources of the private cPBX network, the method proceeds to block 716 wherein a location update confirmed message is sent from the MSC to the BSC.

In block 720, the SCCP clear message is sent from the MSC subsystem to the BSC subsystem to clear the MM session built in block 702 and block 740. Subsequent to blocks 720, the BSC that receives the SCCP clear message in block 720 clears the channel all the way to the updating MS unit. In block 724, the BSC that receives the SCCP clear message in block 720 returns a clear complete message to the MSC, indicating that the MM session has been completely cleared. In block 726, the steps involved in updating location from an MS unit via an MSC is finished.

On the other hand, if it is ascertained in block 714 that the updating MS unit is not authorized to use the resources of the private cPBX network, the method immediately proceeds to block 728-734 to clear the SCCP or MM session. In block 728, the MSC subsystem sends to the BSC subsystem a location update reject message, indicating that the request to update location by the updating MS unit cannot be processed. In block 730, the MSC subsystem sends to the BSC subsystem an SCCP clear message to begin clearing the MM session. Subsequently, the BSC clears the channel all the way to the updating MS unit. In block 734, the BSC subsystem sends to the MSC subsystem a clear complete message, indicating that the MM session built in blocks 702 and 704 is cleared. Thereafter, the method proceeds to blocks 726 where the steps of FIG. 13B end.

Figure 14:
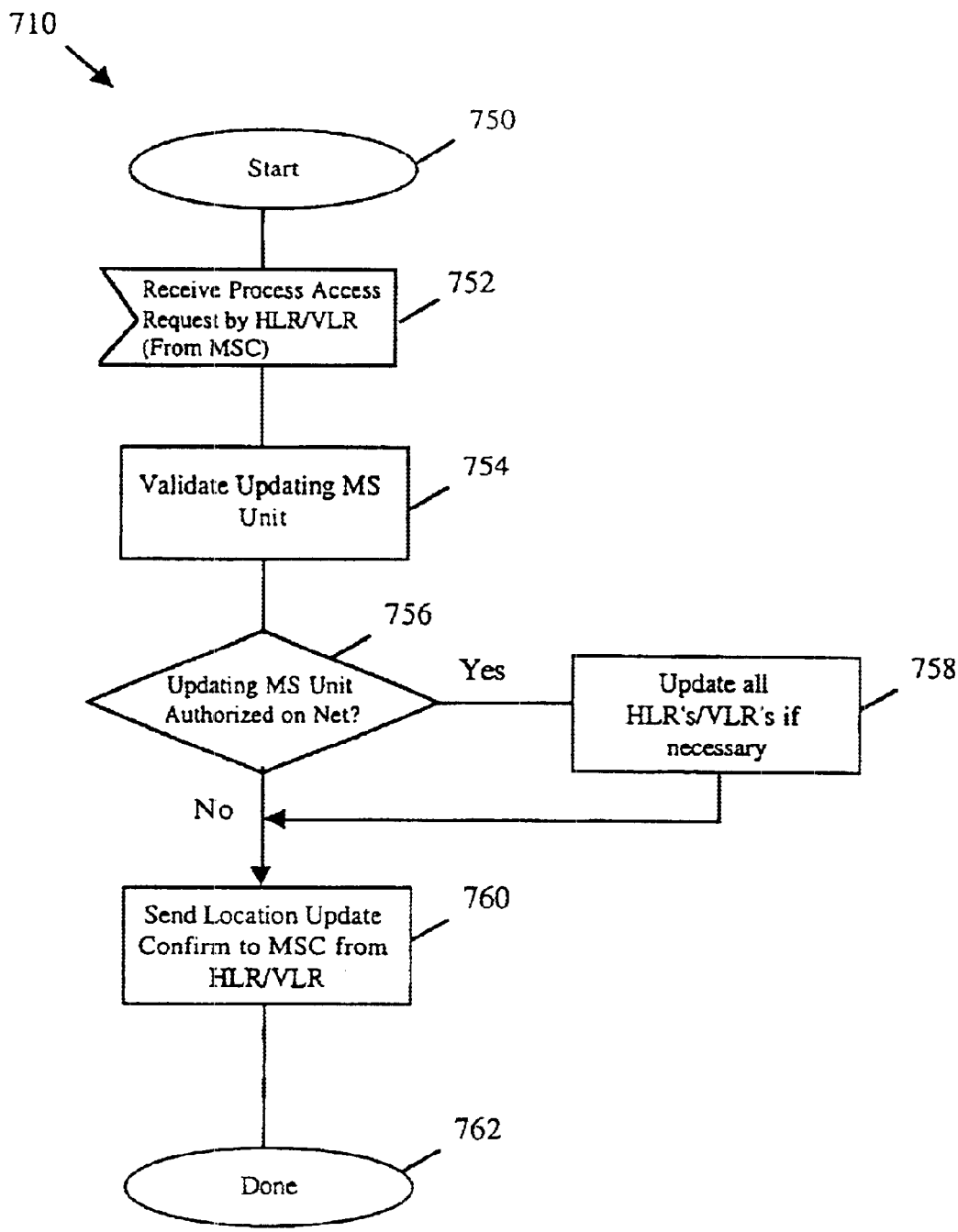
FIG. 14 shows in a simplified flowchart format the steps involved when a private HLR/VLR registry processes a received access request.

FIG. 14 shows in a simplified flowchart format the steps involved when the private HLR/VLR registry processes the received access request in block 710 of FIG. 13B. FIG. 14 starts at block 750. From block 750, the method proceeds to block 752 wherein the process access request message sent by the MSC subsystem of block 708 of FIG. 13B is received. In accordance with one aspect of the present invention the IMSI associated with the updating MS unit is checked, in block 754, against all entries in the private HLR/VLR registry to determine whether the updating MS unit is registered to use the resources of the private cPBX network. Advantageously, the validation procedure may be used in, for example, the stand-alone cPBX, stand-alone cPBX with a wired PBX adjunct, a multi-site cPBX to screen out GSM MS units that are not native to the private cPBX network to prevent an influx of non-native MS units from overwhelming the resources of the private cPBX network. In this manner, access to the resources of the private cPBX network by native or authorized MS units or the probability of such access is enhanced.

Optionally, block 754 may further include certain security functions such as password checking, challenging, authenticating, or the like. If it is ascertained in block 756 that the updating MS unit is authorized the use of resources of the private cPBX network, the network proceeds to block 758 to update all private HLR's/VLR's registries if necessary. In block 758, the identity of the updating MS unit is checked to see whether its location needs to be updated in the HLR/VLR registry that receives the process access request (and also in all HLR and VLR registries if a network of cPBX is involved). Block 758 is discussed in greater detail in FIG. 15.

Following the update of HLR/VLR registries in block 758 or if the updating MS unit is not authorized to use the resources of the private cPBX network (in some configurations and as determined in block 756), the method proceeds to block 760 wherein the private HLR/VLR registry sends a location update confirm to the MSC subsystem. As mentioned earlier in connection with block 712 of FIG. 13B, the location update confirm sent in block 760 indicates whether the updating MS unit is authorized to use the resources of the private cPBX network and if it does, whether an update to one or more private HLR/VLR registries has been performed. In block 762, the step of FIG. 14 end.

Figure 15:
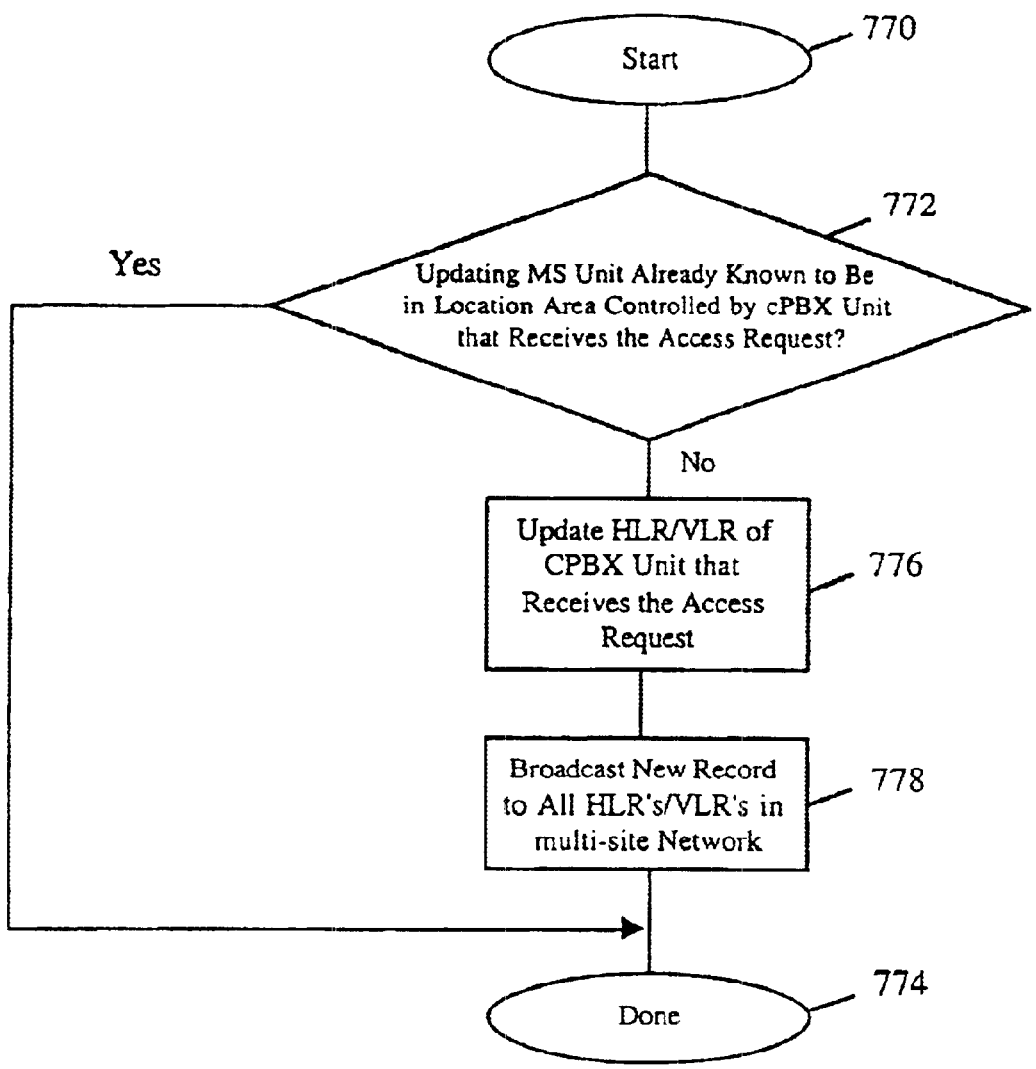
FIG. 15 shows in a simplified flowchart format the steps involved in updating all HLR/VLR registries.

FIG. 15 shows in a simplified flowchart format the steps involved in updating all HLR/VLR registries if necessary of block 758 of FIG. 14. FIG. 15 starts at block 770. In block 772 the updating MS unit is checked against the HLR/VLR registry associated with the cPBX subsystem that receives the access request to determine whether it is already registered to be in the location area controlled by the cPBX that received the access request. In other words, the method determines whether the updating MS unit has moved from its last known location area. In one embodiment, the HLR/VLR registry associated with the cPBX subsystem that receives the access request is checked to see whether the updating MS unit was last registered to be within the location area controlled by it. If the updating MS unit has not roamed from its last known location area, the method proceeds to block 774, representing the end of the steps of FIG. 15. On the other hand, if the updating MS unit has roamed away from its last know location area (as determined in block 772), the method proceeds to block 776 to update the HLR/VLR registry associated with the cPBX subsystem that receives the access request.

If the cPBX is connected to other cPBX's in a multi-site configuration, the method optionally proceeds to block 778 to broadcast the newly edited HLR/VLR record, reflecting the changed current location area of the updating MS unit, to all HLR/VLR registries in the multi-site network for their updates. Note that it is not necessary in the stand-alone or stand-alone with a wired PBX adjunct configuration to broadcast the changed record to any other cPBX's (since there is none). From block 778, the method proceeds to block 774 wherein, as mentioned earlier, the steps of FIG. 15 end.

Figure 16:
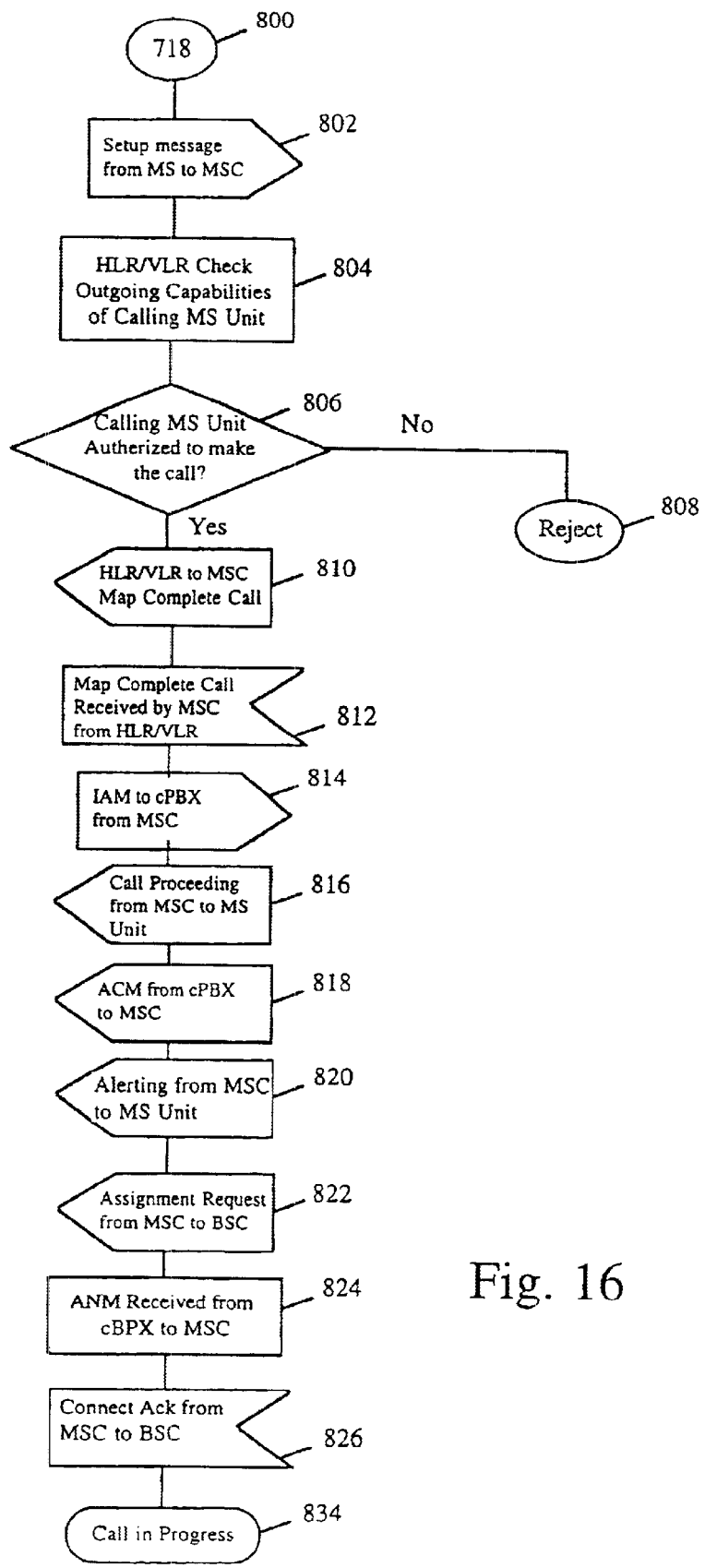
FIG. 16 shows in a simplified flowchart format the steps taken by the various subsystems of a private cPBX network when an MS unit originates a call from inside a private cPBX network.

FIG. 16 shows in a simplified flowchart format the steps taken by the various subsystems of the private cPBX network when an MS unit originates a call from inside the private cPBX network. The steps of FIG. 16 start where FIG. 13B (MS location update) leaves off following block 716. This is because it is still necessary for the MS unit to build the MM session (blocks 702 to 706), sends a process access request to the HLR/VLR registry for processing (blocks 708–712), disabling the MS unit from using the resources of the private cPBX network if such usage is not authorized (blocks 714, 728, 730, and 734), and permits the call to proceed if the updating MS unit is authorized to use the resources of the private cPBX network (blocks 714, and 716).

Since the steps of FIG. 16 involves an MS unit making a call instead of merely requesting a location update (as is the case of FIG. 13B), there is preferably a flag or some type of message sent to the HLR/VLR registry along with the process access request sent in block 708 of FIG. 13B during call building to inform the HLR/VLR registry that a call and not a location update is being attempted. As is apparent to those of skills in the art, the calling MS unit may inform the cPBX subsystem using any method of signaling that is convenient to implement. Further, since the steps of FIG. 16 is not a location update attempt, it is typically not necessary to update the HLR/VLR registry regarding the location of the calling MS unit when a call is attempted. In the context of the present implementation, blocks 758 and corresponding steps of FIG. 15 are not performed in one embodiment when an MS unit is building a call. In the particular implementation described herein, the method proceeds from block 756 to block 760 directly if it is ascertained that the calling MS unit is authorized to use the resources of the private cPBX network.

From block 800, the method proceeds to block 802 wherein the calling MS unit sends the MSC (via the BTS and BSC) a setup message which typically includes, among others, the destination phone number and information indicating whether the call to be built is voice, data, fax, and the like. In block 804 the HLR/VLR registry associated with the MSC that receives the set up message in block 802 validates whether the call attempted is permissible. By way of example, certain handsets, although authorized to use the private network resources, may be blocked from attempting to make calls to certain external areas, e.g., overseas or long distance. Block 804 is explained in greater detail in a subsequent FIG. 17.

Consequently, in block 806, it is ascertained whether the calling MS unit is authorized to make the call attempted. If not, the method proceeds to block 808 to reject the attempt and to clear the MM session. The call attempted is also rejected, in block 808, if the caller attempts to use a supplemental service (SS) after calling MS unit has not subscribed to or is unavailable to the private cPBX network. After it is determined in block 806 that the call should be rejected, an SCCP clear message is preferably sent from the MSC to BSC to clear the MM session all the way to the MS unit. After the MM session is cleared, the BSC sends a clear complete message from the BSC to the MSC. In one embodiment, the steps taken to clear the SCCP connection or the MM session is analogous to the steps taken in blocks 728, 730, and 734 of FIG. 13B.

On the other hand, if it is determined in block 806 that the MS unit is indeed authorized to make the call, the method proceeds to block 810 where the HLR/VLR registry sends a map complete call which is a mobile-application-part type of message to the MSC. The map complete call sent in block 810 is received by the MSC from the HLR/VLR registry in block 812. In block 814 the MSC sends the cPBX an initial address message (IAM) which in the GSM implementation includes the destination phone number to indicate its desire to connect to a particular destination phone. If intelligent switching is involved, it is the cPBX that decides the optimal cross-connect point, e.g., via BTS, BSC, cPBX or forwards the call to a wired PBX, a public network, or another cPBX.

In block 816 the MSC sends to the MS unit a call proceeding message responsive to a validation of the destination phone to indicate that the call is being processed. In block 818, an addressed complete message (ACM) is sent from the cPBX to the MSC to indicate that the entire destination number (the dialed number) has been received and that the call has been connected to its destination. The receipt of the ACM message by the MSC also signifies a successful alerting on the called party, i.e., the destination phone is ringing. In block 820, the MSC sends to the MS unit, responsive to the receipt of the ACM message received in block 818, an alerting message to the MS unit to inform the MS unit that the party called is being alerted and to turn on the ringer at the calling MS unit.

In block 822 the MSC sends the BSC an assignment request message to assign channel for the bearer, e.g., the actual voice/data, channel on the A interface and to instruct the BSC to use the assigned channel to build the call. The assigned channel represents the channel on which the calling MS unit may send and receive its bearer data. It should be noted that the steps in block 822 may occur asynchronously with respect to the other steps of FIG. 16. In one embodiment, the MSC sends the assignment request to the BSC right after the MSC sends to the cPBX the IAM message (block 814). After the alerting message is received by the MS unit, the ringer circuit at the calling MS unit continues to ring until either the called party picks up the call or the caller hangs up, in which case the MM session is again cleared in the manner earlier discussed.

In block 824, it is assumed that the called party picks up the call and the cPBX, in particular the GMSC portion of the cPBX, sends an answer message (ANM) message to the MSC to indicate that the called party has answered the call by picking up. In block 826, the MSC sends to the BSC the connect acknowledged message, responsive to the receipt of the ANM message in block 824 to instruct the BSC to connect the received (incoming) path as well as the call (outgoing) path. In block 834 both the calling and the called party are connected all the way through and the call is now in progress.

Figure 17:
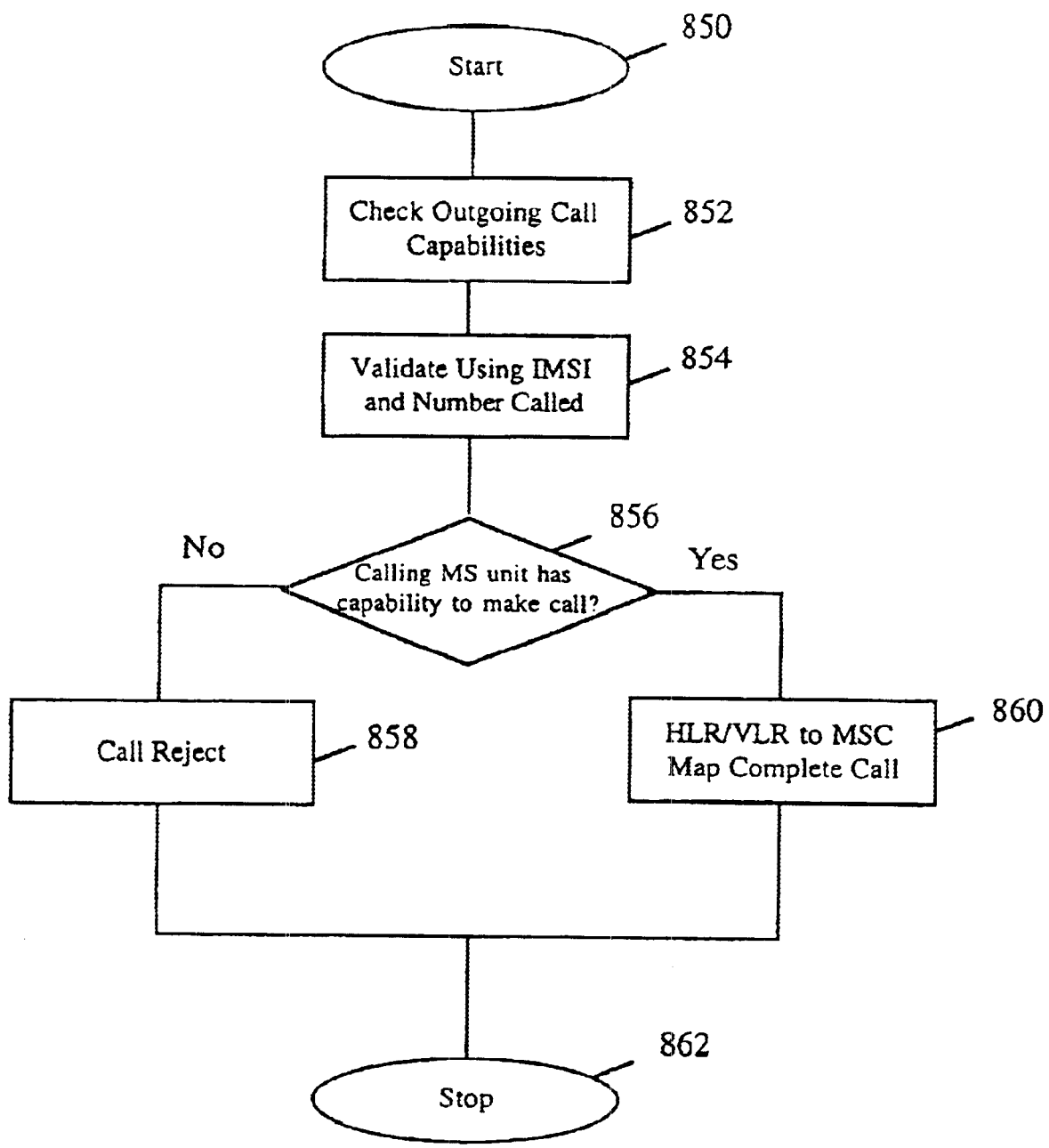
FIG. 17 shows in a simplified flowchart format the steps involved when a HLR/VLR registry checks the outgoing call capabilities of the calling MS unit.

FIG. 17 shows in a simplified flowchart format the steps involved in block 804 of FIG. 16 (when the HLR/VLR registry checks the outgoing call capabilities of the calling MS unit). FIG. 17 starts at block 850. In block 852, the calling MS unit is checked against the HLR/VLR registry entries to determine whether this calling MS unit can make the call to the destination indicated by the telephone number dialed. In block 854, the validation is performed using the IMSI, or some derivative of the IMSI that uniquely identifies the calling MS unit, e.g., the aforementioned TMSI, and the telephone number dialed. The IMSI uniquely identifies the calling MS unit in the HLR/VLR registries along with this calling capabilities. The telephone number dialed indicates the destination of the call, which is then checked against the HLR/VLR registry to determine whether or not the calling MS unit can make the call attempted.

In block 856, it is ascertained whether the calling MS unit has the capability to make the call attempted. If not, the call is rejected in block 858, representing block 808 of FIG. 17. Thereafter, the method proceeds to block 862 where the steps of FIG. 17 end. On the other hand, if it is determined in block 856 that the calling MS unit indeed has the capability to make the call attempted, the method proceeds to block 860 wherein the HLR/VLR registry sends to the MSC a map complete call message, representing block 810 of FIG. 16. Thereafter, the method proceeds to block 862 where in, as discussed earlier, the steps of FIG. 17 end.

Figure 18:
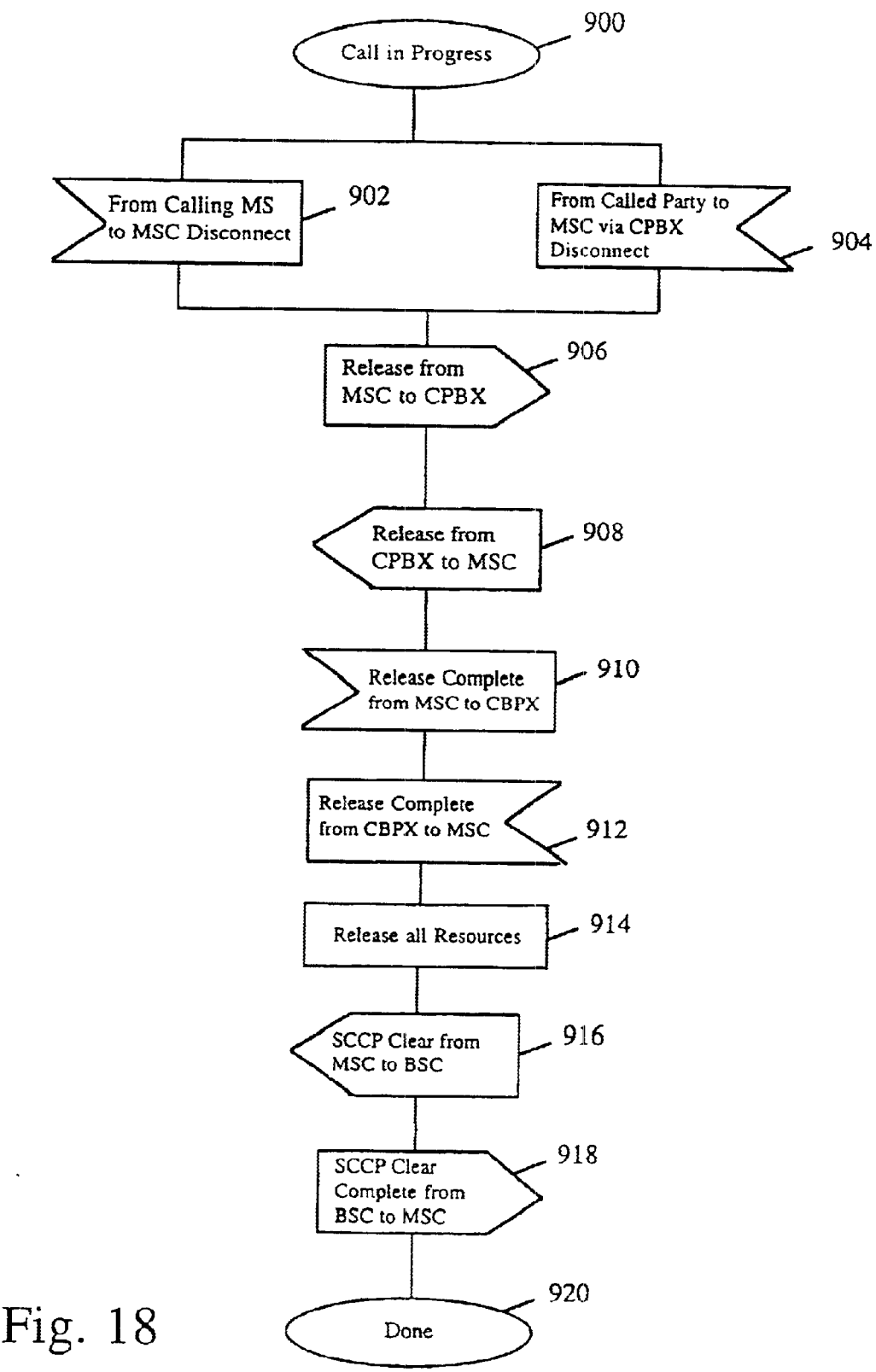
FIG. 18 shows in a simplified format the steps taken by the various subsystems of the private cPBX network in disconnecting a call.

FIG. 18 shows in a simplified format the steps taken by the various subsystems of the private cPBX network in disconnecting a call. A call is disconnected either because the calling party hangs up or the called party disconnects the call. It should be noted that the call may also be disconnected when an MS unit in the call path roams out of range, in which case the signaling session ends after a predetermined time period. FIG. 18 starts at block 900, representing a call currently in progress, e.g., a call built via the steps of FIG. 16.

The call is disconnected when either the calling party disconnects in block 902 or the called party disconnects in block 904. In block 902, the MSC receives from the calling MS unit a disconnect message, signifying that the calling party either has hung up or has roamed out of range. On the other hand, in block 904 the MSC receives from the called party via the cPBX a disconnect message, signifying that the called party either has hung up or has also moved out of range. In block 906 the MSC sends to the cPBX a release message to be forwarded to the called party responsive to the receipt of the disconnect message in either block 902 or block 904. The called party may be in the private cPBX network or outside of it, in which case the release message is forwarded via the GMSC. In block 908 the called party sends to the MSC via the cPBX a release message signifying the release authorization.

In blocks 910 and 912, release completion is acknowledged. In block 910 the cPBX receives from the MSC a release complete message responsive to the release message sent in block 908. Similarly, in block 912 the MSC receives from the cPBX the release complete message responsive to the release message sent in block 906. In block 914 all resources that are associated with the call being disconnected, e.g., TRAU, echo canceling, DSP, or the like, are released.

In block 916 and 918 the MSC clears the MM session all the way to the calling MS unit. In block 916, the MSC sends to the BSC a SCCP clear message to initiate clearing of the MM session. Thereafter, the BSC clears the MM session all the way to the calling MS unit. In block 918, the BSC sends back to the MSC an SCCP clear complete message indicating that the MM session has been cleared. In block 920, the steps of FIG. 18 end.

Figure 19:
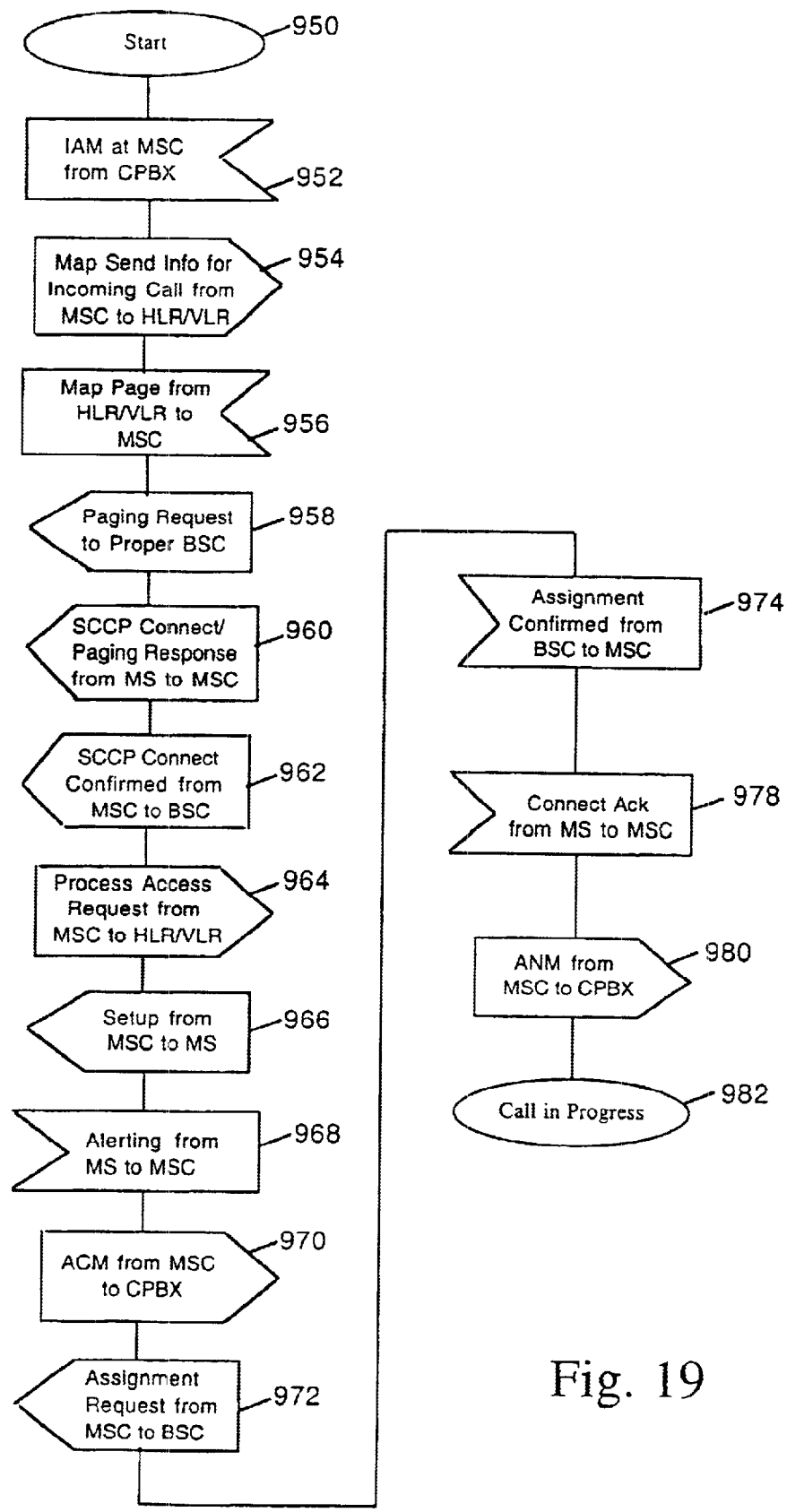
FIG. 19 shows in a simplified flowchart format the steps involved when an MS unit of a private cPBX network acts as a receiving unit to receive a call initiated either from the external network or from another MS unit in the private cPBX network.

FIG. 19 shows in a simplified flowchart format the steps involved when an MS unit of the private cPBX network acts as a receiving unit to receive a call initiated either from the external network or from another MS unit in the private cPBX network. FIG. 19 starts at block 950. In block 952, the MSC receives an initial address message (IAM) message from the network through the cPBX for a call that is terminating at an MS unit considered home to this MSC. If the calling unit is another MS unit in private cPBX network, the AM message received in block 952 represents substantially the same IAM message sent by the calling MS unit in block 814 of FIG. 16.

In block 954, the MSC sends a map send information service request for the incoming call to the local HLR/VLR registry to locate the MS unit represented by the telephone number in the IAM message. In one embodiment, block 954 involves determining the current location of the destination MS unit in the private cPBX network (e.g., whether it has roamed away from its home location area), the IMSI number that corresponds to the telephone number received in the IAM message, the particular services subscribed to by the destination MS unit, and the like. In block 956 the HLR/VLR registry, after locating the current location area of the destination MS unit in block 954, sends a map page message to the MSC to request the MSC to page the destination MS unit by either its IMSI or some version thereof. In block 956, the map page message is sent to the MSC where the MS unit is currently located (as determined after consulting with the private HLR/VLR registry). In one embodiment, both map send information message and map page messages are representative of a type of mobile application part message.

In block 958, the MSC, responsive to receiving the map page message in block 956, sends to the proper BSC a paging request message. The receiving BSC's may be more than one BSC if the HLR/VLR is uncertain regarding which BSC location area the destination MS unit is located. In one embodiment, all BSC's controlled by the cPBX where the destination MS unit currently locates are paged. This is because the HLR/VLR registry typically knows which cPBX of the private cPBX network the destination MS unit is currently located but does not know the exact BSC/BTS which is in the range of the destination MS unit. Responsive to the paging request, the BSC or BSC's page the destination MS unit and wait to hear the paging response from the destination MS unit.

In block 960, if the paging request sent in block 958 reaches the destination MS unit, the destination MS unit then sends a paging response to the BSC (via a BTS), which response is then encapsulated in a SCCP connect request that the BSC subsequently forwards to the private MSC. In one embodiment, if no paging response is received within a predetermined period, it is assumed that the destination MS unit has either roamed out of the private cPBX network or is turned off and the circuit connection is rejected.

In block 962, the MSC, responsive to receiving the SCCP connect message from the BSC in block 960, returns a SCCP connect confirmed message to the BSC. In this manner, the steps in blocks 960 and 962 build the mobility management (MM) session by associating the destination MS unit with a particular SCCP identifier.

In block 964, the destination MS unit that responded with a paging response (block 960) is then validated. The MSC sends to the HLR/VLR registry a process access request service request to validate the responding destination MS unit. In block 964, the destination MS unit for which the paging request was sent (block 958) is further checked to see whether it is authorized or appropriate to establish bearer data communication channel to that destination MS unit.

In block 966, the MSC sends a setup message to the destination MS unit to set up a call. The setup message contains the call control information, e.g., the type of service required (e.g., data/voice/fax) and optionally the calling party's phone number, that is required for setting up the call. In block 967, the MSC sends to the cPBX an address complete message (ACM), signifying to the network that enough of the address (e.g., the dialed phone number) has been received to enable the private cPBX network to locate the destination MS unit. In block 968, the MSC receives from the destination MS unit an alerting message, indicating that the MS unit has acknowledged that a call that terminates on it has been attempted and that ringing may begin.

In block 970, the MSC sends an ACM message to the private cPBX. It should be noted that although block 970 is shown after block 968 in FIG. 19, block 970 in fact occurs asynchronously with respect to the blocks of FIG. 19. By way of example, block 970 may occur as early as immediately following block 952.

In blocks 972 and 974, the bearer data channel resources between the MS unit and the MSC are assigned. In block 972, the MSC sends to the BSC (to be forwarded to the destination MS unit) an assignment request message to assign bearer data channel resources between the MSC and the BSC. The effect is to move the destination MS unit from a signaling only channel (which the MS unit has been on thus far in FIG. 19) to an assigned bearer data channel.

In block 974, the MSC receives from the BSC (which in turn receives from the destination MS unit) an assignment confirmed message, acknowledging the receipt and successful processing of the assignment request message sent by the MSC in block 972. In block 974, the MSC is notified that a successful bearer channel resource assignment, which enables bearer data communication, has been made. In one aspect of the present invention, blocks 972 and 974 involve intelligent cross-connect that delegates the actual cross-connect between the incoming path and the outgoing path for calls between two MS units of the private cPBX network to a lower level in the hierarchy.

In block 978, the MSC receives from the destination MS unit a connect acknowledge message, indicating that the destination MS unit is picked up. Responsive to the received connect acknowledge message in block 978, the MSC sends to the cPBX a answer message (ANM) in block 980 to indicate to the calling unit (which may be in the external network or another MS unit in the private cPBX network) that the destination MS unit has answered by picking up the call. In block 982, the call is now in progress.

Figure 20A:
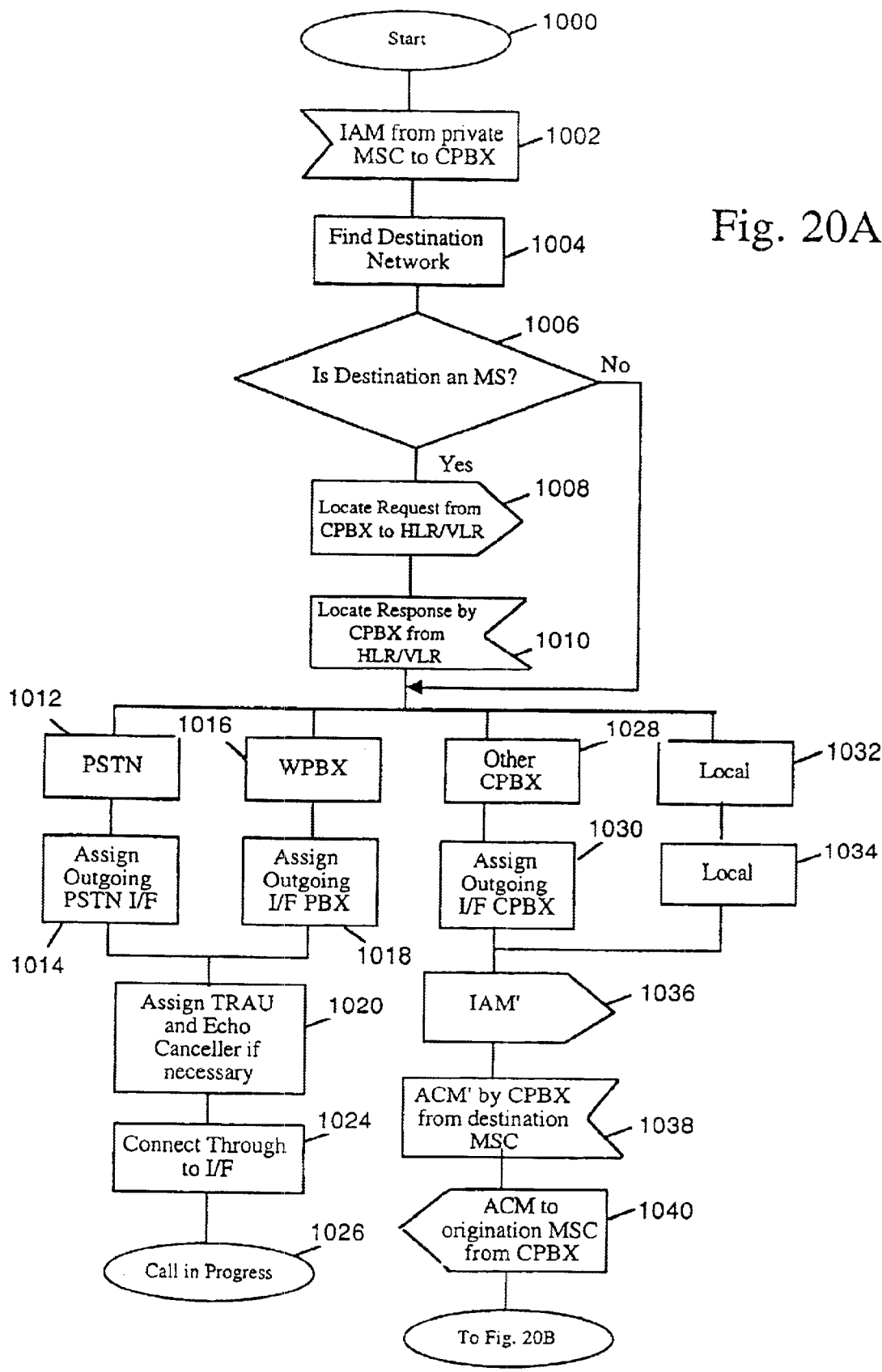
FIG. 20A shows in a simplified flow chart format, from the cPBX perspective, the steps taken when an MS unit of the private cPBX network originates a call.

FIG. 20A shows in a simplified flow chart format, from the cPBX perspective, the steps taken when an MS unit of the private cPBX network originates a call. FIG. 20a starts at block 1000. In block 1002, the cPBX receives an initial address message (IAM) from the private MSC. In one embodiment, the IAM message typically includes the destination (ISDN) phone number dialed. Furthermore, in the GSM implementation, all digits of the destination phone number typically arrive all at once. In other implementations, the digits may arrive one at a time as the number is being dialed.

In blocks 1004, the destination network, whether it is a PSTN, a PLMN, a wired PBX, another cPBX in a multi-site cPBX configuration, or internally within the cPBX that originates the call, is found. In one embodiment, the destination network is ascertained by walking through a dialing tree one digit at a time to ascertain the outgoing path. In block 1006, the method determines whether the destination for the call is another MS unit in the private cPBX network. If it is determined in blocks 1004 and 1006 that the destination of the call is another MS unit in the private cPBX network, the method proceeds to block 1008 wherein the cPBX sends the private HLR/VLR registry, a locate request. By sending the locate request to the HLR/VLR registry, the cPBX takes the dialed phone number, which it receives in block 1002, and consults the HLR/VLR registry for the location of the destination MS unit.

In block 1010, the cPBX receives from the HLR/VLR registry a locate response message which pin points the location of the destination MS unit. After the location of the destination MS unit is determined or if it is determined 1006 that an MS unit is not the destination for the call, the method next proceeds in one of four branches depending on the call path.

If the called party is another phone set in the PSTN network, the method proceeds to block 1012 representing the PSTN path (when the called party is a handset in the Public Land-based Mobile Network, the cPBX acts as a BSS). In this case, the cPBX assigns the appropriate interface for communication with the PSTN, e.g., public network interface 258 of FIGS. 3B, 4B, and 5B, in block 1014.

On the other hand, if the destination of the call is a telephone set in the wired PBX system, the method proceeds to block 1016, representing the wired PBX path. In this case, the cPBX again assigns the appropriate interface for communication with the wired PBX system, e.g., wired PBX interface 352 of FIGS. 4B, 5B, and 6B, in block 1018. Because the destination phone set in either of paths 1012/1016 is located outside the cellular domain, it may be necessary to assign rate conversion and echo canceling resources, i.e., TRAU and echo canceller, if necessary in block 1020.

In block 1024, the method connects the call through to the interface assigned in either block 1014 or block 1018. As can be appreciated by those of skill in the art, block 1024 may further include the exchange of messages, e.g., IAM, ACM, ANM (see, e.g., FIG. 16), and the actual connection from the private MSC to the appropriate interface the GMSC. Thereafter, the call is in progress in block 1026.

On the other hand, if the destination of the call is an MS unit in the domain of another cPBX of the private cPBX network. The method proceeds to block 1028, representing a call path to another cPBX of the private cPBX network. In block 1030, the cPBX assigns the appropriate interface for communication with another cPBX in the private cPBX network, e.g., internal network interface 426 of FIGS. 5B and 6B.

If the destination of the call is an MS unit in the domain of the same cPBX from which the call is originated, the method proceeds to block 1032, signifying that the incoming call path loops back into the same cPBX from which the call is originated and that the actual cross-connection of bearer data channels should be made internally either by the MSC of this cPBX or by another functional block, e.g., BSC, BTS, further down the hierarchy (if intelligent cross-connect is involved).

In block 1034, the cPBX assigns the appropriate interface for communicating with the destination MS unit in the same cPBX that originates the call. In one embodiment, the local interface assigned in block 1034 may be as simple as the location where the cross-connect between the outgoing path and the incoming path.

When the incoming path and the outgoing path are routed within the private network only, it is often not necessary for the cPBX to assign TRAU and echo canceling resources. This is because MS units within the private cPBX network typically communicate at the same rate, eliminating the need for performing rate conversion via a TRAU. If the originating MS unit and the terminating MS unit communicate at different rates, e.g., in Kbps versus 16 Kbps, a TRAU associated with the trunk module units may be switched in as needed. For further information regarding the determination of the optimal cross-connection point based on available resources, reference should be made to the above mentioned co-pending patent applications entitled "Methods and Apparatuses for an Intelligent Switch" Ser. No. 08/435,838, and "Cellular Base Station with Intelligent Call Routing", Ser. No. 08/434,595 which are incorporated herein by reference for all purposes.

From either blocks 1030 or 1034, the method proceeds to block 1036 to begin performing the cross-connect through to the appropriate interface to build the call. In block 1036, the cPBX forwards the IAM message (received in block 1002) as an IAM' to the appropriate interface. An IAM' message is sent in block 1036 to indicate that the message in an on-net type message which may differ from the standard IAM message typically sent off net. In one embodiment, the IAM' message includes information to identify that different resource requirements, e.g., no echo canceling, no TRAU, as well as the communication rates of the MS units. In some cases, some of the above information may be included in the ACM' message as well.

In block 1038, the cPBX that sends out the IAM' message in block 1036 receives an ACM' (address complete message) from a destination MSC, which may be the MSC associated with the cPBX from which the call originates or from an MSC associated with another cPBX in the private cPBX network. In block 1040, the cPBX that receives the ACM' message in block 1038 sends an ACM message to the origination MSC (the MSC associated with the cPBX subsystem in which domain the calling MS unit is located) responsive to receiving the ACM' message in block 1038. From block 1040 of FIG. 20A, the method proceeds to block 1042 of FIG. 20B.

Figure 20B:
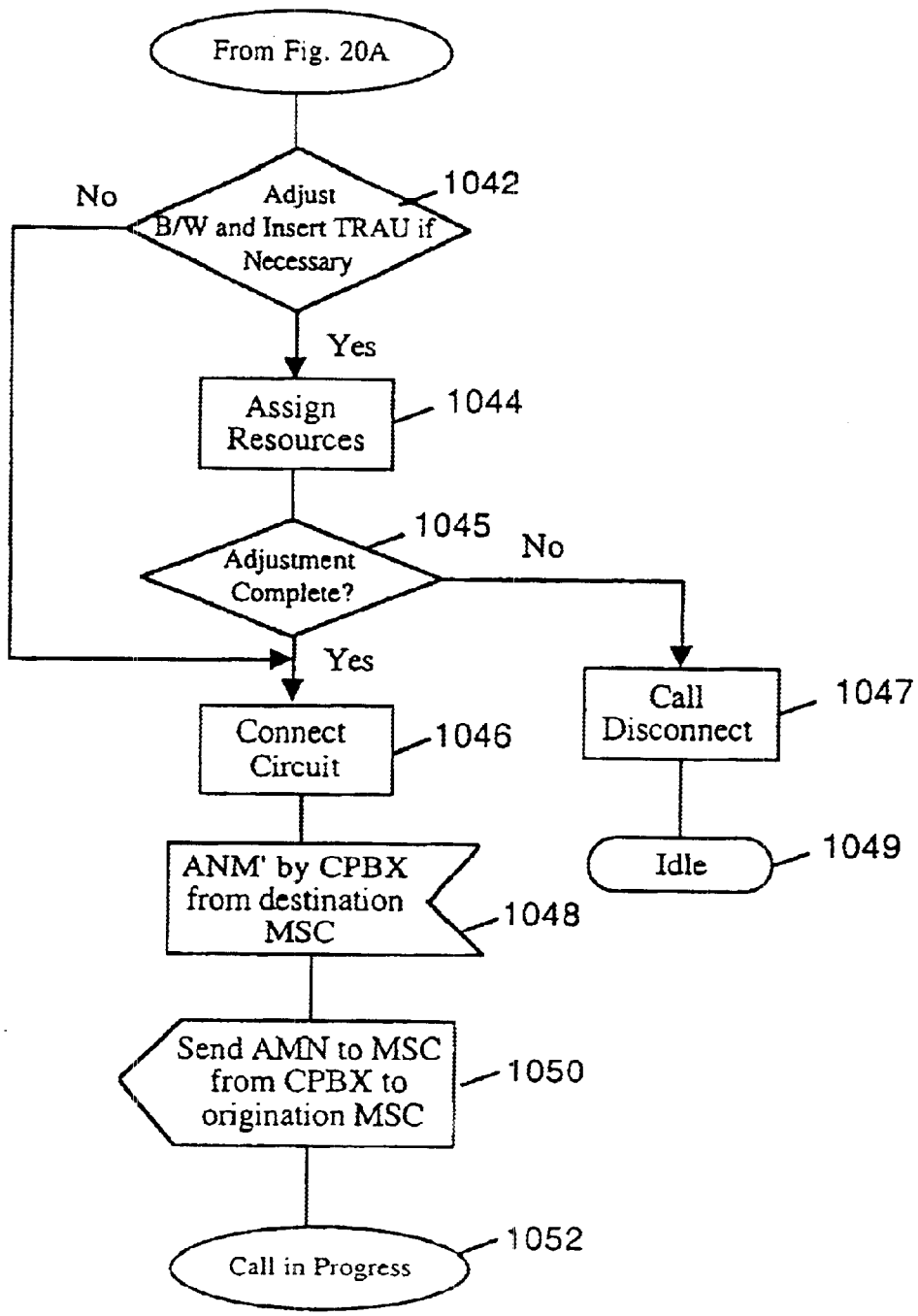
FIG. 20B is a continuation of FIG. 20A.

FIG. 20B is a continuation of FIG. 20A. Referring now to FIG. 20B, the method ascertains in block 1042, based on the information received from the destination MSC in block 1038, whether it is necessary to adjust the bandwidth and to insert TRAU resources to permit MS units that communicate at different rates to establish communication. The information may be encapsulated in the ACM' message in one embodiment. If it is determined in block 1042 that the MS units communicate at different rates and that TRAU resources are necessary, the method proceeds to block 1034 to assign the appropriate resources. It should be noted that unlike the prior art where incoming and outgoing communication channels are automatically TRAUed, e.g., up to 64 Kbps, before communication can be established, the present invention advantageously avoids TRAUing when it is unnecessary, thereby advantageously improving communication quality and decreasing the computational overhead associated with rate conversion. In one embodiment, the assignment of the appropriate resources involve switching in the TRAU resources at the trunk module.

From block 1044, the method proceeds to block 1045 where it checks whether adjustment is successfully completed. If adjustment is not successfully completed (as determined in block 1045), the method proceeds to block 1047 to disconnect the call and then to block 1049, where the circuit enters the idle state.

On the other hand, if adjustment is successfully completed (as determined in block 1045) or if it is determined in block 1032 that there is no need to adjust bandwidth, the method proceeds to block 1046 where the actual cross-connection between the incoming and the outgoing path is performed. As mentioned previously, the actual connection may be made at the MSC, the BSC, or the BTS level in accordance with an intelligence switching scheme. In another embodiment, cross-connection between MS units in the domain of the same cPBX is preferably performed at the MSC level.

In block 1048, the cPBX received from the destination MSC an ANM' message. The ANM' message indicated that the destination call has answered the call. The block 1050, the cPBX forwards an answer message (ANM) to the origination MSC responsive to receiving the ANM' message in block 1028. From block 1050, the method proceeds to block 1052 wherein the call is in progress.

Figure 21:
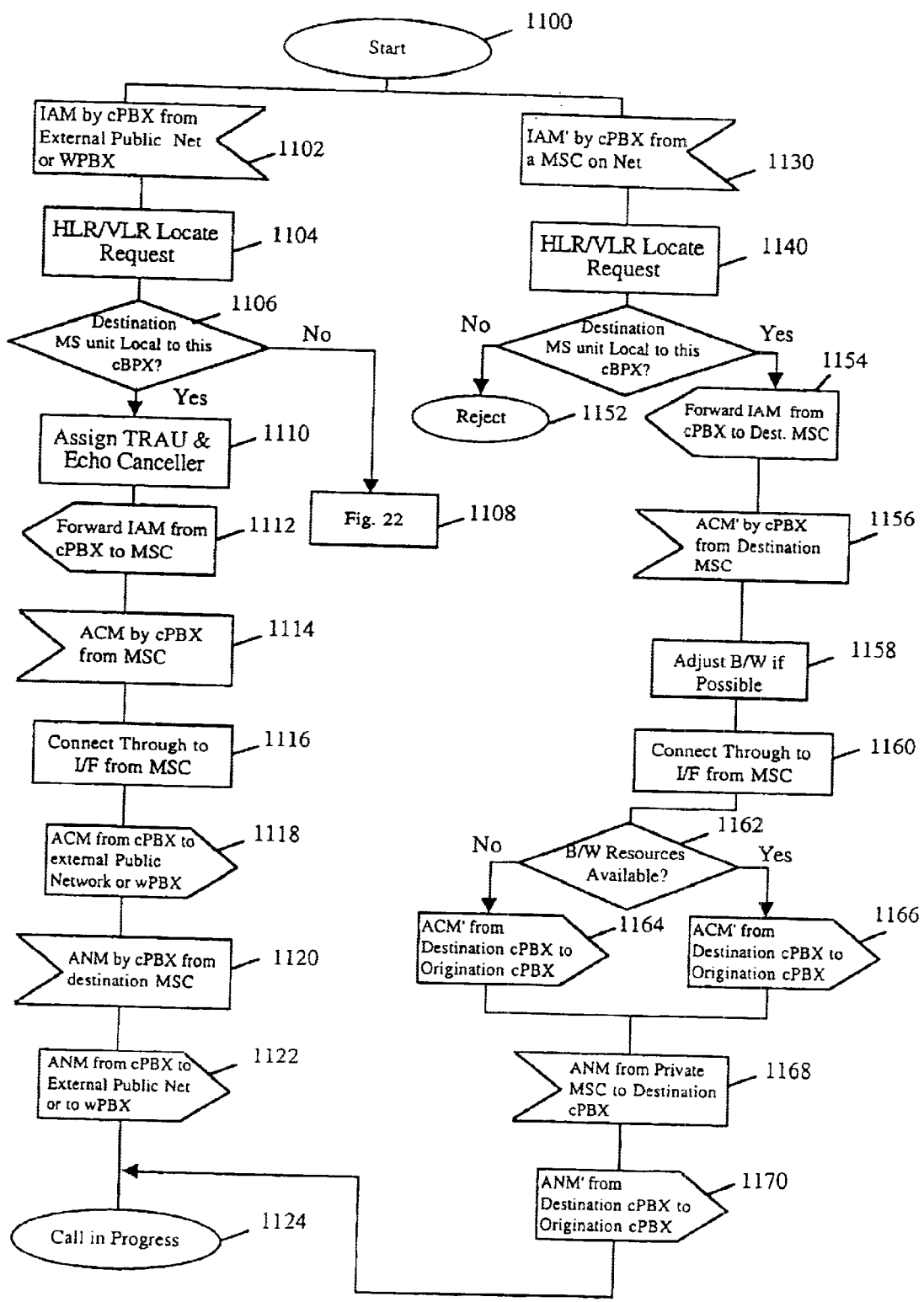
FIG. 21 shows in a simplified flow chart format the steps taken by the cPBX of the present invention, from the cPBX perspective, when a call terminates on an MS unit of the private cPBX network.

FIG. 21 shows in a simplified flow chart format, the steps taken by the cPBX of the present invention, from the cPBX perspective, when a call terminates on an MS unit of the private cPBX network. FIG. 21 starts at block (1110). From block 1100, a distinction is made between calls that originate from the external network or a wired PBX through an appropriate interface and calls that originate from a cPBX in the cPBX network.

The left branch of FIG. 21 starting at block 1102 assumes that an initial address message (IAM) is sent from an external public network or a wired PBX and is received by the cPBX. In block 1104, the cPBX consults with the HLR/VLR registry to locate the destination MS unit in the cPBX network. Block 1104 is necessary in, for example, the multi-site configuration since the destination MS unit may have roamed away from its home location area. In one embodiment, the steps performed in block 1104 of FIG. 21 are analogous to the steps performed in block 1006–1010 of FIG. 20A. If the destination MS unit is not turned on, the signaling session ends after a predetermined time period. As is apparent, block 1004 may be unnecessary in a stand-alone configuration that does not permit an MS unit to roam from cPBX to cPBX.

In block 1106, it is ascertained whether the destination MS unit, whose telephone number is encapsulated in the IAM message received in block 1102, is local to the cPBX that receives the IAM message in box 1102. If the destination MS unit has roamed away (as determined in blocks 1104 and 1106), the method proceeds to block 1108 (which is explored in greater detail in FIG. 22).

On the other hand, if it is determined in blocks 1104 and 1106 that the destination MS unit is currently located in its home location area, the method proceeds to block 1110 wherein the cPBX assigns TRAU and echo canceller as necessary. In block 1110, TRAU and echo canceling resources may be necessary because MS units in a private cPBX network typically communicate at a different rate than phones coupled to either the public network or to a wired PBX.

In subsequent blocks of the right hand path of FIG. 21, the call is set up via an application programming interface (API). In block 1112, the cPBX forward the IAM message received in block 1102 to the MSC. In block 1114, the address complete message (ACM) is received by the cPBX from the MSC signifying that the destination call has received the complete address. In block 1116, the bearer data channel is connected through from the private MSC to the appropriate interface (whether a wired cPBX interface or a public network interface in the GMSC portion of the cPBX). The connecting through between the appropriate interface and the private MSC facilities full duplex communication. In block 1118, the cPBX forwards the ACM message which was received in block 1114 to the external public network or to the wired cPBX via the path connected in block 1116.

If the party at the destination MS unit picks up the call, the destination MSC sends an answer message (ANM) message to the cPBX to be forwarded to the public network or the wired PBX in block 1120. In block 1122, the cPBX forwards the ANM message which was received in block 1120 to the external public network or to the wired PBX to signify that the called party has picked up the call. In block 1124, the call is now in progress.

On the other hand, if the initial address message comes from within the cPBX network, the method proceeds from block 1110 to 1130. In block 1130, the cPBX where the destination MS unit is located receives an IAM' (initial address message) from an cPBX on-net. The cPBX which sends the IAM' message (and received by the cPBX in block 1130) may be the MSC associated with the home cPBX if the destination MS unit has not roamed away from its home location area, from an MSC that is associated with another cPBX in the private cPBX network (when the origination MS unit is located in a location area controlled by another cPBX), or from another cPBX that forwards an external or wired PBX call. In this last scenario, the destination MS unit has roamed away and the IAM message received from the external network (whether an PSTN or a wired PBX network) has been forwarded by the home cPBX.

In block 1140, the cPBX consults the HLR/VLR registry using a locate request message in order to ascertain the location area where the destination MS unit is located. If the destination MS unit is not local to the cPBX that receives the IAM' message in block 1130 (as determined in block 1150), the method proceeds to block 1152 where the signaling session ends. This is because the path starting at block 1130 assumes that the destination MS unit is local to the cPBX and if the destination MS unit turns out not to be local to the cPBX, the circuit avoids endless looping by simply timing out. The above-described situation may occur when an MS unit has roamed away and the HLR/VLR registries of the private cPBX network have not had the chance to update. In one embodiment, updates of HLR/VLR registries occur frequently enough that if the user redials the destination MS unit, it is highly probable that an update has already occurred permitting the call to be correctly forwarded to the appropriate cPBX.

If it is determined in blocks 1140 and 1150 that the destination MS unit is local to the cPBX that receives the IAM' message in block 1130, the method proceeds to block 1154 wherein the cPBX that receives the IAM' message in block 1130 forwards an IAM message to the destination MSC. In block 1156, the destination MSC sends an address complete message (ACM) to the cPBX.

The ACM message sent by the destination MSC acknowledges receipt of the IAM message sent in block 1154. In block 1158, the cPBX that receives the ACM message in block 1156 adjusts the bandwidth of the communication channels if necessary. The bandwidth may need to be adjusted, for example, when the originating MS unit communicates at 8 Kbps and the destination MS unit communicates at 16 Kbps. In one embodiment, the cPBX itself switches in the appropriate resources (e.g., TRAU). In another embodiment, the cPBX delegates the actual switching in of the appropriate resources for bandwidth adjustment down to other functional blocks of the hierarchy, e.g., BSC or BTS.

In block 1160, the communication path is connected through to the appropriate interface (e.g., internal network interface 426 of FIGS. 5B/6B or simply within the same private MSC if both the originating MS unit and the destination MS unit happen to be in the domain of the same cPBX). The connecting through from MSC to the appropriate interface in block 1160 facilities full duplex communication.

In block 1162, the method determines whether the bandwidth resources to accomplish bandwidth adjustment in block 1158 are available. The resources are determined to be available if the bandwidth adjustment can be accomplished by the cPBX directly communicating with the destination MS unit (which may or may not be the home cPBX of the destination MS unit). If it is determined in block 1162 that bandwidth resources are not available in this cPBX, the method proceeds to block 1164 where the destination cPBX (the cPBX that directly controls the destination MS unit) sends to the originating cPBX (the cPBX that sends the IAM' message in block 1130) an ACM' message which indicates, among other things, that bandwidth adjustment needs to made in the originating cPBX since there is insufficient bandwidth adjustment resources available in the destination cPBX. If the destination cPBX has insufficient resources to adjust bandwidth, bandwidth adjustment may be made, in one embodiment, in blocks 1042–1044 of FIG. 20B. It should be noted that the originating cPBX in blocks 1154 1156 may not necessarily represent the actual place where the call is originated, e.g., if the call originates from the external network and routed through the home (now considered originating) cPBX to the cPBX where the destination MS unit currently locates.

On the other hand, if it is determined in block 1162 that there is sufficient bandwidth resources for bandwidth adjustment in the destination cPBX, the method proceeds to block 1166 wherein the destination cPBX sends an ACM' message to the originating cPBX which indicates, among other things, that there is sufficient bandwidth adjustment resources within the destination cPBX, and there is consequently no need for the originating cPBX to adjust the bandwidth. In one embodiment, the ACM' message sent in either block 1164 or 1168 corresponds to the message received in block 1038 of FIG. 20a.

At any rate, the method proceeds from either blocks 1164 or 1166 to block 1168 wherein the destination cPBX receives an answer message (ANM) from the private MSC. The ANM message indicates, among other things, that the called party at the destination MS unit has picked up the call.

The origination cPBX, which receives the ANM message in block 1168, then sends an ANM' message to the origination cPBX in block 1170. Thereafter, the method proceeds to block 1124 as shown in FIG. 21, wherein the call is in progress.

Figure 22:
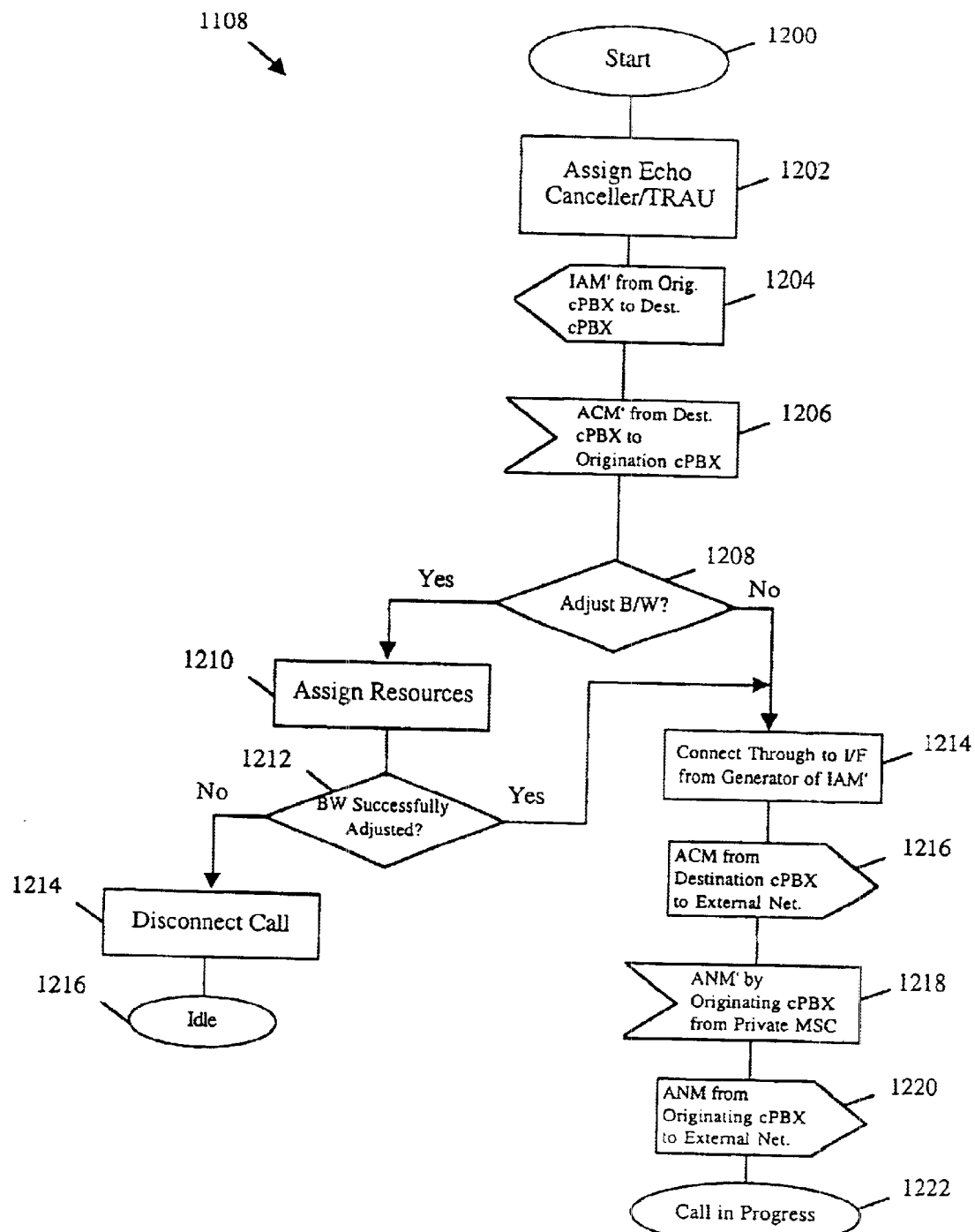
FIG. 22 shows in a simplified flow chart format the steps taken by a cPBX when a call from the external network is received by the home cPBX and forwarded to a destination cPBX.

FIG. 22 represents a more detailed flowchart of block 1108 of FIG. 21 representing the steps taken by the cPBX when a call from the external network is received by the home cPBX and forwarded to the destination cPBX where the destination MS unit has roamed to. FIG. 22 starts at block 1200. At block 1202, echo canceling and TRAU resources are assigned if needed. As mentioned earlier, echo canceling and TRAU resources may be needed for calls coming in from the external network since phones on either PSTN or wired PBX network typically communicate at a different rate than MS unit in the private cPBX network.

In block 1204, the originating cPBX, which in this case represents the home cPBX where the off-net call is first sent, forwards the initial address message (IAM) that is received in block 1102 of FIG. 21 to the destination cPBX where the destination MS unit has roamed to. Since the message is internal within the private cPBX network, the IAM message received in block 1102 of FIG. 21 is converted in an IAM' message, which as discussed earlier, may include additional information such as rate conversion information, before being sent, in block 1204, to the destination cPBX. In one embodiment, the IAM' message in block 1204 is received in block 1130 of FIG. 21.

In block 1206, the destination cPBX returns an addressed complete message (ACM') to the originating cPBX, signifying that the entire address has been received. In one embodiment, the ACM' message received in block 1206 corresponds to the ACM' message sent in either block 1164 or block 1166 of FIG. 21. In block 1208, the method ascertains whether the bandwidth needs to be adjusted. If the bandwidth needs to be adjusted (due to different rates of communication), the method proceeds to block 1210 wherein the cPBX assigns bandwidth adjustment resources as necessary. In block 1212, the method determines whether the bandwidth is successfully adjusted. If not, the method proceeds to block 1214 where the call is disconnected, and to block 126 where the circuit enters its idle mode. The call is disconnected in block 1214 since both the originating cPBX (where the external call is first sent) and the destination (where the destination MS unit has roamed to) both failed to provide necessary resources to perform the required rate conversion.

On the other hand, if it is determined in block 1212 that the bandwidth is successfully adjusted or if no bandwidth adjustment is necessary (as determined in block 1208), the method proceeds to block 1214 wherein the bearer data channel is connected to the appropriate interface of the destination cPBX from the generator of the IAM' message that was sent in block 1204.

In block 1216, the destination cPBX, which receives the ACM' message in block 1206, sends an address complete message (ACM) message to the external network via the path connected in block 1214.

In block 1218, if the called party has picked up the call on the destination MS unit, the private MSC sends, via the GMSC on the destination cPBX, an ANM' (answer message) which is received in block 1218 by the originating cPBX. In block 1220, the originating cPBX forwards an answer message (ANM) to the external network where the call originates (which may be a telephone set in the public network PSTN or the wired PBX). At block 1222, the call is in progress.

Although the foregoing invention has been described in some detail for purposes of clarity of understanding, it will be apparent that certain changes and modifications may be practiced within the scope of the appended claims. By way of example, although the invention is discussed herein with reference primarily to a GSM system, it should be noted that the present invention is not so limiting. It is specifically contemplated that the cellular private branch exchanges disclosed herein may be implemented in systems using other specific protocols. Further, although the present invention uses communication between two MS units to illustrate the inventive concept, it should be noted that conference calls may be made among more than two MS units, e.g. among 3, 4 or more MS units. The adaptation of the disclosed apparatuses and methods to achieve that end is well within the abilities of one skilled in the art. Given this disclosure, it will be apparent to those of ordinary skills in the art that combinations and substitutions may be made without departing from the scope and the spirit of the present invention. Consequently, the scope of the invention is not limited to the specific examples given herein but is set forth in the appended claims.

APPENDIX A

Glossary of Terms and Abbreviations

Abis: Protocol stack between a BTS and a BSC
ACM: Address Complete Message
ANM: Answer Message
BCF: Base Station Control Function
BSC: Base station Controller
BSS: Base Station Subsystem
BTS: Base Transceiver Station
CC: Call Control Management
CCPU: Cellular CPU
cPBX: cellular Private Branch Exchange
DSP: Digital Signal Processing
GMSC: Gateway for MSC
GSM: Global Systems for Mobile Communication
HLR: Home Location Registry
IAM: Initial Address Message
ISDN: Integrated Services Digital Network
IWF: Inner Working Functions
LAPD-M: Link Access Protocol on the Dm (control) channel
MM: Mobility Management
MS: Mobile Stations
MSC Mobile-Services Switching Center
PSTN: Public Switched Telephone Network
PBX: Private branch exchange
RF: module Radio Frequency module
RL: Radio Link
RR: Radio Resource Management
SCCP: Signalling Connection Control Part
SMS: Short Message Services
SS: Supplemental Services
TDM data: Time Division Multiplexed Data
TRAU: Transcoder-Rate Adapter Unit
TRX: Transceiver
VLR: Visitor Location Registry
VME: An industry standard bus for interconnecting components
wPBX: wired PBX

APPENDIX B

The present disclosure is written for ease of understanding by those of skill in the art. For others, the following documents, incorporated herein by reference for all purposes, may be reviewed for additional information.

Mouly, Michel & Pautet, Marie-Bernadette, "*The GSM System for Mobile Communications*", Mouly, Michel & Pautet, Marie-Bernadette, 1992.

European Telecommunications Standards Institute, "*European digital cellular telecommunications system (Phase 2); Mobile radio interface signaling layer 3 General aspects (GSM 04.07)*", 1994, Valbonne—France.

European Telecommunications Standards Institute, "*European digital telecommunications system (Phase 2); Mobile radio interface layer 3 specification (GSM 04.08)*", 1994, Valbonne—France.

European Telecommunications Standards Institute, "*European digital cellular telecommunications system (Phase 2); Mobile-services Switching Centre—Base Station System (MSC—BBS) interface Layer 3 specification (GSM 08.08)*", 1994, Valbonne—France.

European Telecommunications Standards Institute, "*European digital cellular telecommunications system (Phase 2); Signaling transport mechanism specification for the Base Station System—Mobile-services Switching Centre (BBS—MSC) interface (GSM 08.06)*", 1994, Valbonne—France.

European Telecommunications Standards Institute, "*European digital cellular telecommunications system (Phase 2); Base Station Controller—Base Transceiver Station (BSC—BTS) interface Layer 3 specification (GSM 08.58)*", 1994, Valbonne—France.

European Telecommunications Standards Institute, "*European digital cellular telecommunications system (Phase 2); Mobile Application Part (MAP) specification (GSM 09.02)*", 1994, Valbonne—France.

European Telecommunications Standards Institute, "*European digital cellular telecommunications system (Phase 2); Signaling requirements on internetworking between the Integrated Services Digital Network (ISDN) or Public Switched Telephone Network (PSTN) and the Public Land Mobile Network (PLMN) (GSM 09.03)*", 1994, Valbonne—France.

What is claimed is:

1. A cellular private branch exchange network for facilitating cellular communication for a first plurality of mobile station units, comprising:

a first base station subsystem for communicating with a first and a second mobile station unit of said first plurality of mobile station units on respectively a first and a second cellular bearer data channel, wherein the first base station subsystem is configured to provide a first cross-connect node capable of cross-connecting said first cellular bearer data channel with said second cellular bearer data channel for calls between said first and second mobile station units; and a cellular private branch exchange subsystem coupled to said first base station subsystem and to a public network, said cellular private branch exchange subsystem comprising:

a private mobile-services switching center for providing mobility management for said first plurality of mobile station units, said private mobile-services switching center configured to provide a second cross-connect node capable of cross-connecting said first cellular bearer data channel with said second cellular bearer data channel for calls between said first and said second mobile station units;

a private registry coupled to said private mobile-services switching center, said private registry storing subscriber information pertaining to said first plurality of mobile station units; and a private branch exchange block coupled to the private mobile-services switching center and private registry, the private branch exchange block configured determine whether to cross-connect the first cellular bearer data channel with the second cellular bearer data channel for calls between the first and second mobile stations at the first node in the base station subsystem, the second node in the private mobile service switching center, or in a public switching center in the public network.

2. The cellular private branch exchange network of claim 1 wherein said cellular private branch exchange subsystem further comprises a transcoder rate adaptation unit (TRAU), and wherein said cellular private branch exchange subsystem is configured so that a call path between said first and said second mobile station units, including said first cellular bearer data channel and said second cellular bearer data channel, for said calls between said first and said second mobile station units does not get transcoder rate adapted (TRAUed) if said first and said second mobile station units communicate at the same rate.

3. The cellular private branch exchange network of claim 2 wherein said cellular private branch exchange subsystem is configured so that call paths for calls between said first mobile station unit and a telephone set in said public network are TRAUed.

4. The cellular private branch exchange network of claim 3 wherein a second plurality of mobile station units, which are not registered with said private registry, are barred from using resources of said cellular private branch exchange for communicating with said public network.

5. The cellular private branch exchange network of claim 3 wherein a second plurality of mobile station units which are not registered with said registry are barred from using resources of said cellular private branch exchange for communicating with any one of said first plurality of mobile station units.

6. The cellular private branch exchange network of claim 5 wherein said first and second plurality of mobile station units are standard GSM units.

7. The cellular private branch exchange network of claim 1 wherein said public network is a wired PSTN network.

8. The cellular private branch exchange network of claim network 1 wherein said private branch exchange block further contains circuits for performing private branch exchange functions.

9. The cellular private branch exchange network of claim 8 wherein said private branch exchange functions comprise call forwarding and call transfer among said first plurality of mobile station units.

10. The cellular private branch exchange network of claim 9 wherein said first plurality of mobile station units represent standard GSM units.

11. The cellular private branch exchange network of claim 1 wherein said first base station subsystem and said private branch exchange subsystem are co-located in the same physical chassis, and wherein said private mobile-services switching center is co-located on the same back plane of the physical chassis.

12. The cellular private branch exchange network of claim 1 wherein said first base station subsystem and said private branch exchange subsystem are deployed at geographically dispersed locations from one another, and wherein said first base station subsystem and private mobile-services switching center are both implemented on physical chassis having identical back planes.

13. The cellular private branch exchange network of claim 1 wherein said first base station subsystem and said private branch exchange subsystem are deployed at geographically dispersed locations from one another, and wherein said first base station subsystem is implemented on a first physical chassis having a first back plane having a first number of slots and comprising a first TDM bus and a first control bus, and said private mobile-services switching center of said private branch exchange subsystem is implemented on second physical chassis having a second back plane comprising a second TDM bus having the same features as said first TDM bus and a second control bus having the same features as said first control bus, wherein said second back plane having a second number of slots different from said first number of slots.

14. The cellular private branch exchange network of claim 1 wherein said first base station subsystem comprises a base station controller and at least one base transceiver station, and wherein the at least one base transceiver station is configured to provide the first cross-connect node.

15. The cellular private branch exchange network of claim 1 further comprising a second base station subsystem for communicating with a third mobile station unit of said first plurality of mobile station units on a third cellular bearer data channel, said second base station subsystem unit being coupled to said first base station subsystem by a direct link, wherein calls between said third mobile station unit and said first mobile station unit are cross connected via said direct link.

16. A cellular private branch exchange subsystem coupled to a base station subsystem and to a public network for facilitating cellular communication among a first plurality of mobile stations implementing a first standard through said base station subsystem, said cellular private branch exchange subsystem comprising:

a private mobile services switching center for providing mobility management only for said first plurality of mobile stations;

a private registry coupled to said private mobile services switching center for storing subscriber information regarding said first plurality of mobile stations;

a private branch exchange block coupled to said private mobile services switching center and said private registry for providing private branch exchange functions for said first plurality of mobile stations and performing cross connection of call paths for calls among said first plurality of mobile stations, and inhibiting a second plurality of mobile stations implementing said first standard and not registered with said private registry from using resources of said cellular private branch exchange subsystem.

17. The cellular private branch exchange subsystem of claim 16, wherein said base station subsystem comprises a plurality of base station controllers coupled to said private mobile services switching center, said private mobile services switching center provides roaming and handoff capabilities for said first plurality of mobile stations when a first selected ones of said first plurality of mobile stations roam among location areas controlled by said plurality of base station controllers.

18. The cellular private branch exchange subsystem of claim 17 further comprising a plurality of base transceiver stations coupled to a first one of said plurality of base station controllers, a first one of said plurality of base transceiver stations couple using an air interface with said first plurality of mobile stations, said first one of said plurality of plurality of base station controllers handle roaming and handoff capabilities when a second selected ones of said first plurality of mobile stations roam among location areas controlled by said plurality of base transceiver stations.

19. The cellular private branch exchange subsystem of claim 18 wherein said first standard is a GSM standard.

20. The cellular private branch exchange subsystem of claim 19 wherein both said first plurality of mobile stations and said second plurality of mobile stations are standard GSM handsets.

21. The cellular private branch exchange subsystem of claim 18 wherein said private mobile services switching center, said plurality of base station controllers, and said plurality of base transceiver stations form a hierarchical private network controlled by said private mobile services switching center.

22. The cellular private branch exchange subsystem of claim 18 wherein said first one of said plurality of base station controllers includes a first transcoder rate adapter unit for performing rate conversion between a first mobile station and a second mobile station of said first plurality of mobile stations, said first and second mobile stations communicate at different rates.

23. The cellular private branch exchange subsystem of claim 22 wherein said first transcoder rate adapter unit does not perform rate conversion for calls between mobile stations of said first plurality of mobile stations that communicate at the same rate.

24. The cellular private branch exchange subsystem of claim 23 wherein bearer data channels from both said first mobile station and said second mobile stations are cross connected at said first one of said plurality of base station controllers if both said first mobile station and said second mobile station are controlled by said first one of said plurality of base station controllers.

25. The cellular private branch exchange subsystem of claim 18 wherein said first one of said plurality of base transceiver stations includes a first transcoder rate adapter unit for performing rate conversion between a first mobile station and a second mobile station of said first plurality of mobile stations, said first and second mobile stations communicate at different rates.

26. The cellular private branch exchange subsystem of claim 25 wherein said first transcoder rate adapter unit does not perform rate conversion for calls between mobile stations of said first plurality of mobile stations that communicate at the same rate.

27. The cellular private branch exchange subsystem of claim 26 wherein bearer data channels from both said first mobile station and said second mobile stations are cross connected at said first one of said plurality of base transceiver stations if both said first mobile station and said second mobile station are controlled by said first one of said plurality of base transceiver stations.

* * * * *